US012703156B2

(12) United States Patent
Boyer et al.

(10) Patent No.: US 12,703,156 B2

(45) Date of Patent: Aug. 11, 2026

(54) METHOD OF MANUFACTURING A COMPOSITE COMPONENT FOR A GAS TURBINE ENGINE

(71) Applicant: General Electric Company, Schenectady, NY (US)

(72) Inventors: Mitchell Boyer, Cincinnati, OH (US); Ming Xie, Dayton, OH (US); Leslie L. Langenbrunner, Cincinnati, OH (US); Douglas Lorrimer Armstrong, Needham, MA (US); Mingchao Wang, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 76 days.

(21) Appl. No.: 18/658,008

(22) Filed: May 8, 2024

(65) Prior Publication Data

US 2025/0346003 A1 Nov. 13, 2025

(51) Int. Cl.

| | |
|---|---|
| ***B29C 70/24*** | (2006.01) |
| ***B29K 105/08*** | (2006.01) |
| ***B29L 31/00*** | (2006.01) |
| ***D03D 1/00*** | (2006.01) |
| ***D03D 25/00*** | (2006.01) |

(52) U.S. Cl.

CPC ............... *B29C 70/24* (2013.01); *D03D 1/00* (2013.01); *D03D 25/005* (2013.01); *B29K 2105/0845* (2013.01); *B29L 2031/7504* (2013.01); *D10B 2505/02* (2013.01)

(58) Field of Classification Search

None

See application file for complete search history.

(56) References Cited

U.S. PATENT DOCUMENTS

| | | | |
|---|---|---|---|
| 2,857,094 | A | 10/1958 | Erwin |
| 3,403,844 | A | 10/1968 | Stoffer |
| 3,616,508 | A | 11/1971 | Wallett |
| 3,718,952 | A | 3/1973 | Palfreyman et al. |
| 4,098,559 | A | 7/1978 | Price |
| 4,363,602 | A | 12/1982 | Martin |
| 4,379,798 | A | 4/1983 | Palmer et al. |

(Continued)

FOREIGN PATENT DOCUMENTS

| | | | |
|---|---|---|---|
| EP | 3795330 | A1 | 3/2021 |
| WO | 200662670 | A1 | 6/2006 |
| WO | 201001003 | A1 | 1/2010 |

*Primary Examiner* — Abbas Rashid

*Assistant Examiner* — Caroline Beha

(74) *Attorney, Agent, or Firm* — Venable LLP; Edward A. Kmett; Michele V. Frank

(57) ABSTRACT

A method of manufacturing a composite component having an outer shell, an inner hub, and a plurality of struts connecting the outer shell and the inner hub. An outer shell hoop preform and an inner hub hoop preform are woven and installed on a mold tooling structure, a plurality of outer shell pi-joint members are integrally woven to the outer shell hoop preform, and a plurality of inner hub pi-joint members are integrally woven to the inner hub hoop preform. A plurality of strut preforms are connected between respective ones of the outer shell pi-joint members and the inner hub pi-joint members. A matrix material is injected into the mold tooling structure and a curing process is applied to the mold tooling structure to obtain the composite component.

17 Claims, 25 Drawing Sheets

(56) References Cited

U.S. PATENT DOCUMENTS 4,460,531 A 7/1984 Harris et al.
4,576,770 A 3/1986 Schultz
4,671,470 A 6/1987 Jonas
4,676,722 A 6/1987 Marchal et al.
4,747,900 A 5/1988 Angus
4,786,347 A 11/1988 Angus
4,826,645 A 5/1989 Angus
5,429,853 A * 7/1995 Darrieux .................. D04H 1/52 428/113
5,451,448 A 9/1995 Sawko et al.
5,605,440 A 2/1997 Bocoviz et al.
5,921,754 A 7/1999 Freitas et al.
5,951,255 A 9/1999 Krenkel et al.
6,676,882 B2 1/2004 Benson et al.
6,712,099 B2 3/2004 Schmidt et al.
6,874,543 B2 4/2005 Schmidt et al.
7,938,627 B2 5/2011 Muller
8,079,387 B2 * 12/2011 Goering .................. B29B 11/16 139/11
8,118,546 B2 2/2012 Morrison
8,157,212 B2 4/2012 Biornstad et al.
8,696,319 B2 4/2014 Naik
8,870,120 B2 10/2014 Sanderson et al.
8,905,719 B2 12/2014 Kray et al.
8,943,697 B2 2/2015 Kamaraj et al.
9,022,733 B2 * 5/2015 Coupe ....................... F01D 9/04 29/889.22
9,605,543 B2 3/2017 Nunez et al.
9,616,629 B2 4/2017 Fabre et al.
9,777,585 B2 10/2017 Drane
9,808,988 B2 11/2017 Kwon et al.
10,232,926 B2 3/2019 Goehlich
10,703,053 B2 7/2020 Gordon
11,415,008 B2 8/2022 Backhouse et al.
11,491,743 B2 * 11/2022 Le Hong ................. B29C 70/24
12,084,987 B2 9/2024 Backhouse et al.
12,366,175 B1 7/2025 Xie et al.
2003/0235502 A1 12/2003 Van Dine et al.
2006/0121809 A1 6/2006 Goering
2009/0317246 A1 12/2009 Lutz et al.
2010/0105269 A1 4/2010 Goering et al.
2011/0206522 A1 8/2011 Alvanos et al.
2012/0099982 A1 4/2012 Coupe et al.
2013/0149130 A1 6/2013 Hasting et al.
2013/0156594 A1 6/2013 Kray et al.
2013/0202425 A1 * 8/2013 Balk ....................... F01D 25/24 415/200
2014/0072443 A1 3/2014 Mateo et al.
2014/0133989 A1 * 5/2014 Belmonte ................. F01D 9/02 416/204 A
2014/0205463 A1 7/2014 Herraiz et al.
2015/0354377 A1 12/2015 Gimat et al.
2016/0082674 A1 3/2016 Kray et al.
2017/0021575 A1 * 1/2017 Hansen ................... B29C 70/22
2018/0119550 A1 * 5/2018 Berdou ............... B29C 45/1418
2020/0003061 A1 1/2020 Lanfant et al.
2020/0123917 A1 * 4/2020 Husband ................... F01D 5/22
2021/0010377 A1 * 1/2021 Blanquart ........... B29C 65/5057
2021/0285332 A1 9/2021 Frey et al.
2022/0372882 A1 11/2022 Marchal et al.

* cited by examiner

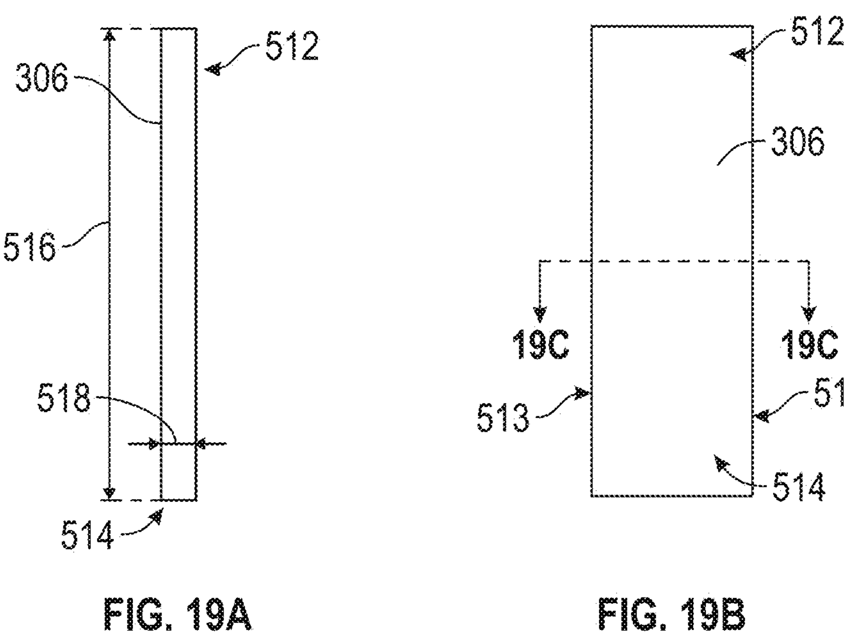
512
306
516
518
514
FIG. 19A
512
306
19C
19C
513
515
514
FIG. 19B
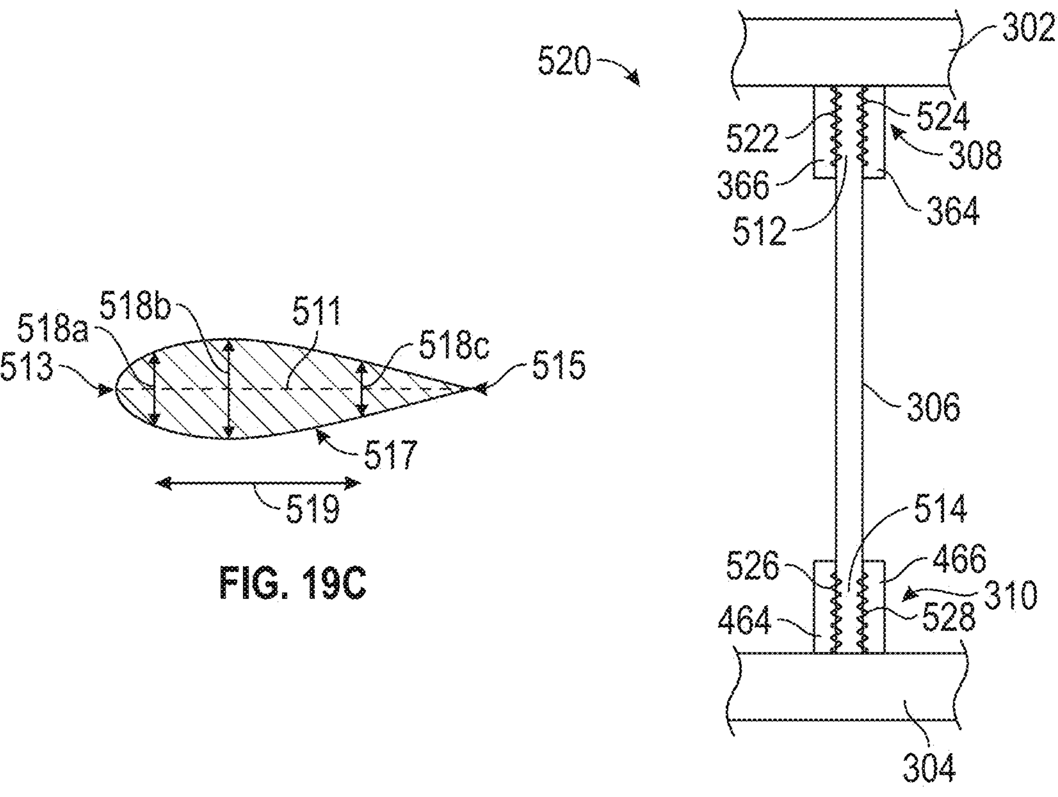
518a
518b
511
518c
513
515
517
519
FIG. 19C
520
302
522
524
308
366
364
512
306
514
526
466
310
464
528
304
FIG. 20

METHOD OF MANUFACTURING A COMPOSITE COMPONENT FOR A GAS TURBINE ENGINE

GOVERNMENT INTEREST

This invention was made with United States Government support. The United States Government may have certain rights in the invention.

TECHNICAL FIELD

The present disclosure relates to composite components and methods of forming the composite components, particularly, aircraft composite components for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 19A is a schematic aft-looking layout of a strut preform, according to an aspect of the present disclosure.

FIG. 19B is a schematic side view of the strut preform of FIG. 19A, according to an aspect of the present disclosure.

FIG. 19C is a cross-sectional view of a strut preform to that of FIG. 19A and FIG. 19B, taken at plane 19C-19C of FIG. 19B, according to an aspect of the present disclosure.

FIG. 20 is an enlarged view of a strut to outer shell and inner hub connection, taken at detail view 520 of FIG. 7, according to an aspect of the present disclosure.

DETAILED DESCRIPTION

Figure 1:
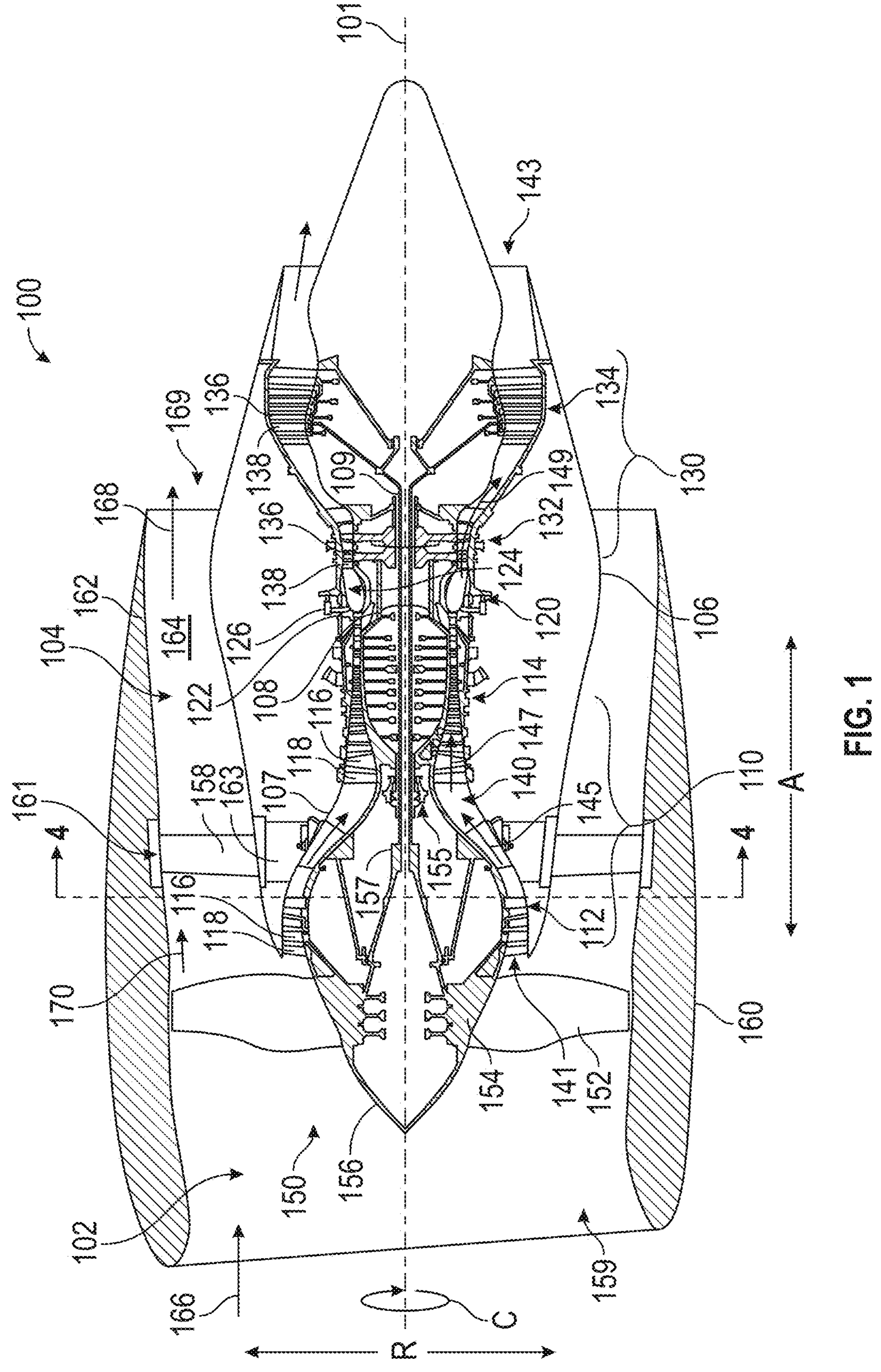
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

The terms "vane" and "strut" may be used interchangeably herein, and generally refer to a structural component implemented to provide structural support between two circular (or cylindrical) elements of a gas turbine engine, and/or to redirect a flow of air passing through two circular (or cylindrical) elements.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein "reinforcing fibers" may include, for example glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle. The polymeric matrix material may include, for example, thermoset resin, thermoplastic resin, bismaleimide (BMI) materials, polyimide materials.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead, thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or an alloy can be a combination of at least two or more elements or materials, where at least one is a metal.

Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

The composite materials discussed herein may be particularly suitable for use in turbine engines for aircraft. FIG.

1 is a schematic, cross-sectional view a turbine engine 100 that may be used on an aircraft. The turbine engine 100 has an axial direction A (extending parallel to a longitudinal centerline axis 101, shown for reference in FIG. 2), a radial direction R, and a circumferential direction. C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes a tubular outer casing 106 that defines a core inlet 141. In this embodiment, the core inlet 141 is annular about the longitudinal centerline axis 101. The outer casing 106 encases the turbo-engine 104, and the turbo-engine 104 includes, in a serial flow relationship, a compressor section 110 including a booster or a low-pressure (LP) compressor 112 and a high-pressure (HP) compressor 114, a combustion section 120, and a turbine section 130 including a high-pressure (HP) turbine 132 and a low-pressure (LP) turbine 134, and a core air exhaust nozzle 143. The compressor section 110, the combustion section 120, the turbine section 130, and the core air exhaust nozzle 143 together define, at least in part, a core air flow path 140 extending from the core inlet 141 to the core air exhaust nozzle 143, and through which core air 145 flows.

Each of the LP compressor 112 and the HP compressor 114 may include a plurality of compressor stages. In each stage, a plurality of compressor blades 116 rotates relative to a corresponding set of static compressor vanes 118 to compress or to pressurize the core air 145 passing through the stage. In a single compressor stage, the plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a set of turbine blades 136 rotate relative to a corresponding set of static turbine vanes 138 to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, which is ignited and burned in the combustor 122, generating combustion products (i.e., combustion gases 149) within the combustor 122. The combustion gases are discharged from the combustion chamber 124 to the turbine section 130. The combustion gases 149 may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. More specifically, the turbo-engine 104 includes a high-pressure (HP) shaft 108 drivingly connecting the HP turbine 132 to the HP compressor 114, and a low-pressure (LP) shaft 109 drivingly connecting the LP turbine 134 to the LP compressor 112. The HP shaft 108 and the LP shaft 109 may also be referred to as spools. More specifically, the HP turbine rotors of the HP turbine 132 are connected to the HP shaft 108, and the HP compressor rotors of the HP compressor 114 are connected to the HP shaft 108. When the turbine blades 136 and, thus, the HP turbine rotors of the HP turbine 132 are rotated by the combustion gases 149 flowing through the core air flow path 140, the HP turbine rotors of the HP turbine 132 rotate the HP compressor rotors and, thus, the HP compressor blades 116 of the HP compressor 114 via the HP shaft 108. Similarly, the LP turbine rotors of the LP turbine 134 are connected to the LP shaft 109, and the LP compressor rotors of the LP compressor 112 are connected to the LP shaft 109. When the LP turbine rotors and, thus, LP the turbine blades 136 of the LP turbine 134 are rotated by the combustion gases 149 flowing through the core air flow path 140, the LP turbine rotors of the LP turbine 134 rotate the LP compressor rotors and, thus, the LP compressor blades 116 of the LP compressor 112 via the LP shaft 109. The HP shaft 108 and the LP shaft 109 are disposed coaxially about the longitudinal centerline axis 101. The HP shaft 108 has a greater diameter than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the HP/LP compressor rotors and the HP/LP turbine rotors.

The fan section 102 shown in FIG. 1 includes a fan 150 having a plurality of fan blades 152 coupled to a disk 154. The fan blades 152 and the disk 154 are connected to a fan shaft 157, which is connected to a reduction gearbox 155 that is connected with and driven by the LP shaft 109. Thus, the fan blades 152 and the disk 154 are rotatable, together, about the longitudinal centerline axis 101 and are driven by rotation of the LP shaft 109. The disk 154 is covered by a rotatable fan hub 156 that is aerodynamically contoured to promote an airflow through the plurality of fan blades 152. Further, a nacelle 160 circumferentially surrounds the fan 150 and/or at least a portion of the turbo-engine 104. The nacelle 160 may also be referred to as an annular fan casing or an outer nacelle. The nacelle 160 is supported relative to the turbo-engine 104 by a plurality of circumferentially spaced guide vanes (or struts) 158 (two shown in FIG. 1) that are part of a guide vane structure 161 that is connected to an intermediate frame structure 163. The guide vane structure 161 will be described in more detail below, and the guide vane structure 161 may be one example of a composite component 161' that may be implemented in the turbine engine 100. A downstream section 162 of the nacelle 160 extends over an outer portion of the turbo-engine 104 and, more specifically, a downstream portion of the outer casing 106 so as to define a bypass airflow passage 164 therebetween.

During operation of the turbine engine 100, a volume of air 166 enters the turbine engine 100 through an inlet 159 of the nacelle 160 and/or the fan section 102. As the volume of air 166 passes across the fan blades 152, a first portion of the air 166 is propelled by the fan blades 152 to generate a swirled fan airflow 170 that is directed or routed toward the guide vanes 158, where the swirled fan airflow 170 may be redirected by the guide vanes 158 to an axial flow in the axial direction A and into the bypass airflow passage 164 as bypass air 168. A second portion of air 166 (shown schematically as core air 145) is directed or is routed into the core inlet 141 to an upstream section of the core air flow path 140. Simultaneously, with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust.

The turbine engine 100 shown in FIG. 1 and discussed herein (i.e., the turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on an aircraft. Suitable aircraft include, for example, an airplane, a helicopter, and an unmanned aerial vehicle (UAV). In other embodiments, the turbine engine may be any other turbine engine, such as an industrial turbine engine incorporated into a power generation system, or a nautical turbine engine on a ship or other vessel.

Various components of the turbine engine 100 may be formed from composite materials. These components are referred to herein as composite components. The fan blades 152, a fan casing having the guide vanes 158, compressor blades 116, and compressor vanes 118 may be made from PMC materials, for example. Other composites, such as CMC materials, may be used for other components, including, for example, turbine blades 136, turbine vanes 138, and components of the combustion section 120 such as combustor liners used to form the combustion chamber 124. Moreover, although the embodiments are described relative to a turbine engine 100, the composite components and methods of manufacturing may be used to form composite components used in applications beyond turbine engines.

Figures 2A, 2B:
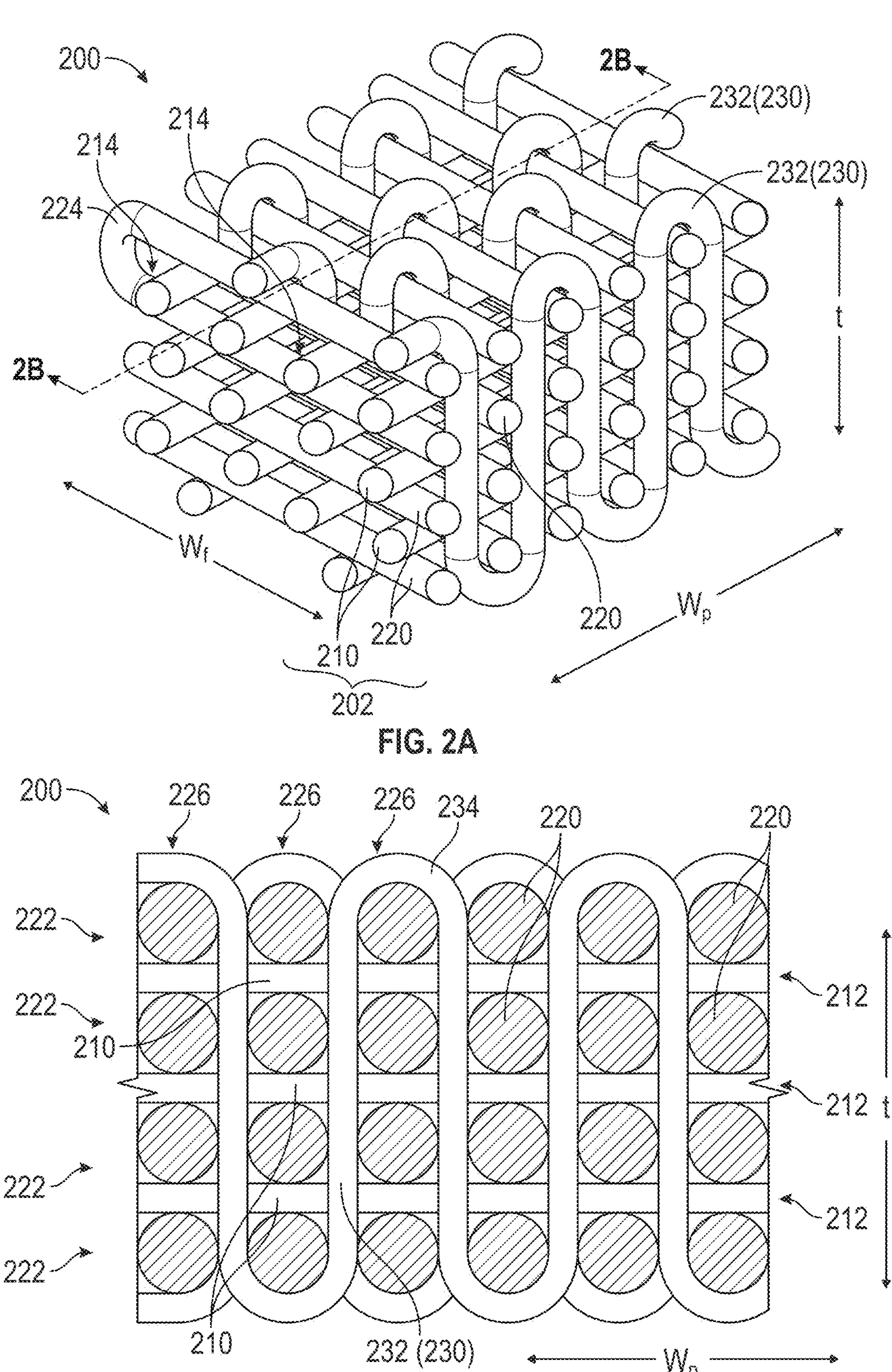
FIG. 2A is a schematic view of a three-dimensional fiber weave pattern, according to an aspect of the present disclosure.
FIG. 2B is a schematic, cross-sectional view of the fiber weave pattern shown in FIG. 2A taken along line 2B-2B in FIG. 2A, according to an aspect of the present disclosure.

FIG. 2A is a schematic view showing an exemplary three-dimensional fiber weave pattern that may be used to form a woven fabric 200. FIG. 2B is a schematic, cross-sectional view taken along plane 2B-2B in FIG. 2A. In embodiments discussed herein, the composite components may be formed from a plurality of reinforcing fibers and, more specifically, a plurality of reinforcing fiber tows 202. The plurality of reinforcing fiber tows 202 are woven together in a three-dimensional pattern to form the woven fabric 200. The plurality of reinforcing fiber tows 202 include a plurality of first fiber tows, which, in this embodiment, is a plurality of warp fiber tows 210. The plurality of reinforcing fiber tows 202 also include a plurality of second fiber tows, which, in this embodiment, is a plurality of weft fiber tows 220. The weft fiber tows 220 are oriented transversely to the warp fiber tows 210, and, in the depicted embodiment, the warp fiber tows 210 and the weft fiber tows 220 are oriented generally orthogonally to each other. The woven fabric 200 thus includes a warp direction $W_P$ (also referred to as a first direction) and a weft direction $W_F$ (also referred to as a second direction). The warp fiber tows 210 extend in the warp direction $W_P$ and the weft fiber tows 220 extend in the weft direction $W_F$.

In the depicted embodiment, the woven fabric 200 is a three-dimensional woven fabric and the woven fabric 200 also includes a thickness direction t. The thickness direction may also be referred to as a z direction. The warp fiber tows 210 are arrayed in both the weft direction $W_F$ and the thickness direction t. The warp fiber tows 210 may be parallel to each other in both the weft direction $W_F$ and the thickness direction t, and the woven fabric 200 may include a plurality of warp fiber layers 212 in the thickness direction t and a plurality of warp fiber columns 214 in the weft direction $W_F$. Three warp fiber layers 212 are depicted in FIGS. 2A and 2B, but the woven fabric 200 may include any other numbers of warp fiber layers 212, including more than three warp fiber layers 212.

During a weaving process, the warp fiber tows 210 may be held in tension in the warp direction $W_P$, and one of the weft fiber tows 220 is passed or drawn therethrough. A shuttle (not shown) may be used to draw the one of the weft fiber tows 220 through the warp fiber tows 210. The shuttle may be passed through the warp fiber tows 210 in a first direction and then reversed to pass through the warp fiber tows 210 at a different height in a thickness direction t, thereby forming a plurality of weft fiber layers 222 in the thickness direction t. The one of the weft fiber tows 220 may be continuous through at least a portion of the thickness of the woven fabric 200, and the one of the weft fiber tows 220 may include a portion extending in the thickness direction t, which may be referred to in some embodiments as a turnaround. This portion of the weft fiber tow thus may be referred to herein as a turnaround portion 224. The warp fiber tows 210 may be moved relative to each other to allow a space for the one of the weft fiber tows 220 to pass through the space. The warp fiber tows 210 may be moved relative to each other in different ways to create different patterns. In this way, weaving the woven fabric 200 includes positioning the warp fiber tows 210 (e.g., such that the warp fiber tows 210 are held stationary in tension), then laying the weft fiber tows 220 (e.g., such that the weft fiber tows 220 are drawn through and inserted over and under the corresponding warp fiber tows 210), and repeating this process until the woven fabric 200 is formed. The weft fiber tows 220 may be parallel to each other in both the warp direction $W_P$ and the thickness direction t, and the woven fabric 200 may include the plurality of weft fiber layers 222 in the thickness direction t and a plurality of weft fiber columns 226 in the warp direction $W_P$.

The woven fabric 200 also includes a plurality of interlocking fiber tows 230 (also referred to as Z-weaver fiber tows). The interlocking fiber tows 230 are additional warp fiber tows that are directed through the thickness of the woven fabric 200 during weaving to stitch the reinforcing fiber tows 202 together. The interlocking fiber tows 230 are woven to extend between two or more of the weft fiber layers 222. Different fiber patterns may be used for the interlocking fiber tows 230. A first interlocking fiber pattern, shown in FIGS. 2A and 2B, is an orthogonal interlocking pattern and the interlocking fiber tows 230 are referred to herein as orthogonal interlocking fiber tows 232. In this pattern, the orthogonal interlocking fiber tows 232 extend substantially in a direction that is orthogonal to the warp direction $W_P$, which is the thickness direction t in the depicted embodiment. As with the weft fiber tows 220, the interlocking fiber tows 230 (e.g., the orthogonal interlocking fiber tows 232) may include a turnaround portion 234. In the depicted embodiment, the turnaround portion 234 of the orthogonal interlocking fiber tows 232 is positioned to form an alternating pattern between each warp fiber columns 214. In the depicted embodiment, the orthogonal interlocking fiber tows 232 extend through the thickness of the woven fabric 200 and may be referred to as through-thickness interlocking fiber tows, but other thicknesses may be used.

Figure 2C:
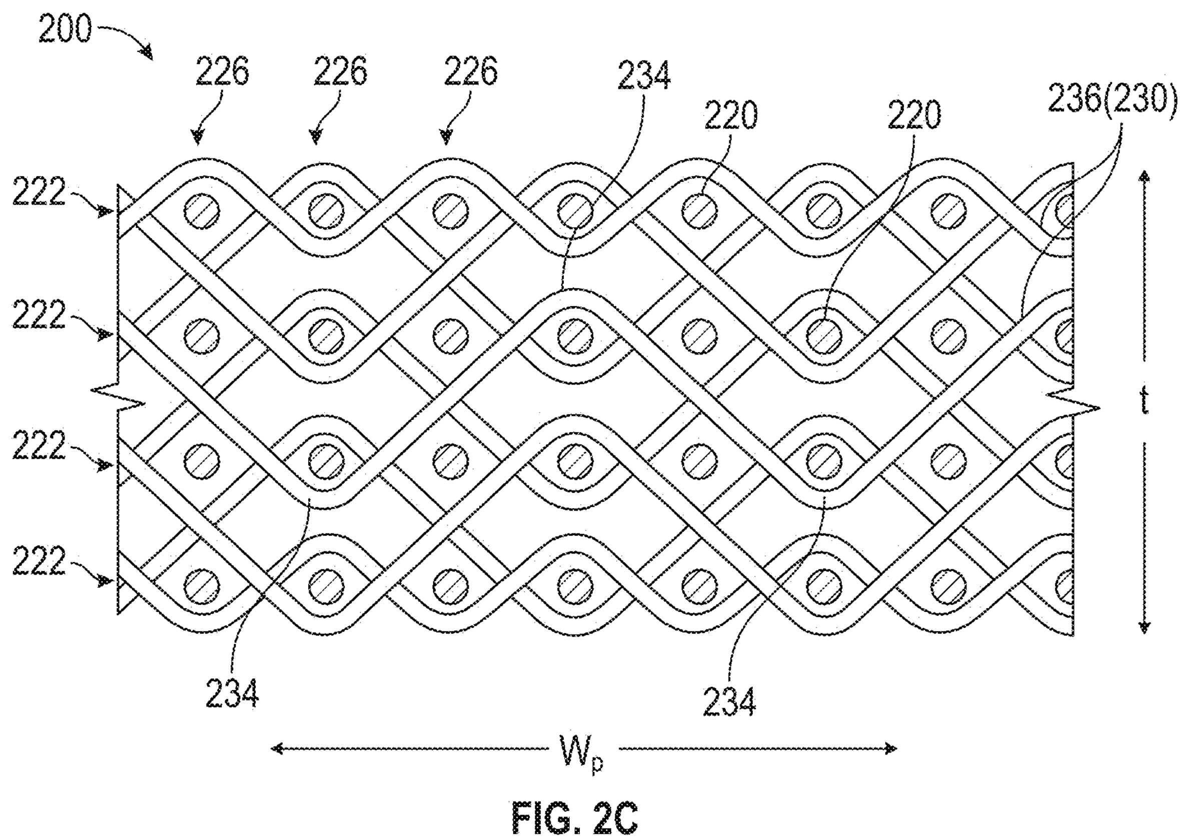
FIG. 2C is a schematic, cross-sectional view of a fiber weave pattern shown similar to fiber weave pattern shown in FIG. 2A, but with a different interlocking fiber pattern, according to an aspect of the present disclosure.
Figure 2D:
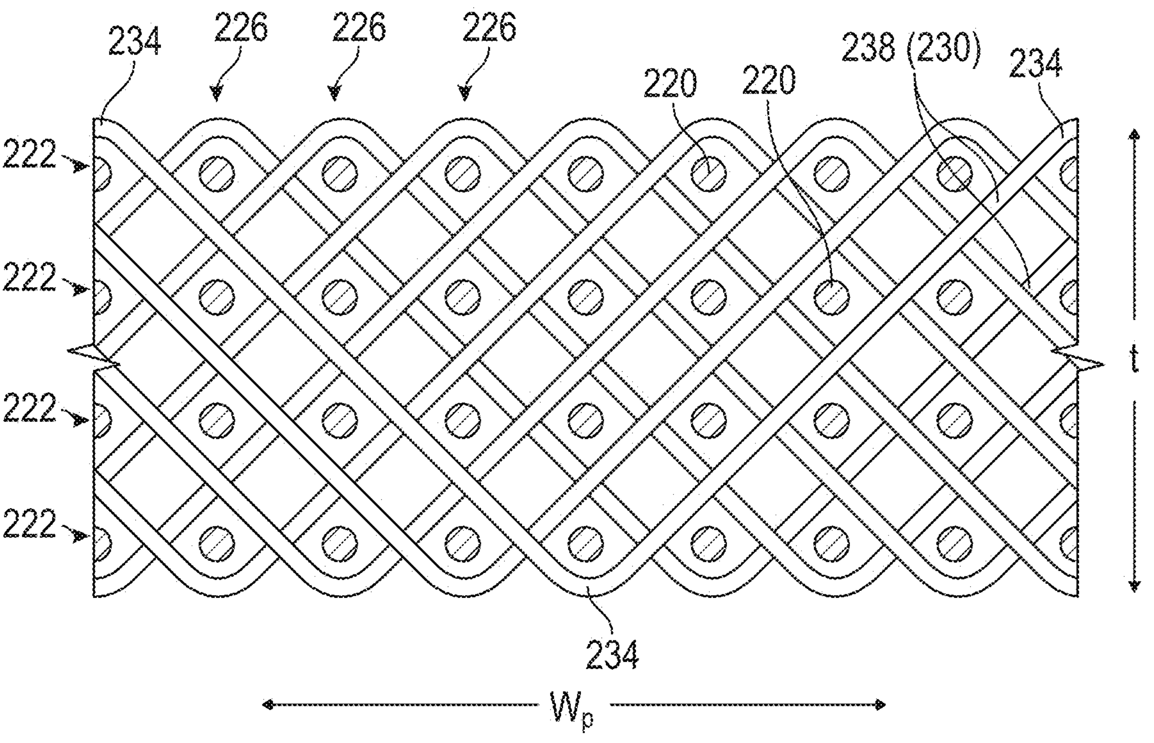
FIG. 2D is a schematic, cross-sectional view of a fiber weave pattern shown similar to fiber weave pattern shown in FIG. 2A, but with another interlocking fiber pattern, according to an aspect of the present disclosure.

A second interlocking fiber pattern, shown in FIG. 2C, is an angle interlock pattern and, more specifically, a layer-to-layer angle interlock pattern. FIG. 2C is a cross-sectional view of a woven fabric taken from a perspective similar to FIG. 2B. The interlocking fiber tows 230 are referred to in this embodiment as angled interlocking fiber tows 236. Instead of extending orthogonally through the woven fabric 200, the angled interlocking fiber tows 236 form an oblique angle relative to the warp direction $W_P$. In the depicted embodiment, the angled interlocking fiber tows 236 extend through adjacent weft fiber layers 222 in an alternating or a sinusoidal pattern to interlock these adjacent layers with each other, with the oblique angle formed between adjacent turnaround portions 234 of the angled interlocking fiber tows 236. The turnaround portions 234 of the angled interlocking fiber tows 236 are located on every other weft fiber columns 226, but, in other embodiments, two or more weft fiber columns 226 may be between adjacent turnaround portions 234 of the angled interlocking fiber tows 236. In other embodiments, the angled interlocking fiber tows 236 may extend between more than two adjacent weft fiber layers 222. For example, as shown in FIG. 2D, the interlocking fiber tows 230 are through-thickness interlocking fiber tows, which are referred to herein as through-thickness angled interlocking fiber tows 238. FIG. 2D is a cross-sectional view of a woven fabric taken from a perspective similar to FIG. 2B. The weft fiber tows 220 are omitted in FIGS. 2C and 2D for clarity.

Figure 3:
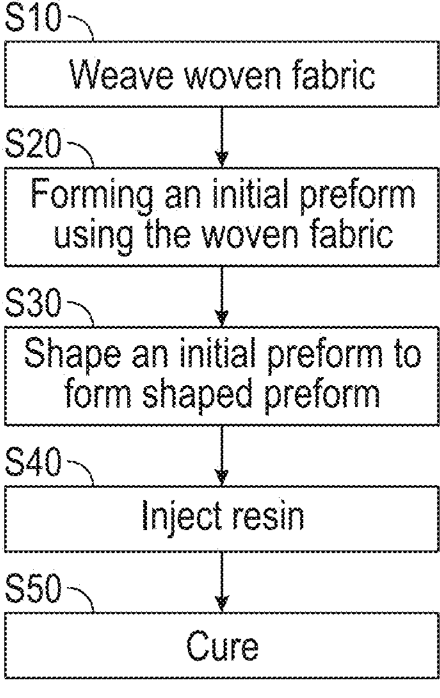
FIG. 3 is a flow chart of a general process for manufacturing a composite component that may be used in the turbine engine of FIG. 1, according to an aspect of the present disclosure.

FIG. 3 is a flow chart of a general process of manufacturing a composite component that may be used in the turbine engine of FIG. 1. The method includes, in step S10, weaving the woven fabric 200, such as on a loom. In step S20, the method includes forming an initial preform using one or more pieces of woven fabric 200. This step may include, for example, laying up a plurality of woven fabrics 200 or otherwise positioning the plurality of woven fabrics 200 relative to each other to form the initial preform. In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

Further, the composite component may be finish machined as needed. Finish machining may define the final finished shape or contour of the composite component. For example, when the composite component is a fan blade 152 (FIG. 1), the edges of the fan blade 152 may be machined to define the final shape or the contour of the airfoil. Additionally, the composite component can be coated with one or more suitable coatings, such as, e.g., an environmental barrier coating (EBC) or a polyurethane surface coating.

Figure 4:
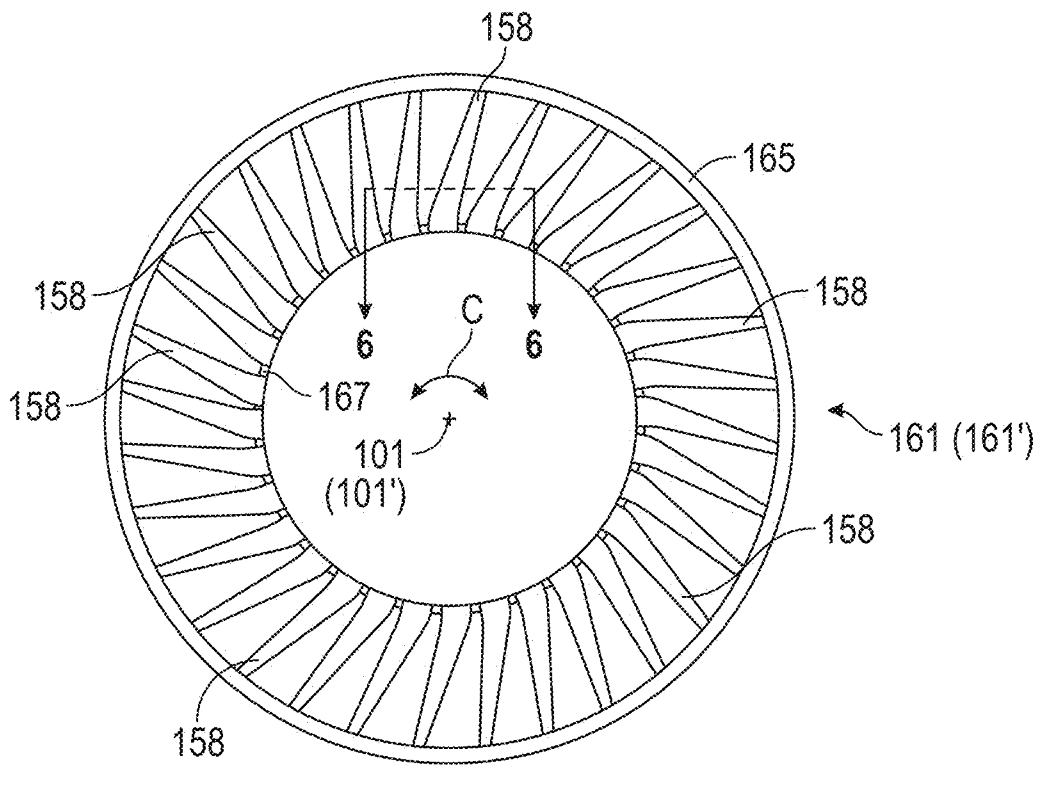
FIG. 4 is a schematic forward aft-looking view of a guide vane structure 161, taken at plane 4-4 of FIG. 1, according to an aspect of the present disclosure.
Figure 5:
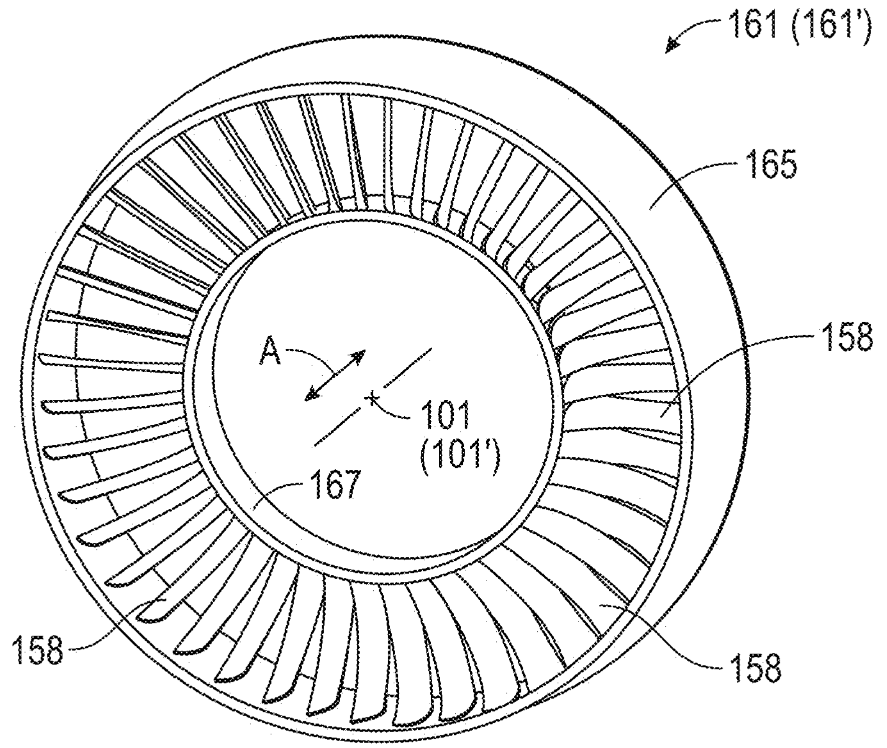
FIG. 5 is a schematic aft-looking perspective view of the guide vane structure of FIG. 4, according to an aspect of the present disclosure.

FIG. 4 is a schematic forward aft-looking view of the guide vane structure 161, taken at plane 4-4 of FIG. 1, according to an aspect of the present disclosure. FIG. 5 is a schematic top aft-looking perspective view of the guide vane structure of FIG. 4, according to an aspect of the present disclosure. In FIG. 4 and FIG. 5, the guide vane structure 161 is shown as being a guide vane structure that includes the guide vanes 158 of FIG. 1 and that is arranged downstream of the fan 150, but the present disclosure is equally applicable for other types of guide vane structures, including inlet guide vane structures, and stator vane structures that may be included, for example, within the compressor section 110 of the turbo-engine 104 or within the turbine section 130 of the turbo-engine 104. Referring collectively to FIG. 4 and FIG. 5, only the guide vane structure 161 is shown, with other elements of FIG. 1 (e.g., the nacelle 160 and the turbo-engine components within the outer casing 106) being omitted merely for clarity. As shown in FIG. 4, the guide vane structure 161 includes an outer shell 165 that extends circumferentially about a guide vane structure centerline axis 101', which is congruent to the longitudinal centerline axis 101 of the turbine engine 100, and also extends in the axial direction A (FIG. 1). The guide vane structure 161 also includes an inner hub 167 that extends circumferentially about the guide vane structure centerline axis 101' and that extends in the axial direction A. The plurality of guide vanes 158 extend between the outer shell 165 and the inner hub 167 and are circumferentially spaced apart from one another about the guide vane structure centerline axis 101'. The guide vane structure 161 is an example of a composite component 161' that may be implemented in the turbine engine 100 and a description of a composite guide vane structure and a method of manufacturing the composite guide vane structure as a composite component will be described in more detail below.

Figure 6:
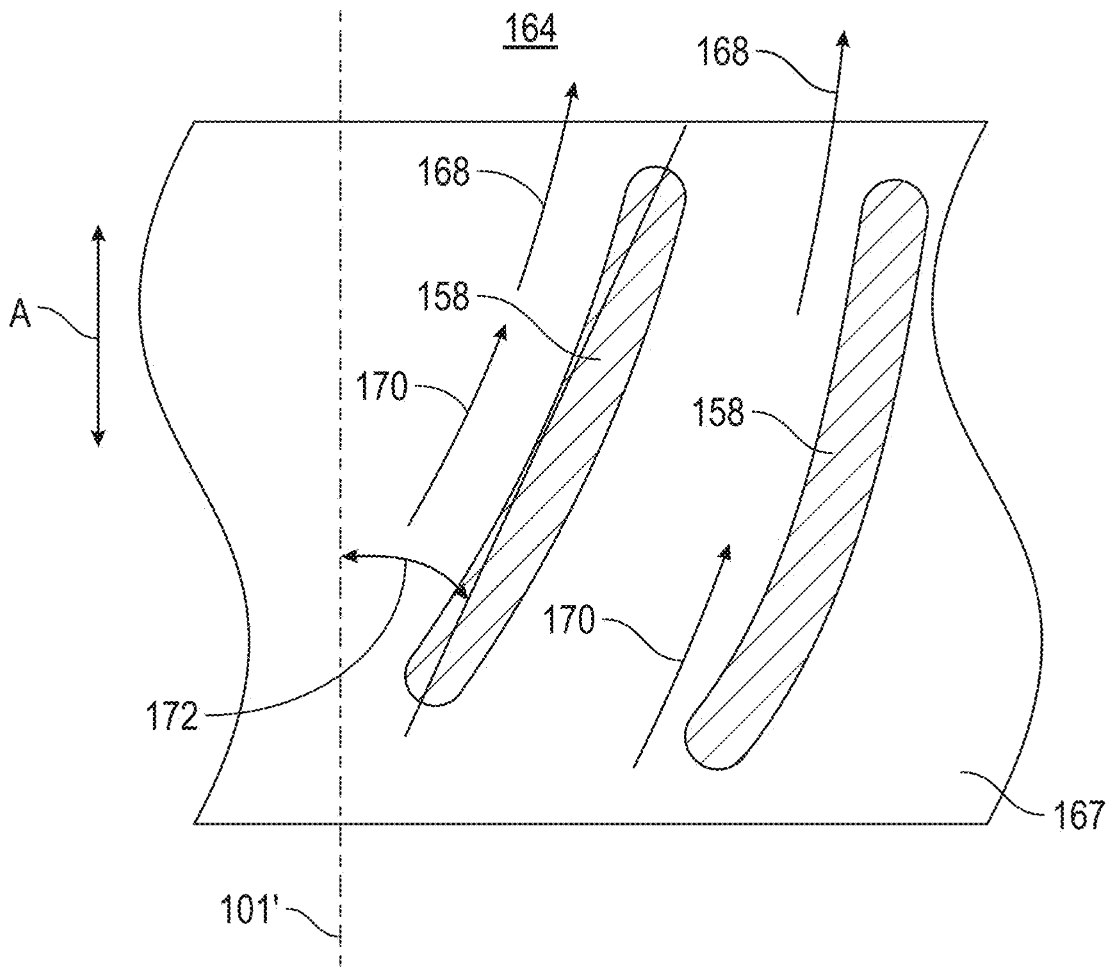
FIG. 6 is a cross-sectional view, taken at plane 6-6 of FIG. 4, through a guide vane of the guide vane structure, according to an aspect of the present disclosure.

FIG. 6 is a cross-sectional view, taken at plane 6-6 of FIG. 4, through a guide vane of the guide vane structure 161, according to an aspect of the present disclosure. As shown in FIG. 6, the guide vanes 158 may have an airfoil shape and may include camber so as to be a curved guide vane. In this manner, the guide vanes 158 can receive the swirled fan airflow 170 and redirect the swirled fan airflow 170 to be an axial airflow in the axial direction A and into the bypass airflow passage 164 as the bypass air 168. Each of the guide vanes 158 may be arranged at an angle 172 with respect to the guide vane structure centerline axis 101'. While not shown in FIG. 6, any one or more of the guide vanes 158 may be constructed as a king strut that may be thicker than others of the guide vanes 158 and may include a hollow passage in its core to allow for other engine components to pass therethrough (e.g., oil lines, air lines, electrical lines, etc.).

Figure 7:
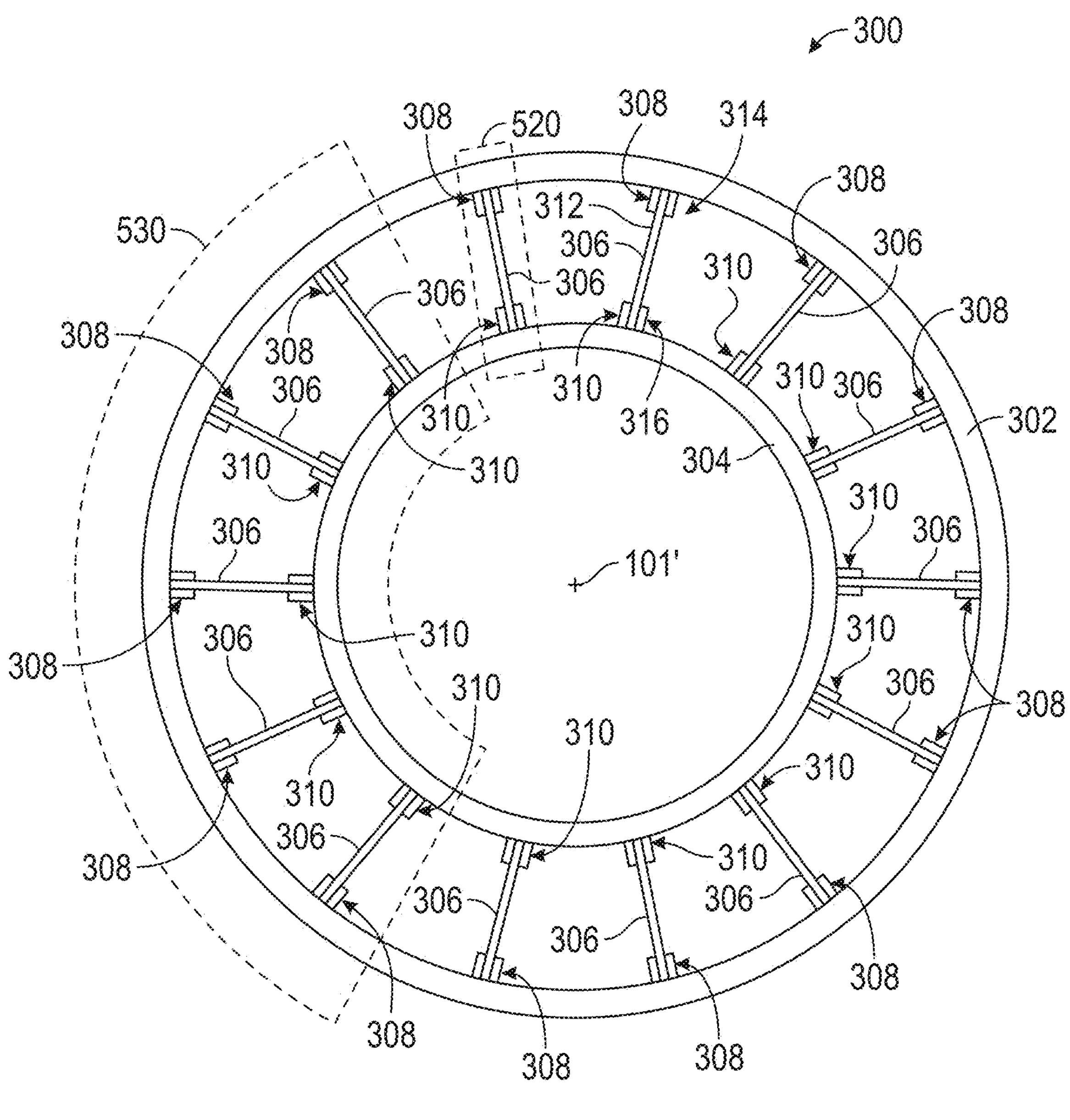
FIG. 7 is a schematic aft-looking layout of a preform assembly used in manufacturing a composite component, according to an aspect of the present disclosure.

FIG. 7 is a schematic aft-looking layout of a preform assembly 300 used in manufacturing a composite component, according to an aspect of the present disclosure. The preform assembly 300 of FIG. 7 is configured for manufacturing a vane structure, such as the guide vane structure 161 of FIG. 4 and FIG. 5. As will be described below, the preform assembly 300 is assembled using a mold tooling structure 548 (FIG. 23), and, for clarity, the mold tooling structure 548 is omitted from FIG. 7. In FIG. 7, the preform assembly 300 includes an outer shell hoop preform 302, an inner hub hoop preform 304, and a plurality of strut preforms 306. A plurality of outer shell pi-joint members 308 are connected to the outer shell hoop preform 302 and extend radially inward from the outer shell hoop preform 302 with respect to the guide vane structure centerline axis 101', and a plurality of inner hub pi-joint members 310 are connected to the inner hub hoop preform 304 and extend radially outward from the inner hub hoop preform 304 respect to the guide vane structure centerline axis 101'. The connection of the outer shell pi-joint members 308 to the outer shell hoop preform 302, and the connection of the inner hub pi-joint members 310 to the inner hub hoop preform 304 will be described in more detail below. Respective ones of the plurality of strut preforms 306 are connected to a respective one of the outer shell pi-joint members 308 and to a respective one of the inner hub pi-joint members 310 so as to connect the outer shell hoop preform 302 and the inner hub hoop preform 304 together. For example, a first strut preform 312 is connected to a first outer shell pi-joint member 314 and is connected to a first inner hub pi-joint member 316. The connection of the first strut preform 312 to the first outer shell pi-joint member 314 and to the first inner hub pi-joint member 316 will be described in more detail below.

Figure 8:
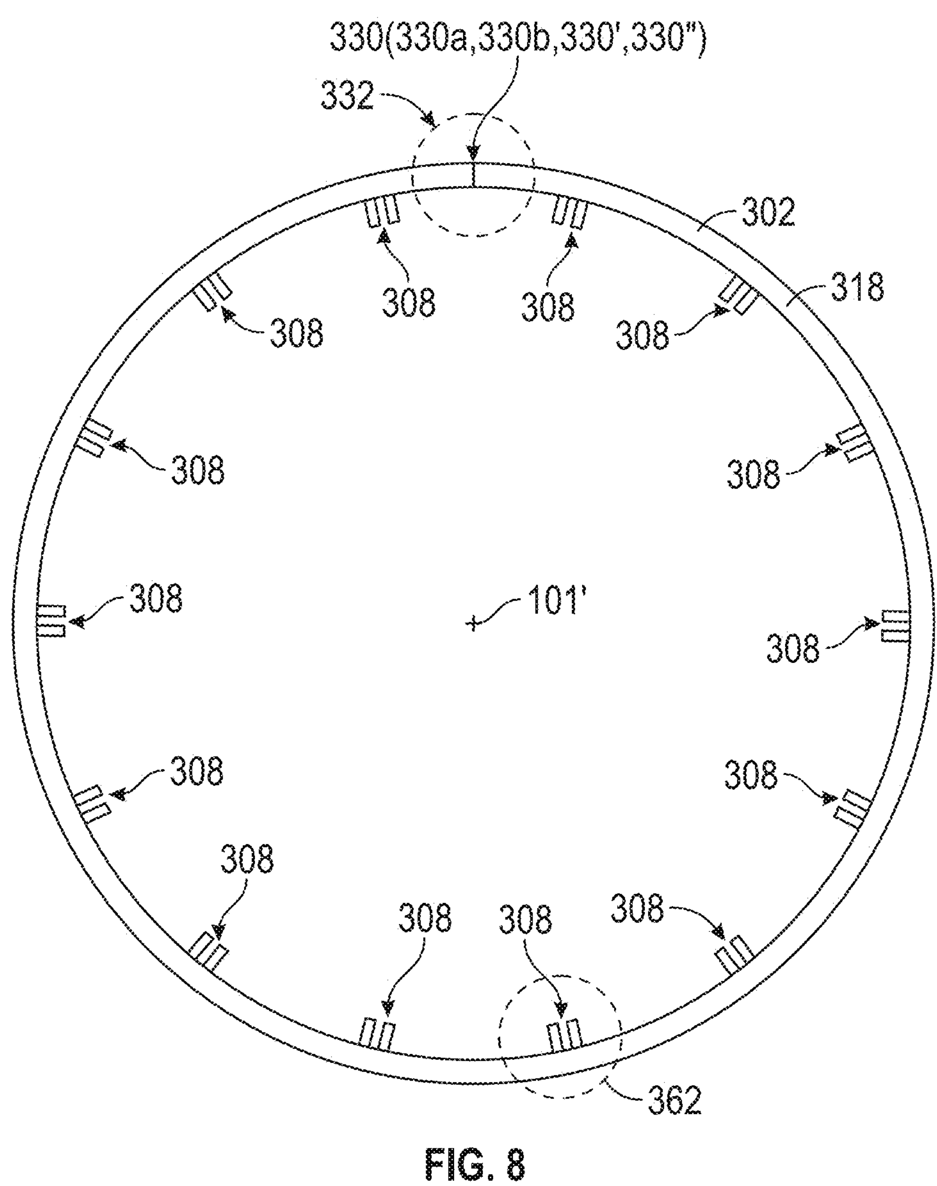
FIG. 8 is a schematic aft-looking layout of the outer shell hoop preform included in FIG. 7, according to an aspect of the present disclosure.
Figure 9:
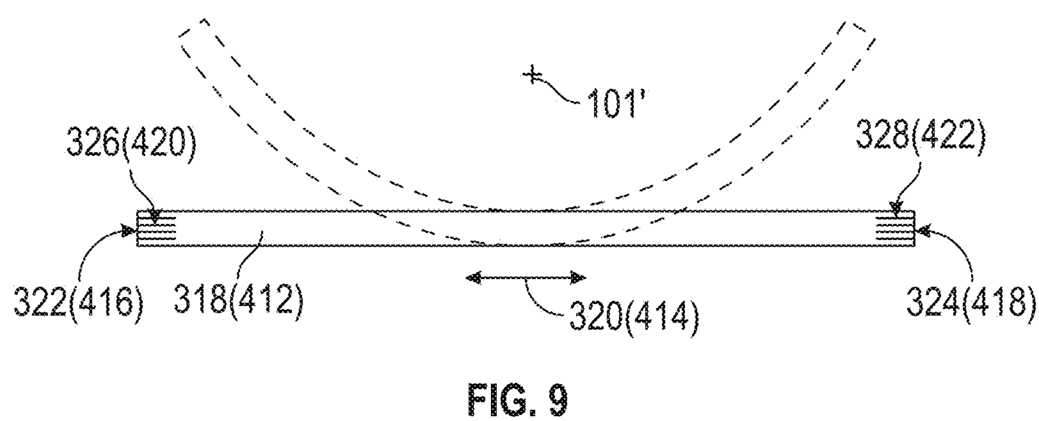
FIG. 9 is a schematic aft-looking layout of a flattened three-dimensional woven outer shell preform, according to an aspect of the present disclosure.

FIG. 8 is a schematic aft-looking layout of the outer shell hoop preform 302 of FIG. 7, according to an aspect of the present disclosure. FIG. 9 is a schematic aft-looking layout of a flattened three-dimensional woven outer shell preform 318, according to an aspect of the present disclosure. Referring collectively to FIG. 8 and FIG. 9, the three-dimensional woven outer shell preform 318 is woven as a flat preform extending in a first outer shell direction 320, and includes a first outer shell preform end 322 and a second outer shell preform end 324. The first outer shell preform end 322 includes a first outer shell connecting portion 326 and the second outer shell preform end 324 includes a second outer shell connecting portion 328. The flat three-dimensional outer shell preform 318 is installed onto the mold tooling structure 548 (FIG. 23) and wrapped around the molding tool structure 548 (simulated wrapping shown in dashed lines in FIG. 9), and the first outer shell connecting portion 326 and the second outer shell connecting portion 328 are connected together to form an outer shell joint 330 (FIG. 8) so as to form the outer shell hoop preform 302.

Figure 10A:
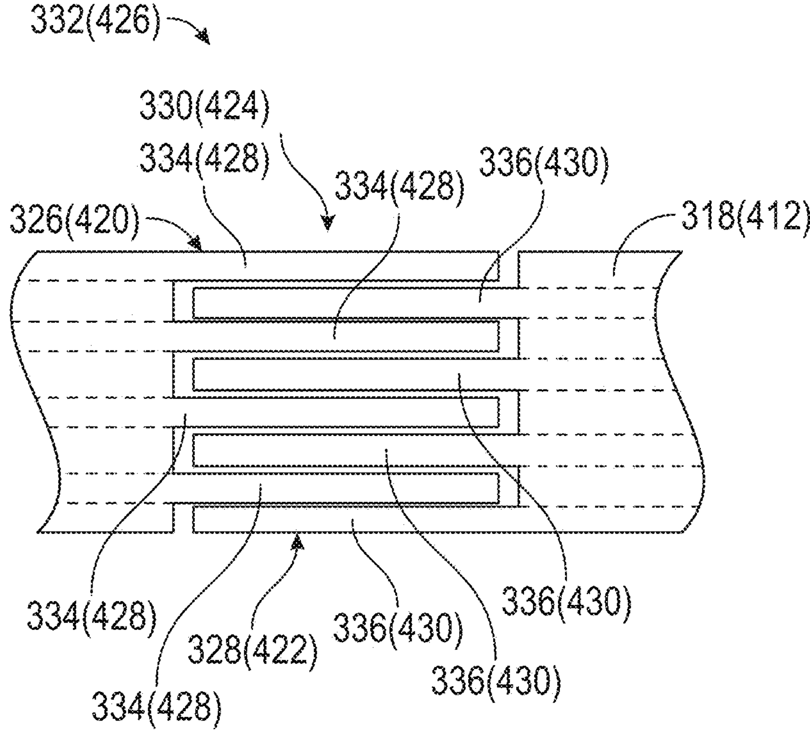
FIG. 10A is an enlarged detail view of an outer shell joint, taken at detail view 332 of FIG. 8, according to an aspect of the present disclosure.

FIG. 10A is an enlarged detail view of the outer shell joint 330, taken at detail view 332 of FIG. 8, according to an aspect of the present disclosure. While the outer shell 302 of FIG. 8 includes some curvature on either side of the outer shell joint 330, the curvature is not shown in FIG. 10A and is also not shown in any of the following alternate aspects to that of FIG. 10A for the outer shell joint 330 described below. In the FIG. 10A aspect, the first outer shell connecting portion 326 is shown to include a plurality of first bifurcated layers 334, and the second outer shell connecting portion 328 is shown to include a plurality of second bifurcated layers 336. The plurality of first bifurcated layers 334 and the plurality of second bifurcated layers 336 are generally overlapping finger layers that are joined together in an overlapping manner so as to form the outer shell joint 330, and, thereby, to form the outer shell hoop preform 302 (FIG. 8).

Figure 10B:
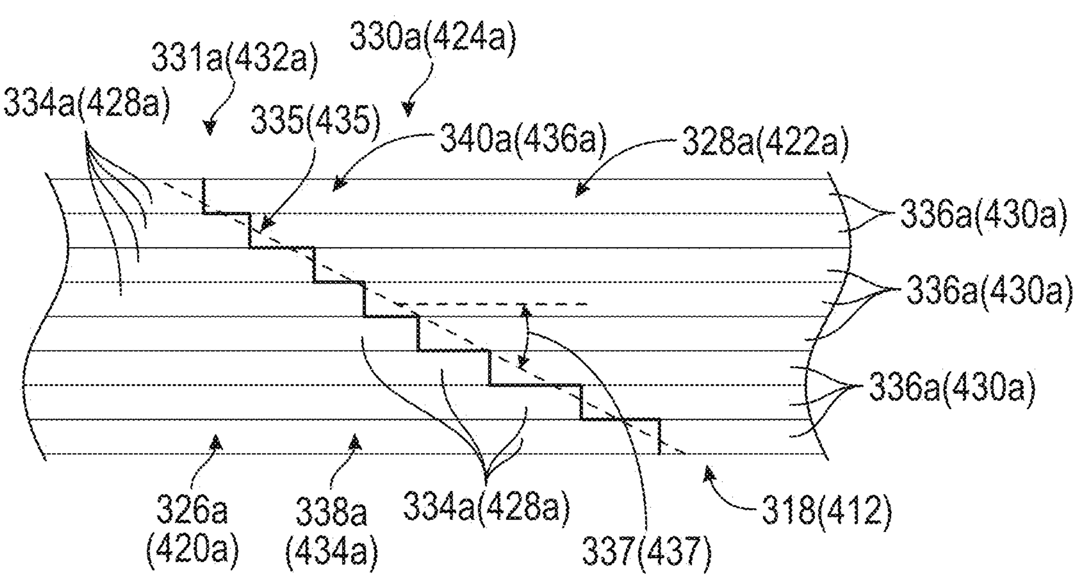
FIG. 10B depicts an alternate outer shell joint to that shown in FIG. 10A, according to an aspect of the present disclosure.

FIG. 10B depicts an alternate outer shell joint **330*a* to that shown in FIG. 10A, according to an aspect of the present disclosure. In the FIG. 10B aspect, a first outer shell connecting portion 326*a* is shown to include a first outer shell scarf joint connecting portion 338*a* that includes a plurality of first bifurcated layers 334*a* that are arranged to extend in a staggered manner along a scarf angle line 335 (shown generally as a dashed line), which may have a scarf angle 337, such as forty-five degrees. The scarf angle 337 is not limited to forty-five degrees and other angles may be implemented instead. Similarly, a second outer shell connecting portion 328*a* is shown to include a second outer shell scarf joint connecting portion 340*a* that includes a plurality of second bifurcated layers 336*a*, which are similarly arranged to extend in a staggered manner along the scarf angle line 335. The plurality of first bifurcated layers 334*a* and the plurality of second bifurcated layers 336*a* are joined together along the scarf angle line 335 so as to form an outer shell scarf joint 331*a*, which in the FIG. 10B aspect is a single scarf joint, and, thereby, to form the outer shell hoop preform 302**.

Figure 10C:
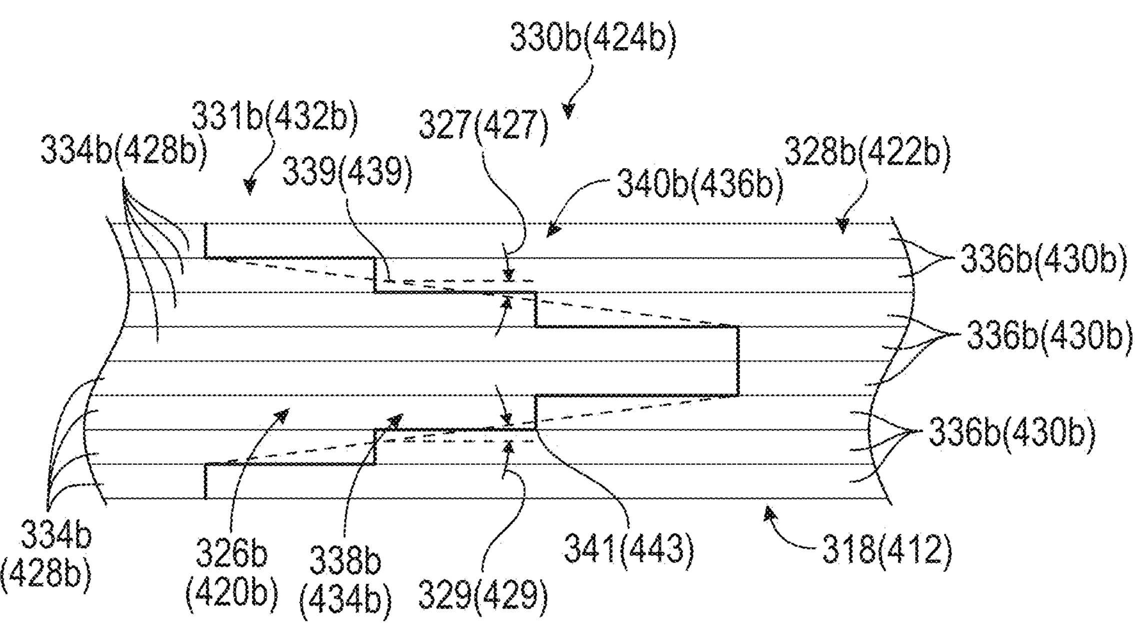
FIG. 10C depicts another alternate outer shell joint to that shown in FIG. 10A and FIG. 10B, according to another aspect of the present disclosure.

FIG. 10C depicts an alternate outer shell joint **330*b* to that shown in FIG. 10B, according to another aspect of the present disclosure. In the FIG. 10C aspect, a first outer shell connecting portion 326*b* is shown to include a first outer shell scarf joint connection portion 338*a* that includes a plurality of first bifurcated layers 334*b* that are arranged to extend in a staggered manner along a first scarf angle line 339 (shown generally as a dashed line) and a second scarf angle line 341, where the first scarf angle line 339 and the second scarf angle line 341 form generally a V shape with each other with respect to the first outer shell connecting portion 326***b*. The first scarf angle line 339 may be arranged at a first scarf joint angle 327 (e.g., thirty degrees) and the second scarf angle line 341 may be arranged a second scarf angle 329 (e.g., thirty degrees), although other angles may be implemented instead. Similarly, a second outer shell connecting portion 328*b* is shown to include a second outer shell scarf joint connecting portion 340*b* that includes a plurality of second bifurcated layers 336*b*, which are similarly arranged to extend in a staggered manner along the first scarf angle line 339 and along the second scarf angle line 341. The plurality of first bifurcated layers 334*b* and the plurality of second bifurcated layers 336*b* are joined together along the first scarf angle line 339 and the along the second scarf angle line 341 in a V-shaped joint so as to form an outer shell scarf joint 331*b*, which in the FIG. 10C aspect is a double scarf joint.

Figure 11:
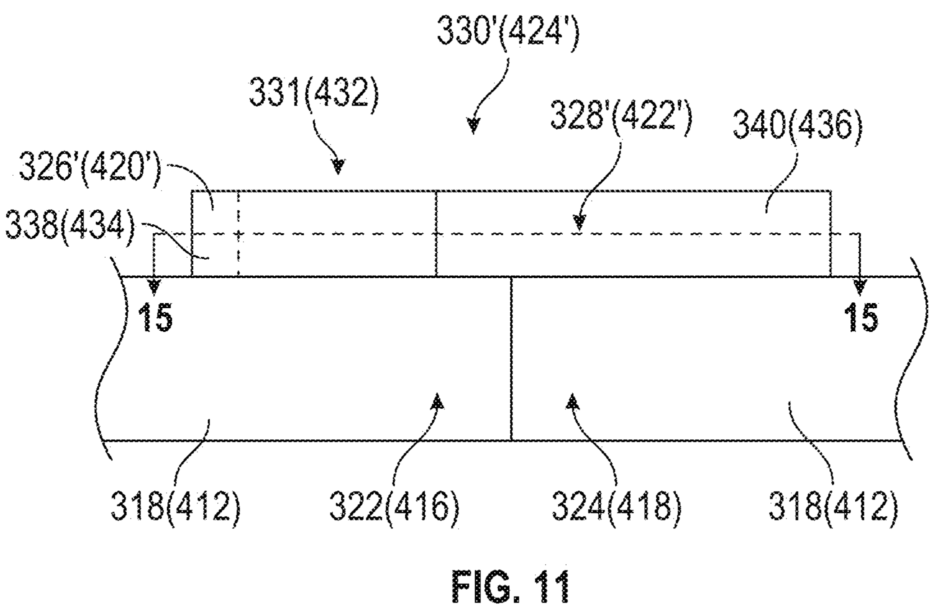
FIG. 11 depicts an alternate outer shell joint to that shown in FIG. 10A, according to another aspect of the present disclosure.

FIG. 11 depicts an alternate outer shell joint 330' to that shown in FIG. 10A, according to another aspect of the present disclosure. In FIG. 11, the alternate outer shell joint 330' is an outer shell overlap joint 331. In forming the outer shell overlap joint 331, the first outer shell preform end 322 of the outer shell preform 318 includes a first outer shell connecting portion 326' that includes a first outer shell overlap joint connecting portion 338, and the second outer shell preform end 324 includes a second outer shell connecting portion 328' that includes a second outer shell overlap joint connection portion 340. The first outer shell overlap joint connecting portion 338 and the second outer shell overlap joint connecting portion 340 are connected together as described below so as to form the outer shell overlap joint 331.

Figure 12:
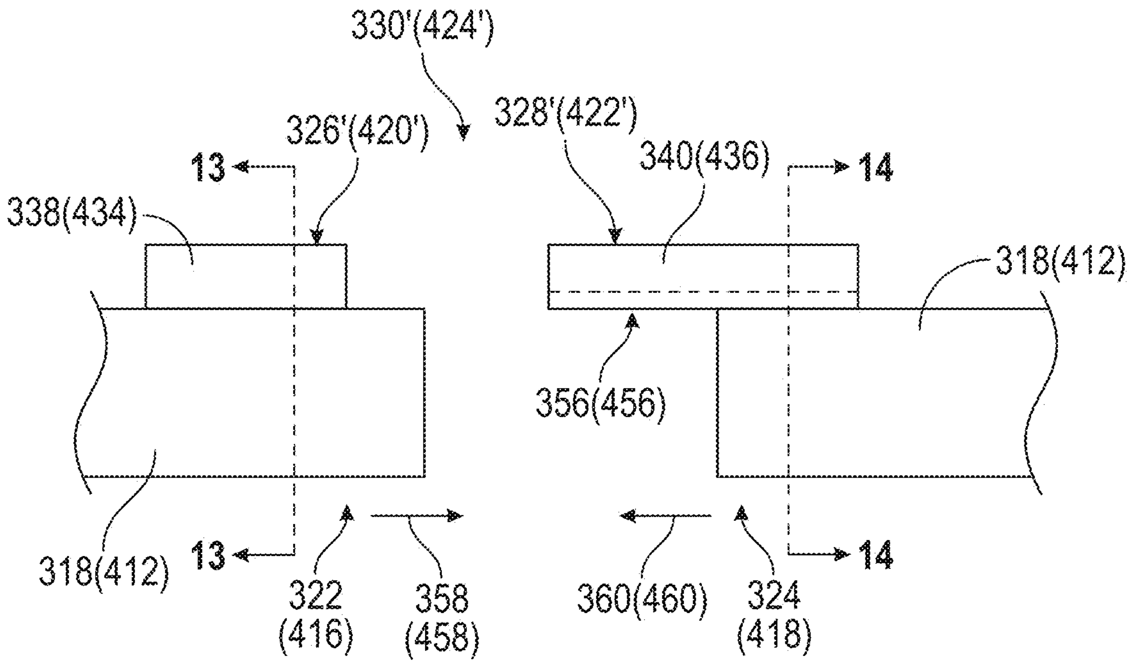
FIG. 12 depicts the alternate outer shell joint of FIG. 11 shown in a separated state, according to an aspect of the present disclosure.
Figure 13:
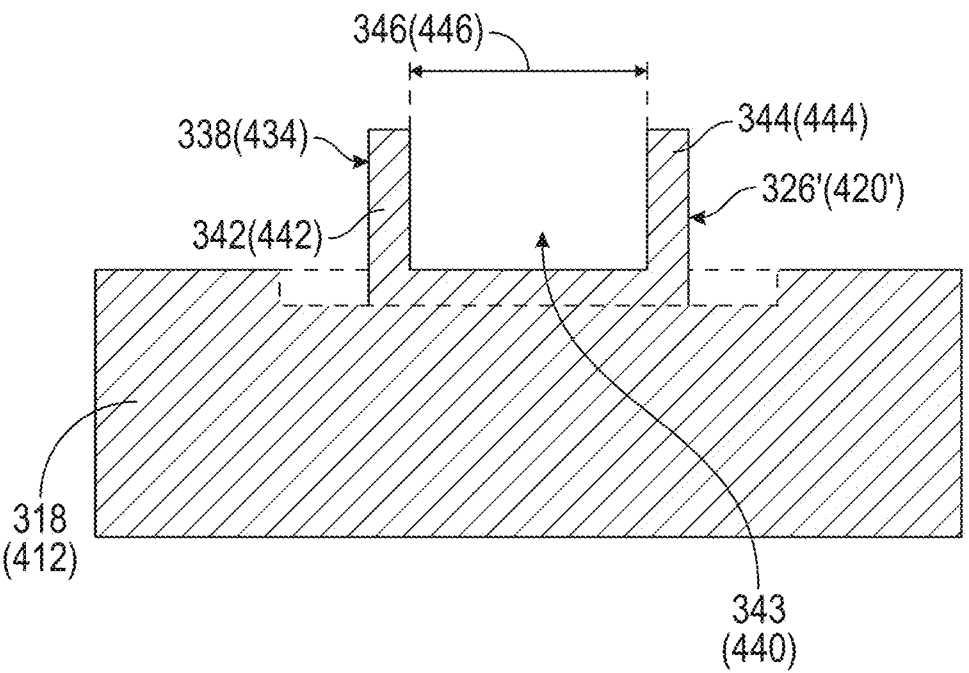
FIG. 13 is a partial cross-sectional view of a first outer shell preform end, taken at plane 13-13 of FIG. 12, according to an aspect of the present disclosure.
Figure 14:
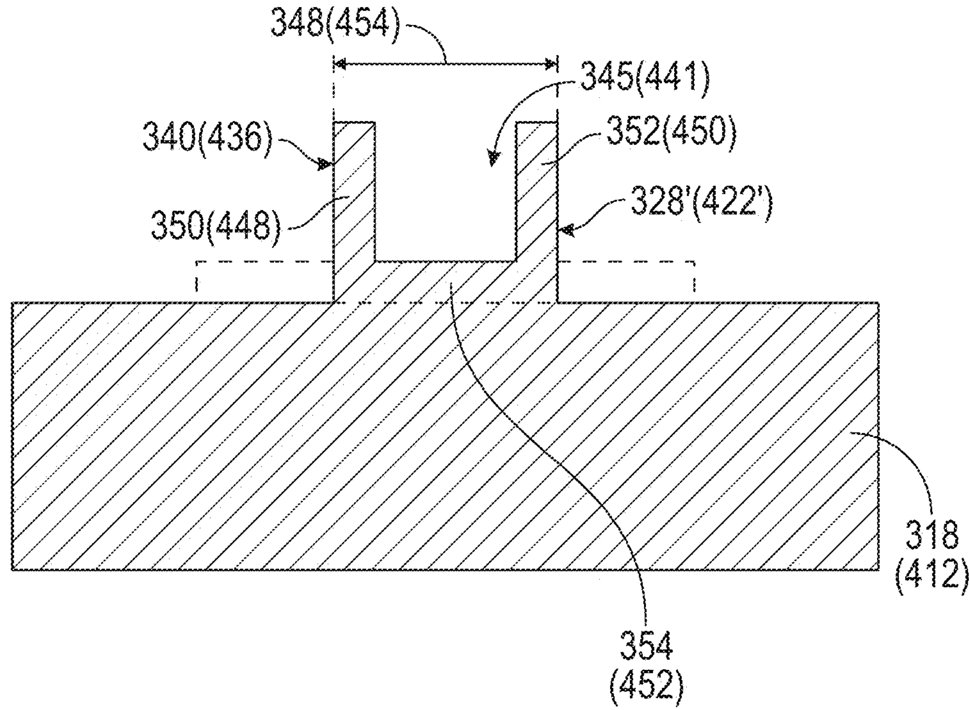
FIG. 14 is a partial cross-sectional view of a second outer shell preform end, taken at plane 14-14 of FIG. 12, according to an aspect of the present disclosure.

FIG. 12 depicts the alternate outer shell joint 330' of FIG. 11 in a separated state, according to an aspect of the present disclosure. FIG. 13 is a partial cross-sectional view of the first outer shell preform end 322, taken at plane 13-13 of FIG. 12, according to an aspect of the present disclosure. FIG. 14 is a partial cross-sectional view of the second outer shell preform end 324, taken at plane 14-14 of FIG. 12, according to an aspect of the present disclosure. Referring collectively to FIG. 11 to FIG. 14, the first outer shell overlap joint connecting portion 338 is shown to be a generally U-shaped channel 343 defined by a first overlap joint flange 342 and a second overlap joint flange 344 that are separated by an internal width 346. Each of the first overlap joint flange 342 and the second overlap joint flange 344 may be bifurcated portions of the outer shell preform 318 (shown with dashed lines in FIG. 13) that may be raised to extend from the outer shell preform 318 or may be separate flange preforms that are stitched to the outer shell preform 318.

The second outer shell overlap joint connecting portion 340 is also shown to be a generally U-shaped channel 345 defined by a third overlap joint flange 350, a fourth overlap joint flange 352, and a base 354 between the third overlap joint flange 350 and the fourth overlap joint flange 352. The base 354 is formed integrally with the outer shell preform 318, and the third overlap joint flange 350, and the fourth overlap joint flange 352 are formed integrally with the base 354, but are bifurcated from the outer shell preform 318. Thus, the third overlap joint flange 350 and the fourth overlap joint flange 352 may then be raised to extend from the outer shell preform 318, and an external width 348 of the second outer shell overlap joint connecting portion 340 is less than the internal width 346 of the first outer shell overlap joint connecting portion 338. In addition, a portion of the base 354, the third overlap joint flange 350, and the fourth overlap joint flange 352 extend beyond the second outer shell preform end 324 to define a second overlap joint connecting portion extension 356.

In forming the alternate outer shell joint 330', the second overlap joint connecting portion extension 356 is inserted into the U-shaped channel 343 of the first outer shell overlap joint connecting portion 338. The first outer shell preform end 322 and the second outer shell preform end 324 are then brought together (shown generally by arrow 358 and arrow 360 representing relative movement of the first outer shell preform end 322 and the second outer shell preform end 324, respectively) to form the alternate outer shell joint 330'. Thus, the alternate outer shell joint 330' of FIG. 12 may be considered as an overlapping joint in which the smaller width U-shaped channel 345 (FIG. 14) is inserted into the larger width U-shaped channel 343 (FIG. 13). To secure the alternate outer shell joint 330', the first overlap joint flange 342 and the fourth overlap joint flange 352 may be stitched together, and the second overlap joint flange 344 and the third overlap joint flange 350 may be stitched together.

Figure 15:
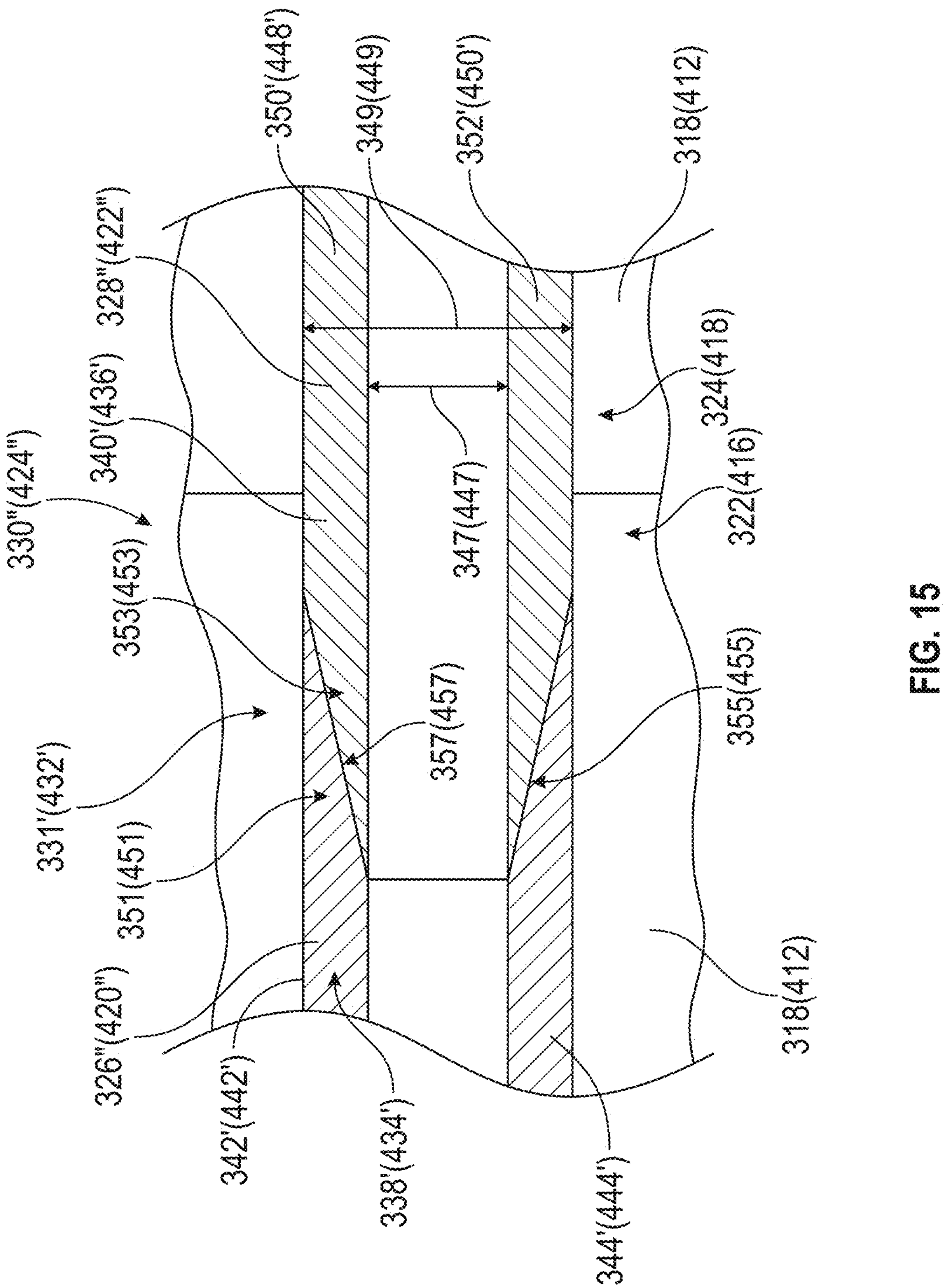
FIG. 15 is a partial cross-sectional view of an alternate outer shell joint to that shown in FIG. 13 and FIG. 14, taken at plane 15-15 of FIG. 11, according to an aspect of the present disclosure.

FIG. 15 is a partial cross-sectional view of an alternate outer shell joint 330" to that shown in FIG. 13 and FIG. 14, taken at plane 15-15 of FIG. 11, according to an aspect of the present disclosure. In FIG. 15, the alternate outer shell joint 330" is an outer shell scarf joint 331'. In forming the outer shell scarf joint 331', the first outer shell preform end 322 of the outer shell preform 318 includes a first outer shell connecting portion 326" that includes a first outer shell scarf joint connecting portion 338', and the second outer shell preform end 324 includes a second outer shell connecting portion 328" that includes a second outer shell scarf joint connection portion 340'. The first outer shell scarf joint connecting portion 338' includes a first scarf joint flange 342' and a second scarf joint flange 344', and the second outer shell scarf joint connecting portion 340' includes a third scarf joint flange 350' and a fourth scarf joint flange 352'. The first outer shell scarf joint connecting portion 338' and the second outer shell scarf joint connecting portion 340' are connected together as described below so as to form the outer shell scarf joint 331'.

In the FIG. 15 aspect, the first outer shell scarf joint connecting portion 338' may be a U-shaped channel similar to the U-shaped channel 343 of the FIG. 13 aspect, and the second outer shell scarf joint connecting portion 340' may also be a U-shaped channel similar to the U-shaped channel 345 of the FIG. 14 aspect. However, in contrast to the FIG. 13 aspect and the FIG. 14 aspect, in the FIG. 15 aspect, both the first outer shell scarf joint connecting portion 338' and the second outer shell scarf joint connecting portion 340' have a same external width 349 and a same internal width 347 of the respective U-shaped channels. In addition, an end portion 351 of the first outer shell scarf joint connecting portion 338' includes a diverging end portion 355, and an end portion 353 of the second outer shell scarf joint connecting portion 340' includes a converging end portion 357. The converging end portion 357 and the diverging end portion 355 are joined together by inserting the converging end portion 357 into the diverging end portion 355 to form the alternate outer shell joint 330". The converging end portion 357 and the diverging end portion 355 may then be stitched together, or connected together in any other manner, such as via a tackifier.

Figure 16:
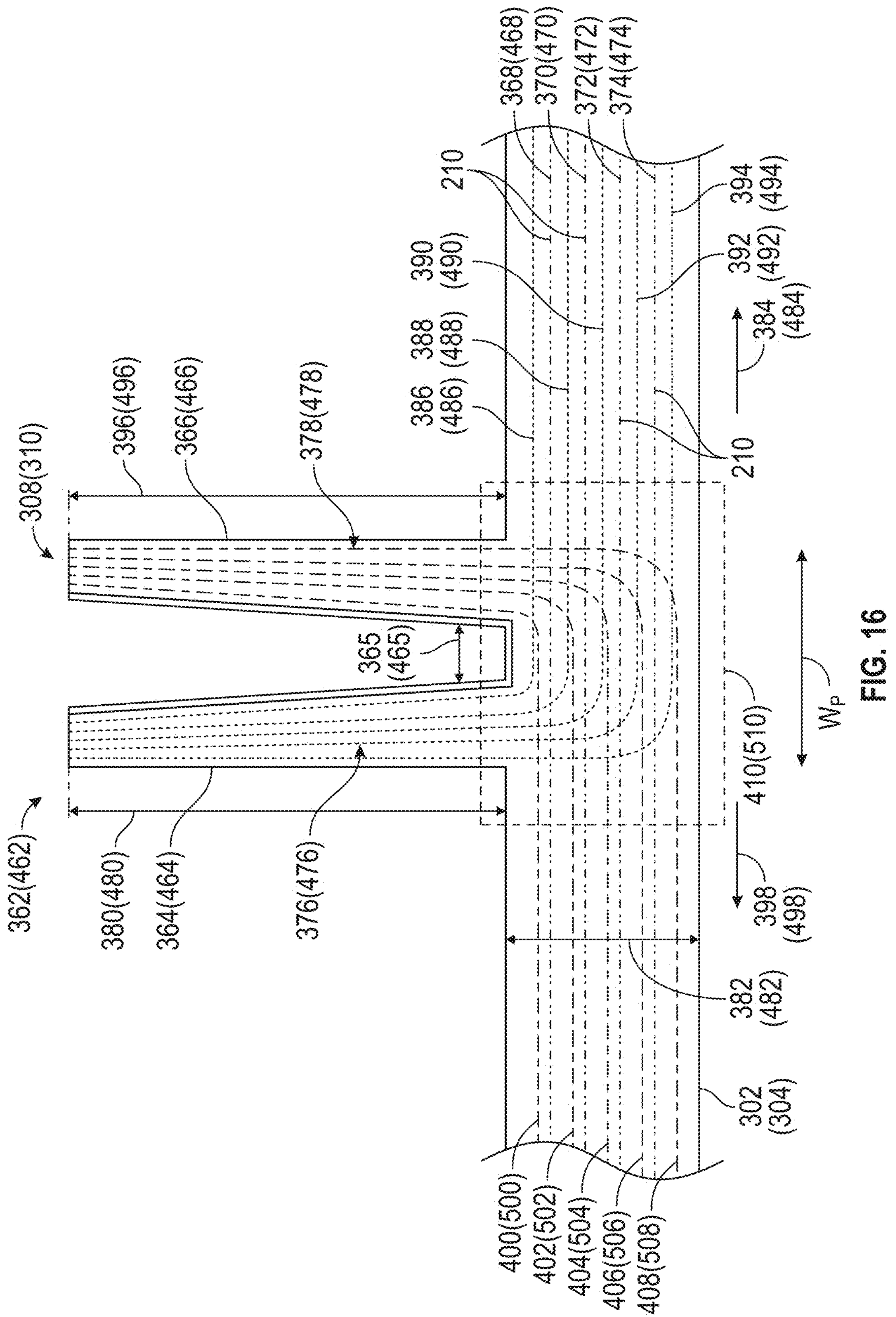
FIG. 16 is an enlarged schematic view of an outer shell pi-joint member, taken at detail view 362 of FIG. 8, according to an aspect of the present disclosure.

FIG. 16 is an enlarged schematic view of an outer shell pi-joint member 308, taken at detail view 362 of FIG. 8, according to an aspect of the present disclosure. While the outer shell 302 of FIG. 8 includes some curvature on either side of the outer shell pi-joint member 308 at detail view 362, the curvature is not shown in FIG. 16. In addition, while FIG. 16 depicts one of the plurality of outer shell pi-joint members 308, the arrangement of FIG. 16 is applicable to each of the plurality of outer shell pi-joint members 308. As will be described below, the arrangement of FIG. 16 is also applicable to each of the inner hub pi-joint members 310. As shown in FIG. 16, the outer shell pi-joint member 308 includes a first outer shell pi-joint preform portion 364 and a second outer shell pi-joint preform portion 366 that are separated by a gap 365. Each of the first outer shell pi-joint preform portion 364 and the second outer shell pi-joint preform portion 366 are woven as a three-dimensional woven fabric preform similar to any of the aspects shown in FIGS. 2A to 2D. In FIG. 16, warp fiber tows 210 (similar to warp fiber tows 210 of FIG. 2A) are depicted as being arranged extending in a warp direction $W_P$(which may be a hoop direction when the outer shell preform 318 is formed to define the outer shell hoop preform 302) and are arranged in four layers (similar to the warp fiber layers 212 of FIG. 2A), including a first layer 368, a second layer 370, a third layer 372, and a fourth layer 374. While FIG. 16 depicts four layers, more than four layer layers or fewer than four layers may be utilized instead, and, the four layers of FIG. 16 are merely exemplary. For reference, weft fiber tows (not shown in FIG. 16) similar to the weft fiber tows 220 of FIG. 2A run into and out of the page of FIG. 16 and are also arranged in a plurality of layers, similar to the weft fiber layers 222 of FIG. 2A.

The first outer shell pi-joint preform portion 364 includes a plurality of first connecting fiber tows 376 and the second outer shell pi-joint preform portion 366 includes a plurality of second connecting fiber tows 378. Each of the first connecting fiber tows 376 and each of the second connecting fiber tows 378 may be warp fiber tows similar to the warp fiber tows 210 of FIG. 2A. The first outer shell pi-joint preform portion 364 also includes weft fiber tows (not shown) and interlocking fiber tows (not shown), similar to the weft fiber tows 220 and the interlocking fiber tows 230 of FIG. 2A, so as to form a three-dimensional woven fabric preform, but only for a portion of the first outer shell pi-joint preform portion 364 extending along a length 380. The plurality of first connecting fiber tows 376 (i.e., the warp fiber tows), however, extend beyond the length 380 and are woven to extend through a thickness 382 of the outer shell hoop preform 302, and are woven to extend in a first direction 384 with respect to the outer shell pi-joint member 308 within the outer shell hoop preform 302. For example, as shown in FIG. 16, the plurality of first connecting fiber tows 376 includes five first connecting fiber tows 376, including a first fiber tow 386, a second fiber tow 388, a third fiber tow 390, a fourth fiber tow 392, and a fifth fiber tow 394. While FIG. 16 depicts, for example, a single first fiber tow 386, a plurality of first fiber tows 386 may be arranged in a row that extends into and out of the page, but the following description is made with regard to the single first fiber tow 386 for brevity. Likewise, a plurality of second fiber tows 388 may be included in a row, a plurality of third fiber tows 390 may be included in row, a plurality of fourth fiber tows 392 may be included in a row, and a plurality of fifth fiber tows 394 may be included in a row.

Each of the first connecting fiber tows 376 is also woven in a respective layer within the outer shell hoop preform 302. For example, the first fiber tow 386 of the plurality of first connecting fiber tows 376 is woven to extend in the first direction 384 on top of the first layer 368 of the outer shell hoop preform 302. The second fiber tow 388 is woven to extend in the first direction 384 between the first layer 368 and the second layer 370 of the outer shell hoop preform 302. The third fiber tow 390 is woven to extend in the first direction 384 between the second layer 370 and the third layer 372 of the outer shell hoop preform 302. The fourth fiber tow 392 is woven to extend in the first direction 384 between the third layer 372 and the fourth layer 374 of the outer shell hoop preform 302. The fifth fiber tow 394 is woven to extend in the first direction 384 below (or adjacent to) the fourth layer 374 of the outer shell hoop preform 302.

The second outer shell pi-joint preform portion 366 includes the plurality of second connecting fiber tows 378 and also includes weft fiber tows (not shown) and interlocking fiber tows (not shown), similar to the weft fiber tows 220 and the interlocking fiber tows 230 of FIG. 2A, so as to form a three-dimensional woven fabric preform, but only for a portion of the second outer shell pi-joint preform portion 366 extending along a length 396. The plurality of second connecting fiber tows 378 (i.e., the warp fiber tows), however, extend beyond the length 396 and are woven to extend through the thickness 382 of the outer shell hoop preform 302, and are woven to extend in a second direction 398 with respect to the outer shell pi-joint member 308 within the outer shell hoop preform 302. For example, as shown in FIG. 16, the plurality of second connecting fiber tows 378 includes five second connecting fiber tows 378, including a sixth fiber tow 400, a seventh fiber tow 402, an eighth fiber tow 404, a ninth fiber tow 406, and a tenth fiber tow 408. While FIG. 16 depicts, for example, a single sixth fiber tow 400, a plurality of sixth fiber tows 400 may be arranged in a row that extends into and out of the page, but the following description is made with regard to the single sixth fiber tow 400 for brevity. Likewise, a plurality of seventh fiber tows 402 may be included in a row, a plurality of eighth fiber tows 404 may be included in a row, a plurality of ninth fiber tows 406 may be included in a row, and a plurality of tenth fiber tows 408 may be included in a row.

Each of the second connecting fiber tows 378 is also woven in a respective layer within the outer shell hoop preform 302. For example, the sixth fiber tow 400 of the plurality of second connecting fiber tows 378 is woven to extend in the second direction 398 on top of the first layer 368 of the outer shell hoop preform 302. The seventh fiber tow 402 is woven to extend in the second direction 398 between the first layer 368 and the second layer 370 of the outer shell hoop preform 302. The eighth fiber tow 404 is woven to extend in the second direction 398 between the second layer 370 and the third layer 372 of the outer shell hoop preform 302. The ninth fiber tow 406 is woven to extend in the second direction 398 between the third layer 372 and the fourth layer 374 of the outer shell hoop preform 302. The tenth fiber tow 408 is woven to extend in the second direction 398 below (or adjacent to) the fourth layer 374 of the outer shell hoop preform 302.

Thus, with the foregoing weaving process of FIG. 16 with the first fiber tow 386 through the tenth fiber tow 408, a portion of each of the first connecting fiber tows 376 of the first outer shell pi-joint preform portion 364, and a portion of the each of the second connecting fiber tows 378 of the second outer shell pi-joint preform portion 366, overlap with one another in an overlapping zone 410 of the outer shell hoop preform 302.

Figure 17:
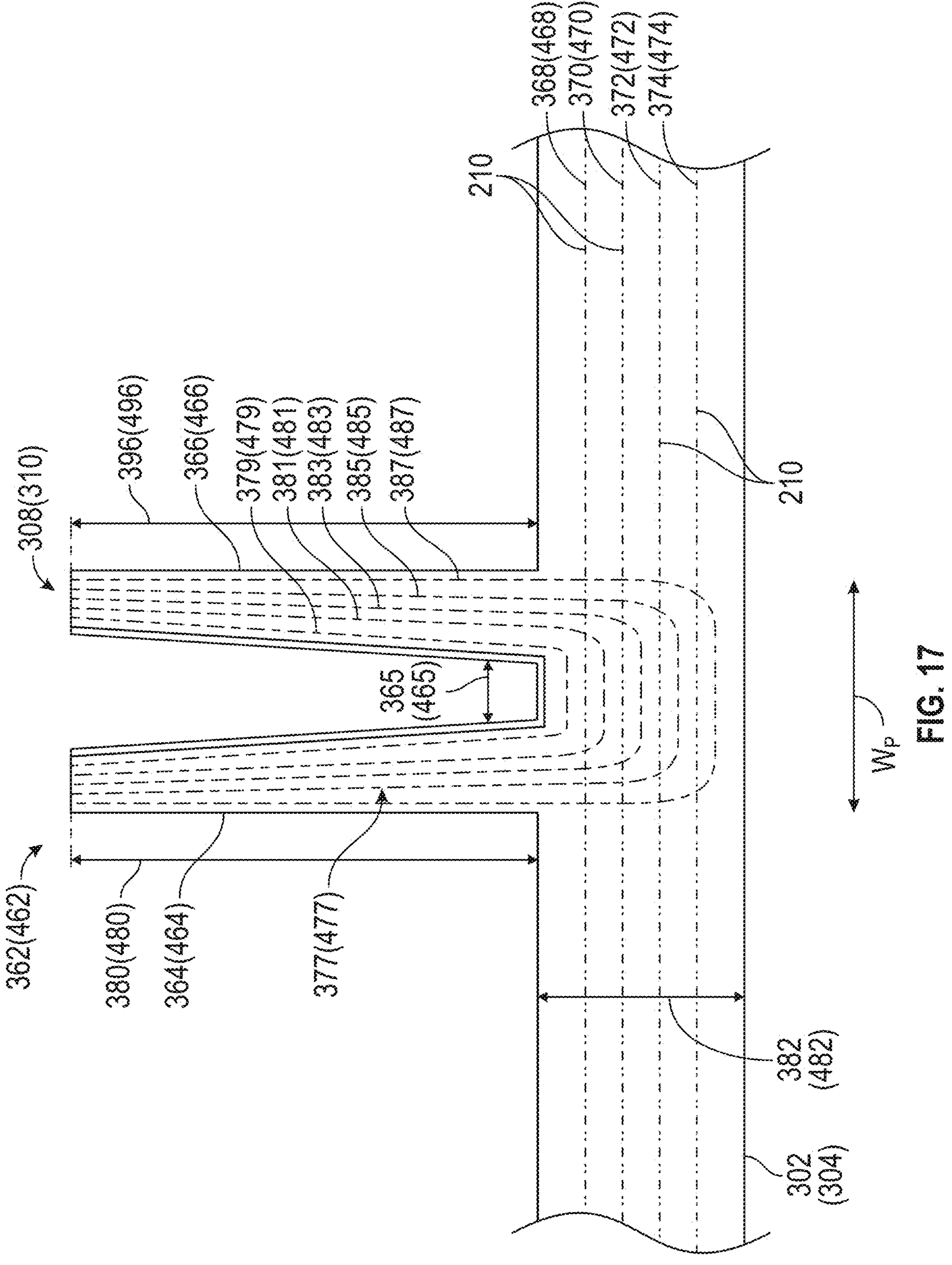
FIG. 17 is a schematic view of an alternate outer shell pi-joint member to that shown in FIG. 16, according to an aspect of the present disclosure.

FIG. 17 is a schematic view of an alternate outer shell pi-joint member to that shown in FIG. 16, according to an aspect of the present disclosure. In FIG. 17, in the same manner as for FIG. 16, the curvature on either side of the outer shell pi-joint member at detail view 362 is not shown in FIG. 17. In the FIG. 17 aspect, elements that are the same as those in the FIG. 16 aspect have the same reference numerals and the description of those elements is equally applicable to the FIG. 17 aspect. In contrast to the FIG. 16 aspect, however, in the FIG. 17 aspect, the first outer shell pi-joint preform portion 364 and the second outer shell pi-joint preform portion 366 are connected to the outer shell hoop preform 302 with a plurality of common connecting fiber tows 377 rather than being formed with the first connecting fiber tows 376 and the second connecting fiber tows 378 (FIG. 16). Each of the plurality of common connecting fiber tows 377 are also woven in a respective layer within the outer shell hoop preform 302. For example, a first common connecting fiber tow 379 of the plurality of common connecting fiber tows 377 is woven on top of the first layer 368 of the outer shell hoop preform 302 so as to connect both first outer shell pi-joint preform portion 364 and the second outer shell pi-joint preform portion 366 to the outer shell hoop preform 302. A second common connecting fiber tow 381 is woven between the first layer 368 and the second layer 370 of the outer shell hoop preform 302 so as to connect both first outer shell pi-joint preform portion 364 and the second outer shell pi-joint preform portion 366 to the outer shell hoop preform 302. A third common connecting fiber tow 383 is woven between the second layer 370 and the third layer 372 of the outer shell hoop preform 302 so as to connect both first outer shell pi-joint preform portion 364 and the second outer shell pi-joint preform portion 366 to the outer shell hoop preform 302. A fourth common connecting fiber tow 385 is woven to between the third layer 372 and the fourth layer 374 of the outer shell hoop preform 302 so as to connect both first outer shell pi-joint preform portion 364 and the second outer shell pi-joint preform portion 366 to the outer shell hoop preform 302. A fifth common connecting fiber tow 387 is woven below (or adjacent to) the fourth layer 374 of the outer shell hoop preform 302 so as to connect both first outer shell pi-joint preform portion 364 and the second outer shell pi-joint preform portion 366 to the outer shell hoop preform 302. Thus, by looping each of the plurality of common connecting fiber tows 377 through the respective layers of the outer shell hoop preform 302, both the first outer shell pi-joint preform portion 364 and the second outer shell pi-joint preform portion 366 can be connected and can form a stronger outer shell pi-joint.

Figure 18:
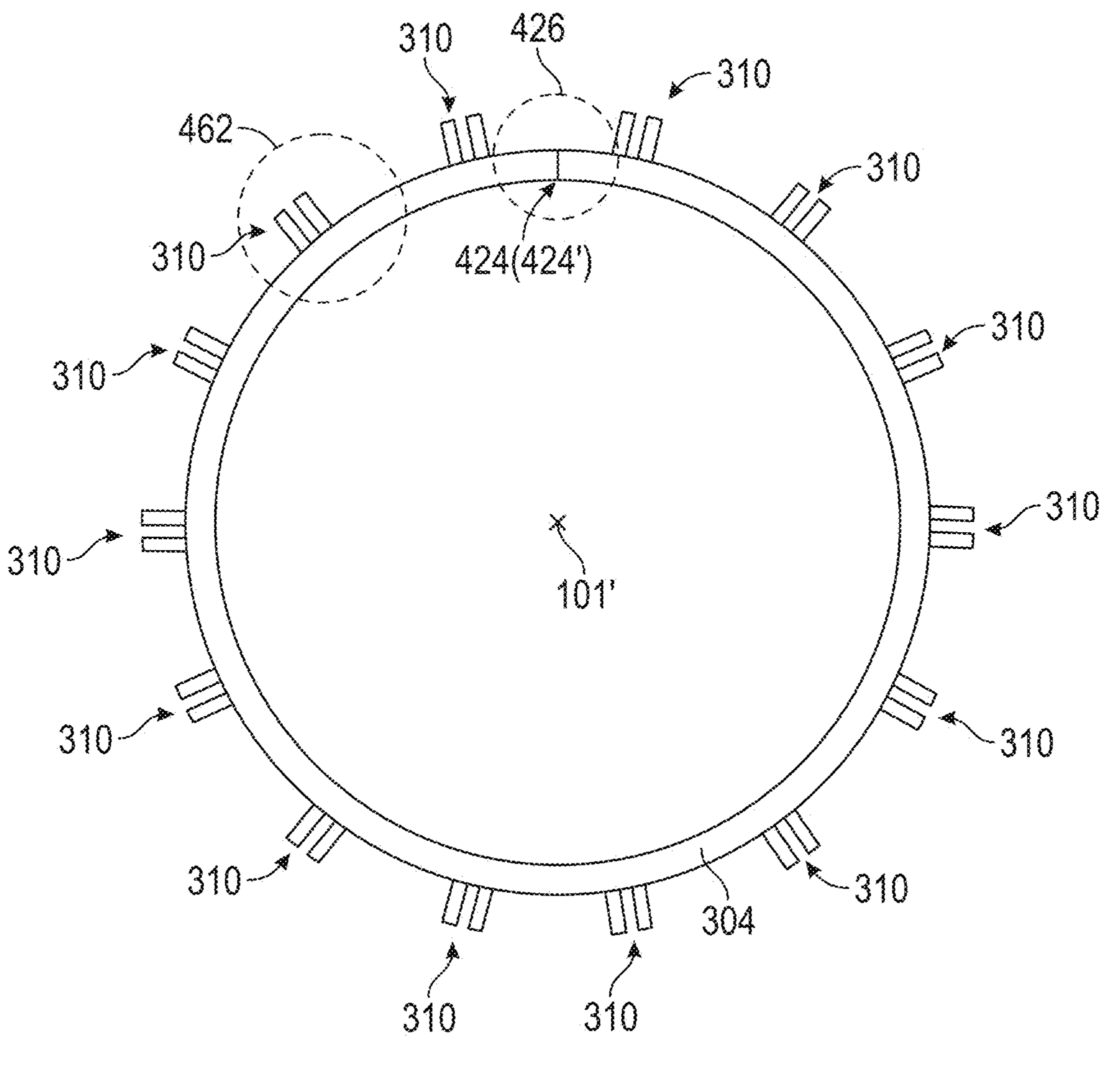
FIG. 18 is a schematic aft-looking layout of an inner hub hoop preform included in FIG. 7, according to an aspect of the present disclosure.

FIG. 18 is a schematic aft-looking layout of the inner hub hoop preform 304 included in FIG. 7, according to an aspect of the present disclosure. The inner hub hoop preform 304 may be constructed in a similar manner to that of the outer shell hoop preform 302. Thus, the following description of the construction of the inner hub hoop preform 304 will refer back to the description of FIG. 9 through FIG. 16. Referring back to FIG. 9, as well as FIG. 18, the inner hub hoop preform 304 is constructed of a three-dimensional woven inner hub preform 412 that is woven as a flat preform extending in a first inner hub direction 414, and includes a first inner hub preform end 416 and a second inner hub preform end 418. The first inner hub preform end 416 includes a first inner hub connecting portion 420, and the second inner hub preform end 418 includes a second inner hub connecting portion 422. The flat three-dimensional inner hub preform 412 is installed onto the mold tooling structure 548 (FIG. 23) and wrapped around the molding tool structure 548 (simulated wrapping shown in dashed lines in FIG. 9), and the first inner hub connecting portion 420 and the second inner hub connecting portion 422 are connected together to form an inner hub joint 424 (FIG. 18) so as to form the inner hub hoop preform 304.

Referring back to FIG. 10A, for the inner hub joint 424, depicted therein is an enlarged detail view of the inner hub joint 424, taken at detail view 426 of FIG. 18, according to an aspect of the present disclosure. In FIG. 10A, for the inner hub aspect, the first inner hub connecting portion 420 is shown to include a plurality of first bifurcated layers 428, and the second inner hub connecting portion 422 is shown to include a plurality of second bifurcated layers 430. The plurality of first bifurcated layers 428 and the plurality of second bifurcated layers 430 are joined together in an overlapping manner as described above for the outer shell joint 330 so as to form the inner hub joint 424, and, thereby, to form the inner hub hoop preform 304.

Referring back to FIG. 10B, depicted therein is an alternate inner hub joint **424*a* according to an aspect of the present disclosure. In the FIG. 10B aspect, a first inner hub connecting portion 420*a* is shown to include a first inner hub scarf joint connecting portion 434*a* that includes a plurality of first bifurcated layers 428*a* that are arranged to extend in a staggered manner along a scarf angle line 435 (shown generally as a dashed line), which may have a scarf angle 437, such as forty-five degrees. The scarf angle 437 is not limited to forty-five degrees and other angles may be implemented instead. Similarly, a second outer shell connecting portion 422*a* is shown to include a second inner hub scarf joint connecting portion 436*a* that includes a plurality of second bifurcated layers 430*a*, which are similarly arranged to extend in a staggered manner along the scarf angle line 435. The plurality of first bifurcated layers 428*a* and the plurality of second bifurcated layers 430*a* are joined together along the scarf angle line 435 so as to form an inner hub scarf joint 432*a*, which in the FIG. 10B aspect is a single scarf joint, and, thereby, to form the inner hub hoop preform 304**.

Referring back to FIG. 10C, depicted therein is an alternate inner hub joint **424*b* to that shown in FIG. 10B, according to another aspect of the present disclosure. In the FIG. 10C aspect, a first inner hub connecting portion 420*b* is shown to include a first inner hub scarf joint connecting portion 434*b* that includes a plurality of first bifurcated layers 428*b* that are arranged to extend in a staggered manner along a first scarf angle line 439 (shown generally as a dashed line) and a second scarf angle line 443, where the first scarf angle line 439 and the second scarf angle line 443 form a generally V shape with each other with respect to the first inner hub connecting portion 420*b*. The first scarf angle line 439 may be arranged at a first scarf joint angle 427 (e.g., thirty degrees) and the second scarf angle line 443 may be arranged a second scarf angle 429 (e.g., thirty degrees), although other angles may be implemented instead. Similarly, a second inner hub connecting portion 422*b* is shown to include a second inner hub scarf joint connecting portion 436*b* that includes a plurality of second bifurcated layers 430*b*, which are similarly arranged to extend in a staggered manner along the first scarf angle line 439 and along the second scarf angle line 443. The plurality of first bifurcated layers 428*b* and the plurality of second bifurcated layers 430*b* are joined together along the first scarf angle line 439 and the along the second scarf angle line 443 in a V-shaped joint so as to form an inner hub scarf joint 432*b*, which in the FIG. 10**C aspect is a double scarf joint.

Referring back to FIG. 11, for the inner hub aspect, depicted therein is an alternate inner hub joint 424' to that shown in FIG. 10, according to another aspect of the present disclosure. In FIG. 11, the alternate inner hub joint 424' is an inner hub overlap joint 432. In forming the inner hub overlap joint 432, the first inner hub preform end 416 of the inner hub preform 412 includes a first inner hub connecting portion 420' that includes a first inner hub overlap joint connecting portion 434, and the second inner hub preform end 418 includes a second inner hub connecting portion 422' that includes a second inner hub overlap joint connection portion 436. The first inner hub overlap joint connecting portion 434 and the second inner hub overlap joint connecting portion 436 are connected together, as described below, so as to form the inner hub overlap joint 432.

Referring back to FIG. 12, for the inner hub aspect, depicted therein is the alternate inner hub joint 424' of FIG. 11 in a separated state, according to an aspect of the present disclosure. Referring back to FIG. 13, for the inner hub aspect, depicts a partial cross-sectional view of the first inner hub preform end 416 at plane 13-13 of FIG. 12, and, in FIG. 14, for the inner hub aspect, depicted therein is a partial cross-sectional view of the second inner hub preform end 418 at plane 14-14 of FIG. 12. Referring collectively to FIGS. 11 to 14, for the inner hub aspect, the first inner hub overlap joint connecting portion 434 is shown to be a generally U-shaped channel 440 defined by a first overlap joint flange 442 and a second overlap joint flange 444 that are separated by an internal width 446. Each of the first overlap joint flange 442 and the second overlap joint flange 444 may be bifurcated portions of the inner hub preform 412 (shown with dashed lines in FIG. 13) that may be raised to extend from the inner hub preform 412, or may be separate flange preforms that are stitched to the inner hub preform 412.

The second inner hub overlap joint connecting portion 436 is also shown to be a generally U-shaped channel 441 defined by a third overlap joint flange 448, a fourth overlap joint flange 450, and a base 452 between the third overlap joint flange 448 and the fourth overlap joint flange 450. The base 452 is formed integrally with the inner hub preform 412, and the third overlap joint flange 448, and the fourth overlap joint flange 450 are formed integrally with the base 452, but are bifurcated from the inner hub preform 412. Thus, the third overlap joint flange 448 and the fourth overlap joint flange 450 may then be raised to extend from the inner hub preform 412, and an external width 454 of the second inner hub overlap joint connecting portion 436 is less than the internal width 446 of the first inner hub overlap joint connecting portion 434. In addition, a portion of the base 452, the third overlap joint flange 448, and the fourth overlap joint flange 450 extend beyond the second inner hub preform end 418 to define a second overlap joint connecting portion extension 456.

In forming the alternate inner hub joint 424', the second overlap joint connecting portion extension 456 is inserted into the U-shaped channel 440 of the first inner hub overlap joint connecting portion 434. The first inner hub preform end 416 and the second inner hub preform end 418 are then brought together (shown generally by arrow 458 and arrow 460 representing relative movement of the first inner hub preform end 416 and the second inner hub preform end 418, respectively) to form the alternate inner hub joint 424'. To secure the alternate inner hub joint 424', the first overlap joint flange 442 and the fourth overlap joint flange 450 may be stitched together, and the second overlap joint flange 444 and the third overlap joint flange 448 may be stitched together.

Referring back to FIG. 15, the aspects depicted therein are also applicable to the inner hub hoop preform 304 to form an alternate inner hub joint 424". The alternate inner hub joint 424" is an alternate inner hub scarf joint 432'. In forming the inner hub scarf joint 432', the first inner hub preform end 416 of the inner hub preform 412 includes a first inner hub connecting portion 420" that includes a first inner hub scarf joint connecting portion 434', and the second inner hub preform end 418 includes a second inner hub connecting portion 422" that includes a second inner hub scarf joint connection portion 436'. The first inner hub scarf joint connecting portion 434' includes a first scarf joint flange 442' and a second scarf joint flange 444', and the second inner hub scarf joint connecting portion 436' includes a third scarf joint flange 448' and a fourth scarf joint flange 450'. The first inner hub scarf joint connecting portion 434' and the second inner hub scarf joint connecting portion 436' are connected together as described below so as to form the inner hub scarf joint 432'.

In the FIG. 15 aspect, the first inner hub scarf joint connecting portion 434' may be a U-shaped channel similar to the U-shaped channel 440 of the FIG. 13 aspect, and the second inner hub scarf joint connecting portion 436' may also be a U-shaped channel similar to the U-shaped channel 441 of the FIG. 14 aspect. However, in contrast to the FIG. 13 aspect and the FIG. 14 aspect, in the FIG. 15 aspect, both the first inner hub scarf joint connecting portion 434' and the second inner hub scarf joint connecting portion 436' have a same external width 449 and a same internal width 447 of the respective U-shaped channels. In addition, an end portion 451 of the first inner hub scarf joint connecting portion 434' includes a diverging end portion 455, and an end portion 453 of the second inner hub scarf joint connecting portion 436' includes a converging end portion 457. The converging end portion 457 and the diverging end portion 455 are joined together by inserting the converging end portion 457 into the diverging end portion 455 to form the alternate outer shell joint 330".

Referring back to FIG. 16, as was stated above, the arrangement of FIG. 16 described for the outer shell pi-joint members 308 is also applicable for the inner hub pi-joint members 310, and, therefore, is applicable to a detail view 462 of FIG. 18. While the inner hub 304 of FIG. 18 includes some curvature on either side of the inner hub pi-joint member 310 at detail view 462, the curvature is not shown in FIG. 16. As shown in FIG. 16, the inner hub pi-joint member 310 includes a first inner hub pi-joint preform portion 464 and a second inner hub pi-joint preform portion 466 that are separated by a gap 465. Each of the first inner hub pi-joint preform portion 464 and the second inner hub pi-joint preform portion 466 are woven as a three-dimensional woven fabric preform, similar to any of the aspects shown in FIGS. 2A to 2D. In FIG. 16, warp fiber tows 210 (similar to warp fiber tows 210 of FIG. 2A) are depicted as being arranged extending in a warp direction $W_P$ (which may be a hoop direction when the inner hub preform 412 is formed to define the inner hub hoop preform 304) and are arranged in four layers (similar to the warp fiber layers 212 of FIG. 2A), including a first layer 468, a second layer 470, a third layer 472, and a fourth layer 474. For reference, weft fiber tows (not shown in FIG. 16) similar to the weft fiber tows 220 of FIG. 2A run into and out of the page of FIG. 16 and are also arranged in a plurality of layers, similar to the weft fiber layers 222 of FIG. 2A.

The first inner hub pi-joint preform portion 464 includes a plurality of first connecting fiber tows 476 and the second inner hub pi-joint preform portion 466 includes a plurality of second connecting fiber tows 478. Each of the first connecting fiber tows 476 and each of the second connecting fiber tows 478 may be warp fiber tows similar to the warp fiber tows 210 of FIG. 2A. The first inner hub pi-joint preform portion 464 also includes weft fiber tows (not shown) and interlocking fiber tows (not shown), similar to the weft fiber tows 220 and the interlocking fiber tows 230 of FIG. 2A, so as to form a three-dimensional woven fabric preform, but only for a portion of the first inner hub pi-joint preform portion 464 extending along a length 480. The plurality of first connecting fiber tows 476 (i.e., the warp fiber tows), however, extend beyond the length 480 and are woven to extend through a thickness 482 of the inner hub hoop preform 304, and are woven to extend in a first direction 484 with respect to the inner hub pi-joint member 310 within the inner hub hoop preform 304. For example, as shown in FIG. 16, the plurality of first connecting fiber tows 476 includes five first connecting fiber tows 476, including a first fiber tow 486, a second fiber tow 488, a third fiber tow 490, a fourth fiber tow 492, and a fifth fiber tow 494.

Each of the first connecting fiber tows 476 are also woven in a respective layer within the inner hub hoop preform 304. For example, the first fiber tow 486 of the plurality of first connecting fiber tows 476 is woven to extend in the first direction 484 on top of the first layer 468 of the inner hub hoop preform 304. The second fiber tow 488 is woven to extend in the first direction 484 between the first layer 468 and the second layer 470 of the inner hub hoop preform 304. The third fiber tow 490 is woven to extend in the first direction 484 between the second layer 470 and the third layer 472 of the inner hub hoop preform 304. The fourth fiber tow 492 is woven to extend in the first direction 484, between the third layer 472 and the fourth layer 474 of the inner hub hoop preform 304. The fifth fiber tow 494 is woven to extend in the first direction 484 below (or adjacent to) the fourth layer 474 of the inner hub hoop preform 304. While FIG. 16 depicts, for example, a single first fiber tow 486, a plurality of first fiber tows 486 may be arranged in a row that extends into and out of the page, but the following description is made with regard to the single first fiber tow 486 for brevity. Likewise, a plurality of second fiber tows 488 may be included in a row, a plurality of third fiber tows 490 may be included in row, a plurality of fourth fiber tows 492 may be included in a row, and a plurality of fifth fiber tows 494 may be included in a row.

The second inner hub pi-joint preform portion 466 includes the plurality of second connecting fiber tows 478 and also includes weft fiber tows (not shown) and interlocking fiber tows (not shown), similar to the weft fiber tows 220 and the interlocking fiber tows 230 of FIG. 2A, so as to form a three-dimensional woven fabric preform, but only for a portion of the second inner hub pi-joint preform portion 466 extending along a length 496. The plurality of second connecting fiber tows 478 (i.e., the warp fiber tows), however, extend beyond the length 496 and are woven to extend through the thickness 482 of the inner hub hoop preform 304, and are woven to extend in a second direction 498 with respect to the inner hub pi-joint member 310 within the inner hub hoop preform 304. For example, as shown in FIG. 16, the plurality of second connecting fiber tows 478 includes five second connecting fiber tows 478, including a sixth fiber tow 500, a seventh fiber tow 502, an eighth fiber tow 504, a ninth fiber tow 506, and a tenth fiber tow 508. While FIG. 16 depicts, for example, a single sixth fiber tow 500, a plurality of sixth fiber tows 500 may be arranged in a row that extends into and out of the page, but the following description is made with regard to the single sixth fiber tow 500 for brevity. Likewise, a plurality of seventh fiber tows 502 may be included in a row, a plurality of eighth fiber tows 504 may be included in row, a plurality of ninth fiber tows 506 may be included in a row, and a plurality of tenth fiber tows 508 may be included in a row.

Each of the second connecting fiber tows 478 are also woven in a respective layer within the inner hub hoop preform 304. For example, the sixth fiber tow 500 of the plurality of second connecting fiber tows 478 is woven to extend in the second direction 498 on top of the first layer 468 of the inner hub hoop preform 304. The seventh fiber tow 502 is woven to extend in the second direction 498 between the first layer 468 and the second layer 470 of the warp fiber tows 210 of the inner hub hoop preform 304. The eighth fiber tow 504 is woven to extend in the second direction 498 between the second layer 470 and the third layer 472 of the inner hub hoop preform 304. The ninth fiber tow 506 is woven to extend in the second direction 498 between the third layer 472 and the fourth layer 474 of the inner hub hoop preform 304. The tenth fiber tow 508 is woven to extend in the second direction 498 below (or adjacent to) the fourth layer 474 of the inner hub hoop preform 304.

Thus, with the foregoing weaving process of the first fiber tow 486 through the tenth fiber tow 508, a portion of each of the first connecting fiber tows 476 of the first inner hub pi-joint preform portion 464 and a portion of the each of the second connecting fiber tows 478 of the second inner hub pi-joint preform portion 466 overlap with one another in an overlapping zone 510 of the inner hub hoop preform 304.

Referring back to FIG. 17, the arrangement of FIG. 17 is also applicable to the inner hub pi-joint members 310, and, thus, the FIG. 17 arrangement may also be applicable to the detail view 462 of FIG. 18. For the inner hub hoop preform 304, a plurality of common connecting fiber tows 477 are woven in a respective layer within the inner hub hoop preform 304. For example, a first common connecting fiber tow 479 of the plurality of common connecting fiber tows 477 is woven on top of a first layer 468 of the inner hub hoop preform 304 so as to connect both a first inner hub pi-joint preform portion 464 and a second inner hub pi-joint preform portion 466 to the inner hub hoop preform 304. A second common connecting fiber tow 481 is woven between the first layer 468 and a second layer 470 of the inner hub hoop preform 304 so as to connect both the first inner hub pi-joint preform portion 464 and the second inner hub pi-joint preform portion 466 to the inner hub hoop preform 304. A third common connecting fiber tow 483 is woven between the second layer 470 and a third layer 472 of the inner hub hoop preform 304 so as to connect both the first inner hub pi-joint preform portion 464 and the second inner hub pi-joint preform portion 466 to the inner hub hoop preform 304. A fourth common connecting fiber tow 485 is woven to between the third layer 472 and a fourth layer 474 of the inner hub hoop preform 304 so as to connect both the first inner hub pi-joint preform portion 464 and the second inner hub pi-joint preform portion 466 to the inner hub hoop preform 304. A fifth common connecting fiber tow 487 is woven below (or adjacent to) the fourth layer 474 of the inner hub hoop preform 304 so as to connect both the first inner hub pi-joint preform portion 464 and the second inner hub pi-joint preform portion 466 to the inner hub hoop preform 304. Thus, by looping each of the plurality of common connecting fiber tows 477 through the respective layers of the inner hub hoop preform 304, both the first inner hub pi-joint preform portion 464 and the second inner hub pi-joint preform portion 466 can be connected and can form a stronger pi-joint.

FIG. 19A is a schematic aft-looking layout of a strut preform 306, according to an aspect of the present disclosure. FIG. 19B is a schematic side view of the strut preform 306 of FIG. 19A, according to an aspect of the present disclosure. Referring collectively to FIG. 19A and FIG. 19B, the strut preform 306 may be a three-dimensional woven fabric preform that is woven in accordance with any of the aspects described above with regard to FIG. 2A to FIG. 2D. The strut preform 306 of FIG. 19A and FIG. 19B is shown to be a generally rectangular-shaped strut preform that is woven with a length 516 and a thickness 518, and has a strut preform first end 512 and a strut preform second end 514. The strut preform 306 may, however, be woven with shapes other than a rectangular shape, as will be described below. In addition, as will be explained below, the thickness 518 of the strut preform 306 is woven to fit within the gap 365 (FIG. 16) of the outer shell pi-joint members 308 and within the gap 465 (FIG. 16) of the inner hub pi-joint members 310.

FIG. 19C is a cross-sectional view of an alternate strut preform 306*a* to that shown in FIG. 19A and FIG. 19B, taken at plane 19C-19C of FIG. 19B, according to an aspect of the present disclosure. In FIG. 19C, the alternate strut preform 306*a*, rather than having a rectangular cross section, may instead be woven with a cross section to form an airfoil shape structure 517 having a varying thickness along a lengthwise direction 519 of a centerline axis 511. More particularly, the airfoil shape structure 517 may have a first thickness 518*a* near a leading edge 513 of the airfoil shape structure 517, a second thickness 518*b* near a middle portion of the airfoil shape structure 517, and a third thickness 518*c* near a trailing edge 515 of the airfoil shape structure 517. The airfoil shape structure 517 may also be achieved by weaving the strut preform 306 of FIG. 19A and FIG. 19B, and then, as described below, adding additional preform layers to the strut preform 306 so as to form the airfoil shape structure 517.

FIG. 20 is an enlarged view of a strut to outer shell and inner hub connection, taken at detail view 520 of FIG. 7, according to an aspect of the present disclosure. As shown in FIG. 20, the strut preform first end 512 of the strut preform 306 is inserted into the gap 365 (FIG. 16) of the outer shell pi-joint member 308, and the strut preform second end 514 of the strut preform 306 is inserted into the gap 465 (FIG. 16) of the inner hub pi-joint member 310. The strut preform first end 512 may then be connected to the outer shell pi-joint member 308 by a stitching 522 connecting the second outer shell pi-joint preform portion 366 and the strut preform first end 512, and a stitching 524 connecting the first outer shell pi-joint preform portion 364 and the strut preform first end 512. In addition, the strut preform second end 514 may then be connected to the inner hub pi-joint member 310 by a stitching 526 connecting the first inner hub pi-joint preform portion 464 and the strut preform second end 514, and a stitching 528 connecting the second inner hub pi-joint preform portion 466 and the strut preform second end 514. Alternatively, rather than utilizing the stitching 522, the stitching 524, the stitching 526, and the stitching 528, other methods of connecting the strut preform 306 to the outer shell pi-joint member 308 and to the inner hub pi-joint member 310 may be implemented instead, such as utilizing a tackifier. Still alternatively, the strut preform 306 may be inserted and remain dry and then be connected via resin injected into the mold structure, as will be described below.

Figure 21:
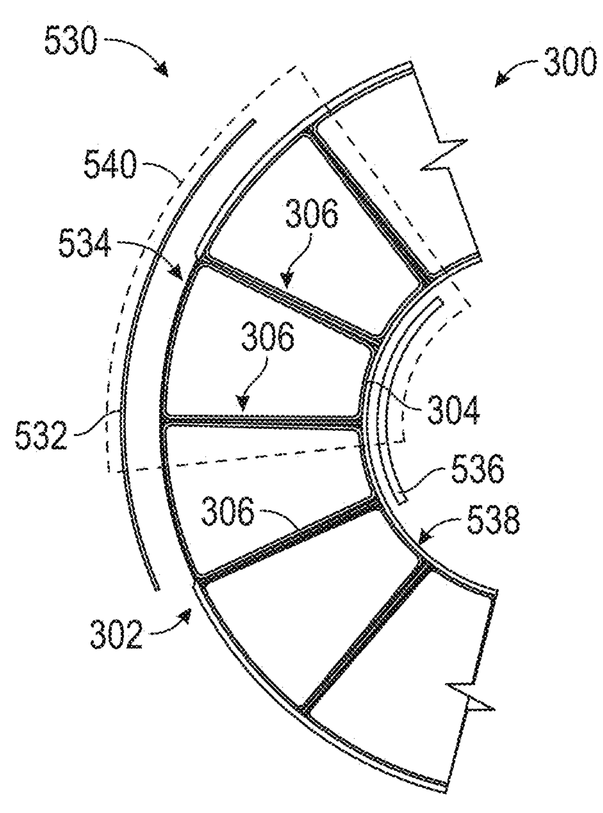
FIG. 21 is an enlarged view of a portion of the preform assembly of FIG. 7, taken at detail view 530 of FIG. 7, according to an aspect of the present disclosure.

FIG. 21 is an enlarged view of a portion of the preform assembly 300 of FIG. 7, taken at detail view 530 of FIG. 7, according to an aspect of the present disclosure. In FIG. 21, one or more additional preform layers 532 may be added to an exterior side 534 of the outer shell hoop preform 302. The one or more additional preform layers 532 may be added to increase a thickness of the outer shell hoop preform 302. The additional preform layers 532 may be assembled to the preform assembly 300 either before, or after, being installed onto a mold tooling structure. The additional preform layers 532 may be either three-dimensional woven fabric preforms, or may be two-dimensional preforms or layers. Further, one or more additional preform layers 536 may be added to the inner hub hoop preform 304 by being layered onto an interior side 538 of the inner hub hoop preform 304. The additional preform layers 536 may also be added to the inner hub hoop preform 304 either before, or after the inner hub hoop preform 304 is installed onto the mold tooling structure. The additional preform layers 536 may also be either three-dimensional woven fabric preforms, or two-dimensional preforms or layers.

Figure 22:
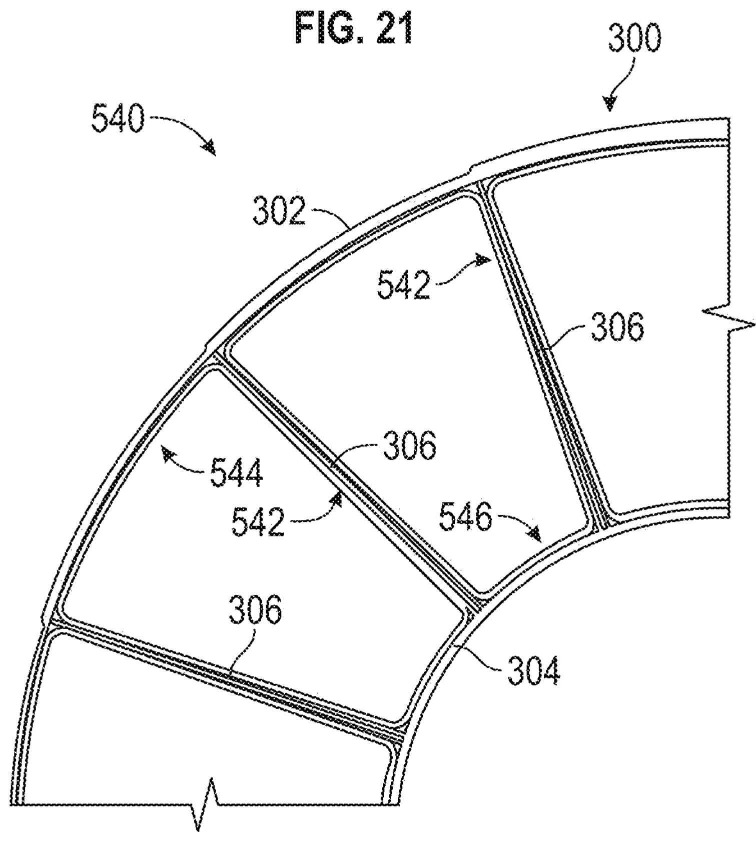
FIG. 22 is an enlarged view of a portion of the preform assembly of FIG. 21, taken at detail view 540 of FIG. 21, according to an aspect of the present disclosure.

FIG. 22 is an enlarged view of a portion of the preform assembly 300 of FIG. 21, taken at detail view 540 of FIG. 21, according to an aspect of the present disclosure. In FIG. 22, one or more additional vane preform layers 542 may be added to each of the strut preforms 306, in-between respective ones of the strut preforms 306 along an interior side 544 of the outer shell hoop preform 302, and along an exterior side 546 of the inner hub hoop preform 304. The additional vane preform layers 542 may be in the form of three-dimensional woven fabric layers, two-dimensional woven fabric layers, or a woven or a braided sock that may be added to thicken the bifurcated strut preforms 306 and also to build and to form an airfoil structure for each of the guide vanes 158 (FIG. 4).

Figure 23:
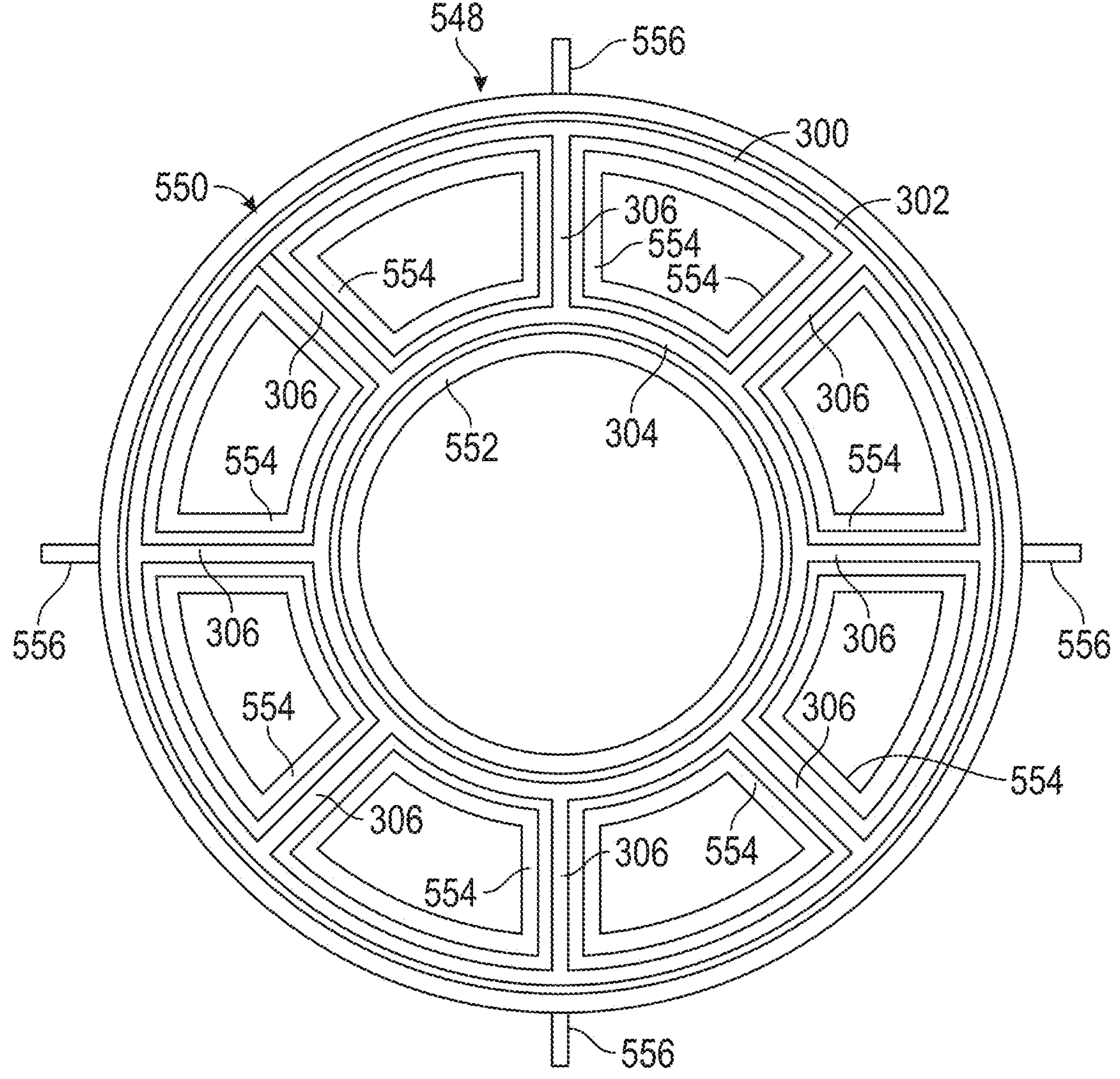
FIG. 23 is a schematic view of a mold tooling structure that may be utilized in manufacturing the guide vane structure of FIG. 4, according to an aspect of the present disclosure.

FIG. 23 is a schematic view of a mold tooling structure 548 that may be utilized in manufacturing the guide vane structure 161 of FIG. 4, according to an aspect of the present disclosure. The mold tooling structure 548 includes an outer shell mold portion 550 for forming the outer shell 165 (FIG. 4), an inner hub mold portion 552 for forming the inner hub 167 (FIG. 4), and a plurality of strut mold portions 554 for forming the guide vanes (struts) 158. The preform assembly 300 is formed and assembled as described above with regard to any of FIGS. 7 to 20, and the preform assembly 300 may be assembled utilizing the mold tooling structure 548. For example, the outer shell hoop preform 302 may be assembled onto the outer shell mold portion 550, and the inner hub hoop preform 304 may be assembled onto the inner hub mold portion 552, and then each of the strut preforms 306 may be installed and connected to the outer shell hoop preform 302 via the outer shell pi-joint members 308, and installed and connected to the inner hub hoop preform 304 via the inner hub pi-joint members 310 (FIG. 7). The mold tooling structure 548 also includes one or more injectors 556 through which a matrix material (as described above) may then be injected into the mold tooling structure 548 to generate an impregnated preform assembly within the mold tooling structure 548. A curing process may then be applied to the impregnated preform assembly within the mold tooling structure 548. For example, the mold tooling structure 548 may include the ability to apply pressure and heat to the impregnated preform assembly to apply the curing process, or the mold tooling structure 548 may be provided to an autoclave to institute a curing process. The cured composite component can then be removed from the mold tooling structure 548 for additional machining or other processing to complete the manufacturing process of the composite component.

Figure 24:
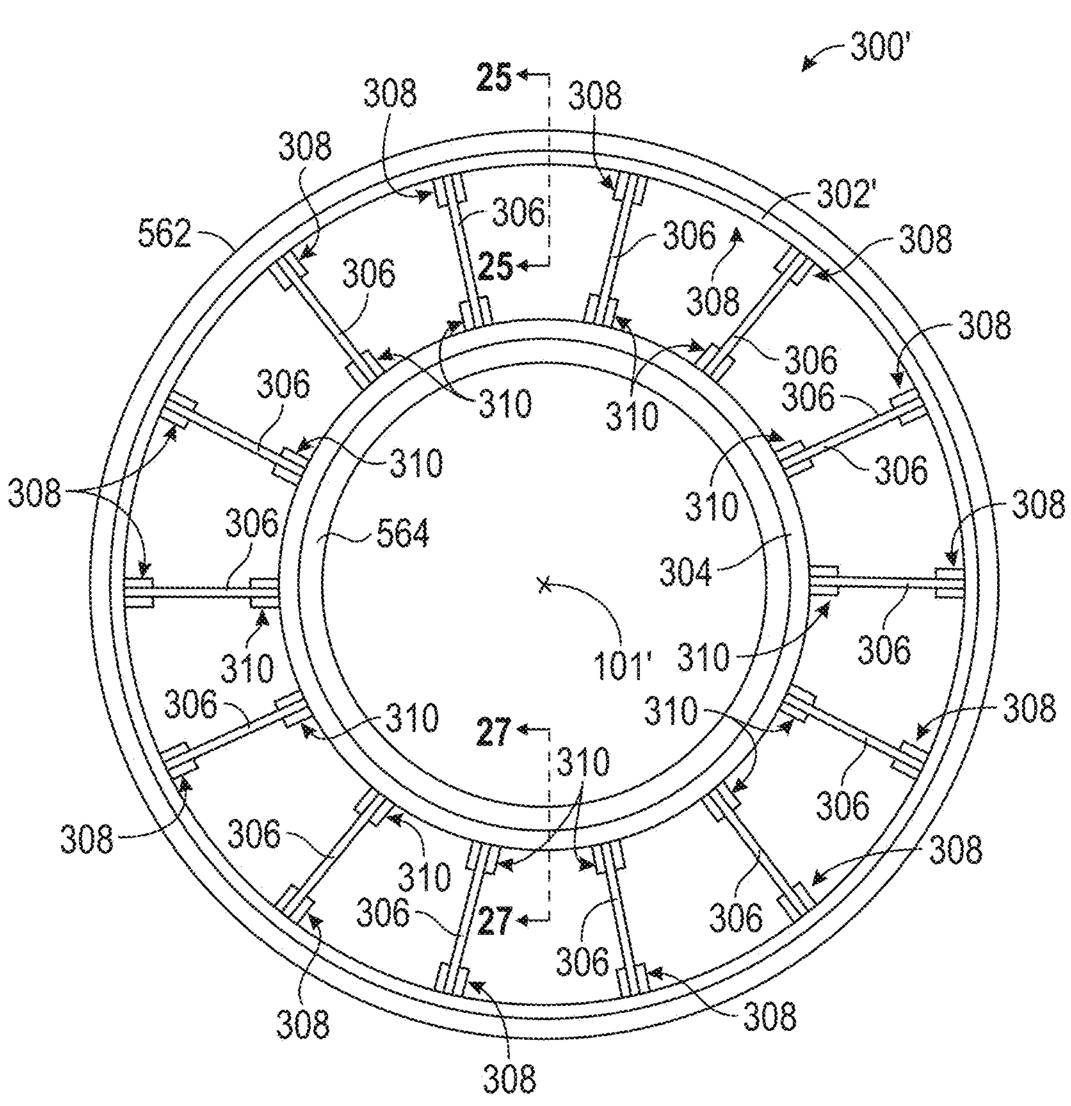
FIG. 24 is a schematic aft-looking layout of an alternate preform assembly to that shown in FIG. 7, according to an aspect of the present disclosure.

FIG. 24 is a schematic aft-looking layout of an alternate preform assembly 300' to that shown in FIG. 7, according to an aspect of the present disclosure. In FIG. 24, the alternate preform assembly 300' is essentially the same as the preform assembly 300 of FIG. 7, but includes an alternate outer shell hoop preform 302' and an alternate inner hub hoop preform 304'. The alternate outer shell hoop preform 302' includes at least one outer shell flange portion 562, and the alternate inner hub hoop preform 304' includes at least one inner hub flange portion 564. As will be described below, each of the at least one outer shell flange portion 562 and each of the at least one inner hub flange portion 564 extend circumferentially about the guide vane structure centerline axis 101'. The other elements of the alternate preform assembly 300' are the same as those described above for FIG. 7 and the description of those elements will not be repeated herein.

Figure 25:
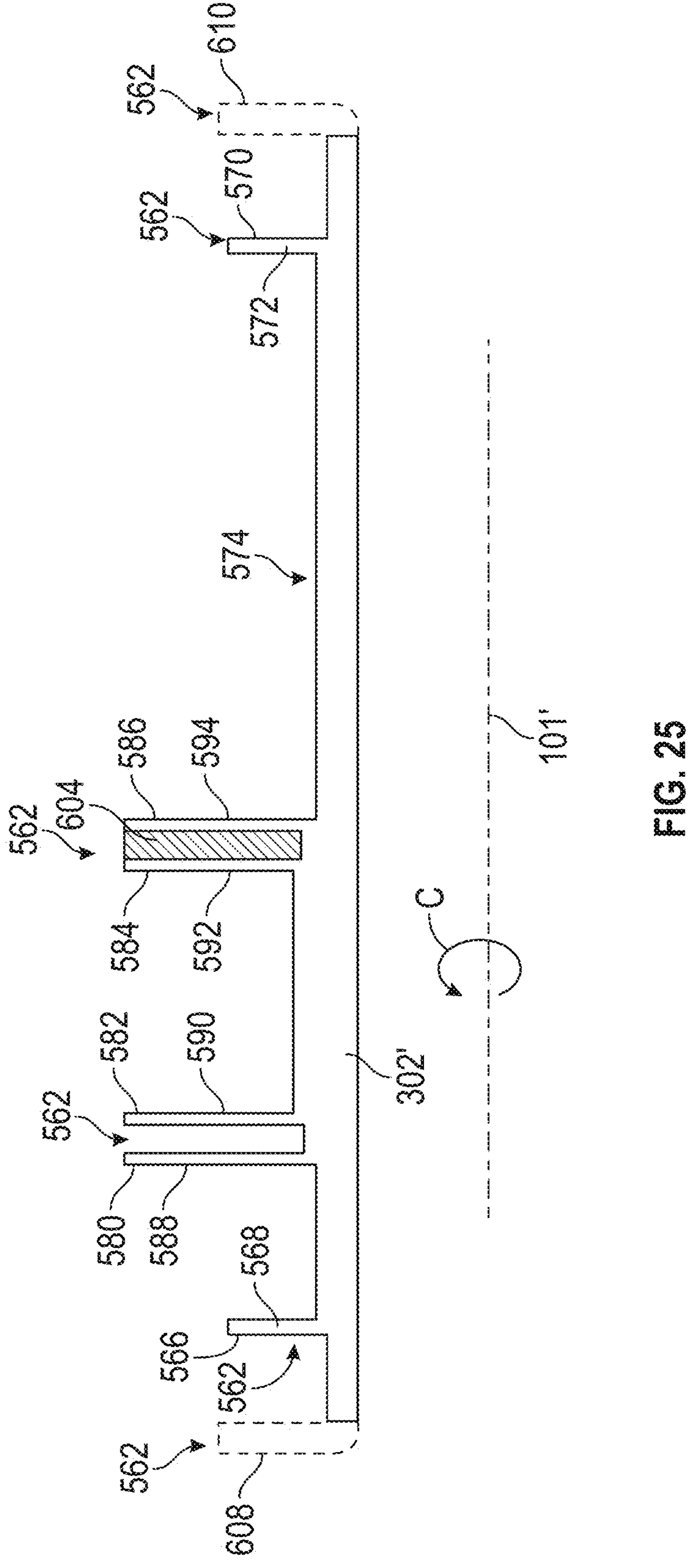
FIG. 25 is a schematic view of an alternate outer shell preform, taken at plane 25-25 of FIG. 24, according to an aspect of the present disclosure.

FIG. 25 is a schematic view of the alternate outer shell hoop preform 302', taken at plane 25-25 of FIG. 24, according to an aspect of the present disclosure. In FIG. 25, the outer shell hoop preform 302' is woven to include a plurality of bifurcated outer shell circumferential flange portions, including a first bifurcated outer shell circumferential flange portion 566 that defines a forward outer shell circumferential flange preform 568, and a second bifurcated outer shell circumferential flange portion 570 that defines an aft outer shell circumferential flange preform 572. Each of the forward outer shell circumferential flange preform 568 and the aft outer shell circumferential flange preform 572 extend circumferentially about the guide vane structure centerline axis 101' and extend radially outward, with respect to the guide vane structure centerline axis 101', from an outer side 574 of the outer shell hoop preform 302'.

Figure 26:
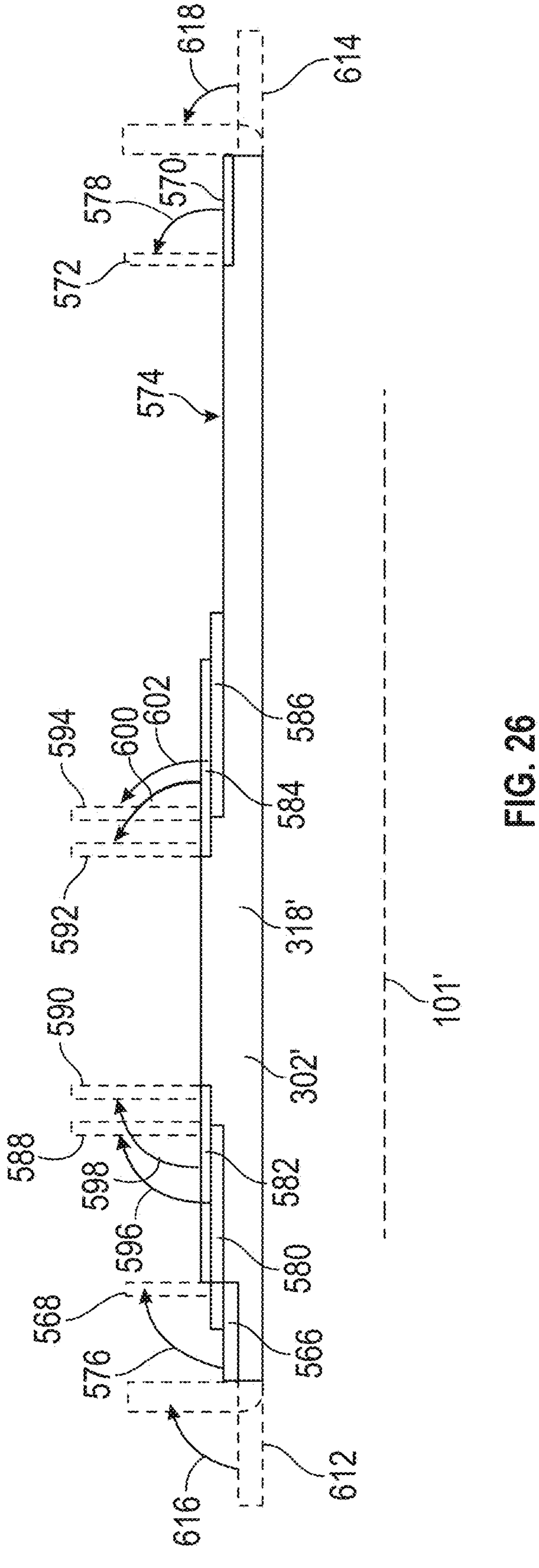
FIG. 26 is a schematic view of an outer shell preform that is woven in a flattened state for forming the outer shell hoop preform of FIG. 25, according to an aspect of the present disclosure.

FIG. 26 is a schematic view of an outer shell preform 318' that is woven in a flattened state for forming the outer shell hoop preform 302' of FIG. 25. In FIG. 26, the first bifurcated outer shell circumferential flange portion 566 is woven in the flattened state, and then is raised (indicated by the arrow 576) to define the forward outer shell circumferential flange preform 568. Similarly, the second bifurcated outer shell circumferential flange portion 570 is woven in the flattened state, and then is raised (indicated by the arrow 578) to define the aft outer shell circumferential flange preform 572.

Referring back to FIG. 25, the outer shell hoop preform 302' further includes a third bifurcated outer shell circumferential flange portion 580 that defines a first intermediate outer shell flange preform 588, a fourth bifurcated outer shell circumferential flange portion 582 that defines a second intermediate outer shell flange preform 590, a fifth bifurcated outer shell circumferential flange portion 584 that defines a third intermediate outer shell flange preform 592, and a sixth bifurcated outer shell circumferential flange portion 586 the defines a fourth intermediate outer shell flange preform 594. Each of the first intermediate outer shell flange preform 588, the second intermediate outer shell flange preform 590, the third intermediate outer shell flange preform 592, and the fourth intermediate outer shell flange preform 594 extend circumferentially about the guide vane structure centerline axis 101' and extend radially outward, with respect to the guide vane structure centerline axis 101', from the outer side 574 of the outer shell hoop preform 302'.

Referring back to FIG. 26, the third bifurcated outer shell circumferential flange portion 580 is woven in the flattened state, and then is raised (indicated by the arrow 596) to define the first intermediate outer shell flange preform 588. Similarly, the fourth bifurcated outer shell circumferential flange portion 582 is woven in the flattened state, and then is raised (indicated by the arrow 598) to define the second intermediate outer shell flange preform 590. The fifth bifurcated outer shell circumferential flange portion 584 is woven in the flattened state, and then is raised (indicated by the arrow 600) to define the third intermediate outer shell flange preform 592, and the sixth bifurcated outer shell circumferential flange portion 586 is woven in the flattened state, and then is raised (indicated by the arrow 602) to define the fourth intermediate outer shell flange preform 594.

Referring back to FIG. 25, a filler preform 604 may be inserted between the third intermediate outer shell flange preform 592 and the fourth intermediate outer shell flange preform 594 to add stiffness to the third intermediate outer shell flange preform 592 and the fourth intermediate outer shell flange preform 594. While not shown in FIG. 25, a filler preform may also be inserted between the first intermediate outer shell flange preform 588 and the second intermediate outer shell flange preform 590.

The FIG. 25 aspect also includes an alternate forward outer shell circumferential flange preform 608, which is an alternate aspect to the forward outer shell circumferential flange preform 568, and an alternate aft outer shell circumferential flange preform 610, which is an alternate aspect to the aft outer shell circumferential flange preform 572. The alternate forward outer shell circumferential flange preform 608 may be formed from a forward extension portion 612 (FIG. 26) of the outer shell preform 318' that is raised, or bent up (indicated by arrow 616 in FIG. 26). Similarly, the alternate aft outer shell circumferential flange preform 610 may be formed from an aft extension portion 614 (FIG. 26) of the outer shell preform 318' that is raised, or bent up (indicated by arrow 618 in FIG. 26).

Figure 27:
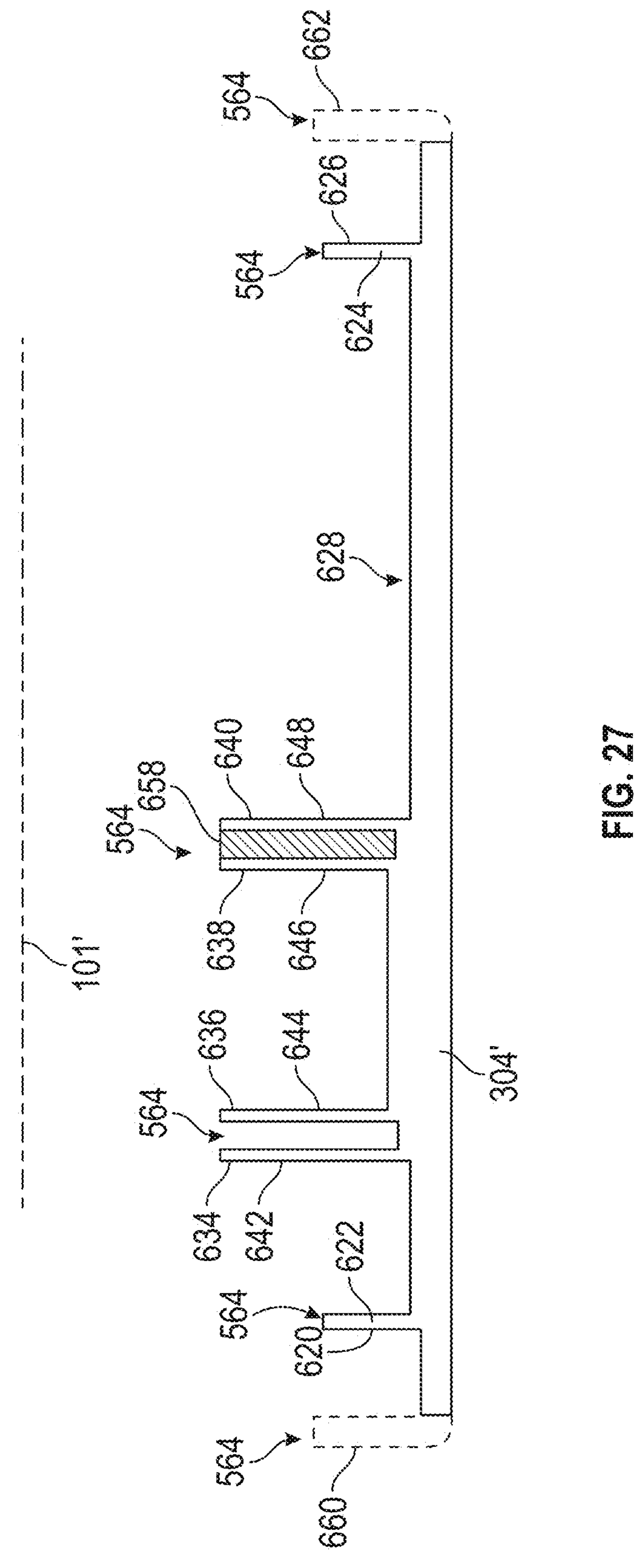
FIG. 27 is a schematic view of an alternate inner hub preform, taken at plane 27-27 of FIG. 24, according to an aspect of the present disclosure.

FIG. 27 is a schematic view of an alternate inner hub hoop preform 304', taken at plane 27-27 of FIG. 24, according to an aspect of the present disclosure. In FIG. 27, the inner hub hoop preform 304' is woven to include a plurality of bifurcated inner hub circumferential flange portions, including a first bifurcated inner hub circumferential flange portion 620 that defines a forward inner hub circumferential flange preform 622, and a second bifurcated inner hub circumferential flange portion 624 that defines an aft inner hub circumferential flange preform 626. Each of the forward inner hub circumferential flange preform 622 and the aft inner hub circumferential flange preform 626 extend circumferentially about the guide vane structure centerline axis 101' and extend radially inward, with respect to the guide vane structure centerline axis 101', from an inner side 628 of the inner hub hoop preform 304'.

Figure 28:
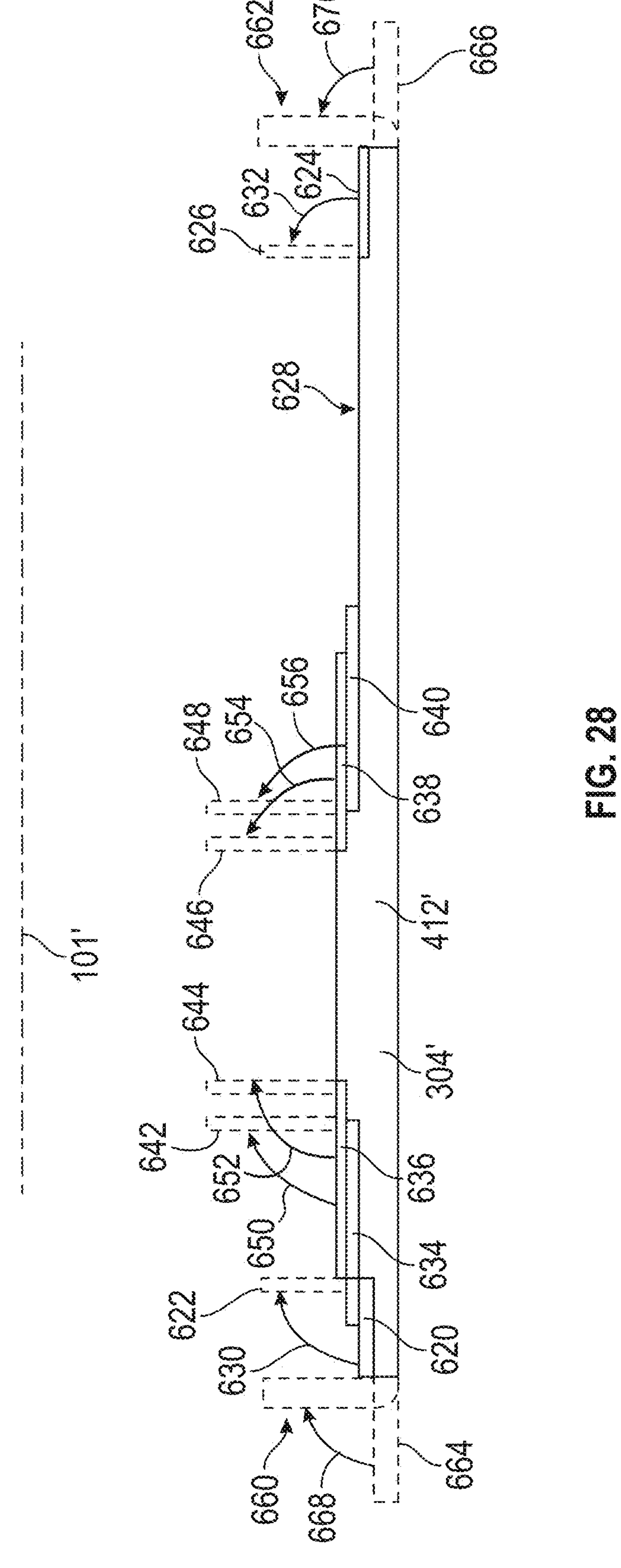
FIG. 28 is a schematic view of an inner hub preform that is woven in a flattened state for forming the inner hub hoop preform of FIG. 27, according to an aspect of the present disclosure.

FIG. 28 is a schematic view of an inner hub preform 412' that is woven in a flattened state for forming the inner hub hoop preform 304' of FIG. 27. In FIG. 28, the first bifurcated inner hub circumferential flange portion 620 is woven in the flattened state, and then is raised (indicated by the arrow 630) to define the forward inner hub circumferential flange preform 622. Similarly, the second bifurcated inner hub circumferential flange portion 624 is woven in the flattened state, and then is raised (indicated by the arrow 632) to define the aft inner hub circumferential flange preform 626.

Referring back to FIG. 27, the inner hub hoop preform 304' further includes a third bifurcated inner hub circumferential flange portion 634 that defines a first intermediate inner hub flange preform 642, a fourth bifurcated inner hub circumferential flange portion 636 that defines a second intermediate inner hub flange preform 644, a fifth bifurcated inner hub circumferential flange portion 638 that defines a third intermediate inner hub flange preform 646, and a sixth bifurcated inner hub circumferential flange portion 640 that defines a fourth intermediate inner hub flange preform 648. Each of the first intermediate inner hub flange preform 642, the second intermediate inner hub flange preform 644, the third intermediate inner hub flange preform 646, and the fourth intermediate inner hub flange preform 648 extend circumferentially about the guide vane structure centerline axis 101' and extend radially inward, with respect to the guide vane structure centerline axis 101', from the inner side 628 of the inner hub hoop preform 304'.

Referring back to FIG. 28, the third bifurcated inner hub circumferential flange portion 634 is woven in the flattened state, and then is raised (indicated by the arrow 650) to define the first intermediate inner hub flange preform 642. Similarly, the fourth bifurcated inner hub circumferential flange portion 636 is woven in the flattened state, and then is raised (indicated by the arrow 652) to define the second intermediate inner hub flange preform 644. The fifth bifurcated inner hub circumferential flange portion 638 is woven in the flattened state, and then is raised (indicated by the arrow 654) to define the third intermediate inner hub flange preform 646, and the sixth bifurcated inner hub circumferential flange portion 640 is woven in the flattened state, and then is raised (indicated by the arrow 656) to define the fourth intermediate inner hub flange preform 648.

Referring back to FIG. 27, a filler preform 658 may be inserted between the third intermediate inner hub flange preform 646 and the fourth intermediate inner hub flange preform 648 to add stiffness to the third intermediate inner hub flange preform 646 and to the fourth intermediate inner hub flange preform 648. While not shown in FIG. 27, a filler preform may also be inserted between the first intermediate inner hub flange preform 642 and the second intermediate inner hub flange preform 644.

The FIG. 27 aspect also includes an alternate forward inner hub circumferential flange preform 660, which is an alternate arrangement to the forward inner hub circumferential flange preform 622, and an alternate aft inner hub circumferential flange preform 662, which is an alternate arrangement to the aft inner hub circumferential flange preform 626. The alternate forward inner hub circumferential flange preform 660 may be formed from a forward extension portion 664 (FIG. 28) of the inner hub preform 412' that is raised, or bent up (indicated by arrow 668 in FIG. 28). Similarly, the alternate aft inner hub circumferential flange preform 662 may be formed from an aft extension portion 666 (FIG. 28) of the inner hub preform 412' that is raised, or bent up (indicated by arrow 670 in FIG. 28).

Figure 29:
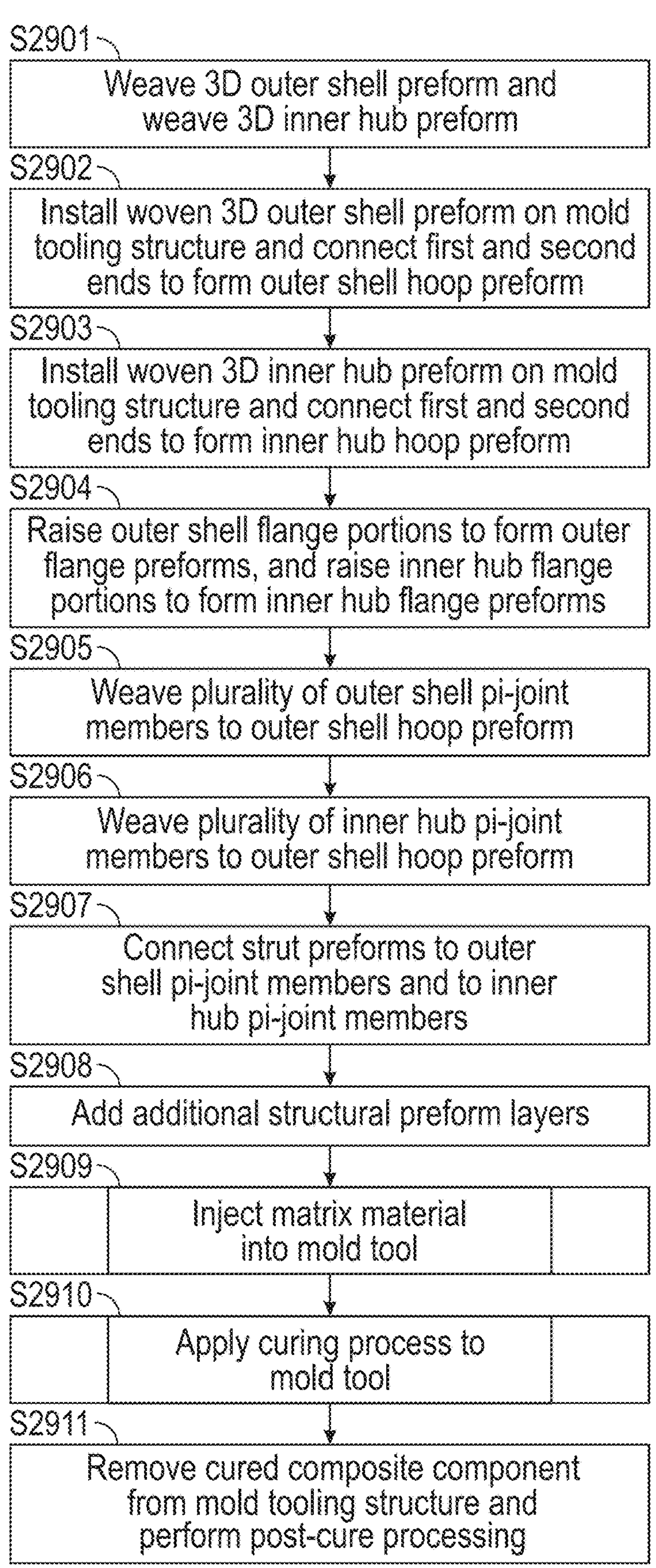
FIG. 29 is a flowchart of process steps for implementing a method of manufacturing a composite component, according to an aspect of the present disclosure.

FIG. 29 is a flowchart of process steps for implementing a method of manufacturing a composite component, according to an aspect of the present disclosure. In step S2901, the outer shell preform 318 (FIG. 9) and the inner hub preform 412 (FIG. 9) are woven as three-dimensional woven fabric preforms in accordance with any of the aspects of FIGS. 2A to 2D. In the case when the outer shell flange portions 562 (FIGS. 22 and 23) are to be included as part of the outer shell preform 318', the outer shell preform 318' is woven in step S2901 to include the bifurcated outer shell flange portions as described for FIGS. 23 and 24. Similarly, in the case when the inner hub flange portions 564 (FIGS. 22 and 25) are to be included as part of the inner hub preform 412', the inner hub preform 412' is woven in S2901 to include the bifurcated inner hub flange portions as described for FIGS. 25 and 26.

In step S2902, the woven outer shell preform 318 (or the woven outer shell preform 318') is installed onto the mold tooling structure 548 (FIG. 23), and the first outer shell preform end 322 and the second outer shell preform end 324 are connected together to form the outer shell hoop preform 302 (or the outer shell hoop preform 302'). The first outer shell preform end 322 and the second outer shell preform end 324 may be connected together in any manner described above with regard to FIG. 9 to FIG. 14. Similarly, in step S2903, the woven inner hub preform 412 (or the woven inner hub preform 412') is installed onto the mold tooling structure 548 (FIG. 23), and the first inner hub preform end 416 and the second inner hub preform end 418 are connected together to form the inner hub hoop preform 304 (or the inner hub hoop preform 304'). The first inner hub preform end 416 and the second inner hub preform end 418 may be connected together in any manner described above with regard to FIG. 9 to FIG. 14.

In step S2904, in the case when the outer shell flange portions 562 are included, the outer shell flange portions 562 are raised as described above for FIG. 25 and FIG. 26 to form any one or more of the outer shell flange preforms, including the forward outer shell circumferential flange preform 568, the aft outer shell circumferential flange preform 572, the first intermediate outer shell flange preform 588, the second intermediate outer shell flange preform 590, the third intermediate outer shell flange preform 592, the fourth intermediate outer shell flange preform 594, the alternate forward outer shell circumferential flange preform 608, or the alternate aft outer shell circumferential flange preform 610. Similarly, in step S2904, in the case when the inner hub flange portions 564 are included, the inner hub flange portions 564 are raised as described above for FIG. 27 and FIG. 28 to form any one or more of the inner hub flange preforms, including the forward inner hub circumferential flange preform 622, the aft inner hub circumferential flange preform 626, the first intermediate inner hub flange preform 642, the second intermediate inner hub flange preform 644, the third intermediate inner hub flange preform 646, the fourth intermediate inner hub flange preform 648, the alternate forward inner hub circumferential flange preform 660, or the alternate aft inner hub circumferential flange preform 662. In the case when neither the outer shell flange portions 562 nor the inner hub flange portions 564 are included, step S2904 may be skipped in the process.

In step S2905, the plurality of outer shell pi-joint members 308 (FIG. 7 and FIG. 8) are integrally woven to the outer shell hoop preform 302 (or to the outer shell hoop preform 302'). In step S2905, each of the outer shell pi-joint members 308 are integrally woven to the outer shell hoop preform 302 (or to the outer shell hoop preform 302') in the manner described above for FIG. 16. Similarly, in step S2906, the plurality of inner hub pi-joint members 310 (FIG. 7 and FIG. 18) are integrally woven to the inner hub hoop preform 304 (or to the inner hub hoop preform 304'). In step S2906, each of the inner hub pi-joint members 310 is integrally woven to the inner hub hoop preform 304 (or to the inner hub hoop preform 304') in the manner described above for FIG. 16.

While step S2905 is shown in FIG. 29 as being a separate step from the weaving of the three-dimensional outer shell preform in step S2901, the weaving of the plurality of outer shell pi-joint members 308 to the outer shell hoop preform of step S2905 may instead be performed as part of step S2901. Similarly, while step S2906 is shown in FIG. 29 as being a separate step from the weaving of the three-dimensional inner hub preform in step S2901, the weaving of the plurality of inner hub pi-joint members 310 may instead be performed as part of the step S2901. In the case when step S2905 and step S2906 is performed as part of step S2901, the method proceeds directly from step S2904 to step S2907 so as to skip both step S2905 and step S2906 of the flowchart of FIG. 29.

Next, in step S2907, respective ones of the plurality of strut preforms 306 (FIG. 7, FIG. 19A and FIG. 19B) are inserted (i.e., installed) into a respective one of the plurality of outer shell pi-joint members 308 and into a respective one of the inner hub pi-joint members 310 as described above for FIG. 20. The strut preform first end 512 may then be connected to the outer shell pi-joint member 308 by being stitched to the outer shell pi-joint member 308 as described above for FIG. 20, and the strut preform second end 514 may be connected to the inner hub pi-joint member 310 by being stitched to the inner hub pi-joint member 310 as described above for FIG. 20.

Next, in step S2908, as shown in FIG. 21 and FIG. 22, the additional preform layers 532, the additional preform layers 536, and the additional vane preform layers 542 can be overlayed onto the preform assembly 300 so as to build-up the preform structure for the composite component part being formed. In step S2909, a process to inject a matrix material into the mold tooling structure 548 via the injectors 556 is performed. The matrix material may be any of those described herein. Any one or more of various known processes of injecting matrix materials into a mold for forming a composite component can be implemented. Then, in step S2910, a curing process is applied to the mold tooling structure 548 as described with regard to FIG. 23. Finally, in step S2911, once the curing process has been completed, the cured composite component part can be removed from the mold tooling structure 548, and any additional manufacturing processes that may be needed to complete the composite component part (i.e., to complete the guide vane structure 161 of FIG. 4) can be performed.

The foregoing aspects provide a technique for manufacturing a three-dimensional woven preform structure for a vane structure of a gas turbine engine. The process of weaving a three-dimensional fabric preform for the outer shell hoop preform and the inner hub hoop preform as flattened preforms that are then wrapped around the mold tooling structure and connected to form the hoop preforms simplifies the manufacturing process. In addition, the integral weaving of the outer shell pi-joint members and the inner hub pi-joint members provides for a strong connecting at the pi-joints. By including the bifurcated flange portions on the outer shell hoop preform and the inner hub hoop preform, additional stiffness can be added to the structure.

Further aspects of the present disclosure are provided by the subject matter of the following clauses.

A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method comprising weaving a three-dimensional fabric outer shell preform, the outer shell preform including, in a first outer shell direction of the woven outer shell preform, a first outer shell preform end and a second outer shell preform end, weaving a three-dimensional fabric inner hub preform, the inner hub preform including, in a first inner hub direction of the woven inner hub preform, a first inner hub preform end and a second inner hub preform end, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component.

The method according to any preceding clause, further comprising bending at least one of a forward extension portion of the outer shell hoop preform to form a forward outer shell circumferential flange preform or an aft extension portion of the outer shell hoop preform to form an aft outer shell circumferential flange preform, and bending at least one of a forward extension portion of the inner hub hoop preform to form a forward inner hub circumferential flange preform or an aft extension portion of the inner hub hoop preform to form an aft inner hub circumferential flange preform.

The method according to any preceding clause, the composite component being one of a guide vane structure, an inlet guide vane structure, or a stator vane structure.

The method according to any preceding clause, further comprising adding at least one additional preform layer to at least one of the outer shell hoop preform, the inner hub hoop preform, or at least one of the plurality of strut preforms, to increase a thickness of the respective preform.

The method according to any preceding clause, the at least one additional preform layer being added to at least one of the plurality of strut preforms to form an airfoil shape structure.

The method according to any preceding clause, the outer shell preform being woven to include at least one bifurcated outer shell circumferential flange portion, the at least one bifurcated outer shell circumferential flange portion extending radially outward from the outer shell hoop preform to define at least one outer shell circumferential flange preform, and the inner hub preform is woven to include at least one bifurcated inner hub circumferential flange portion, the at least one bifurcated inner hub circumferential flange portion extending radially inward from the inner hub hoop preform to define at least one inner hub circumferential flange preform.

The method according to any preceding clause, the at least one bifurcated outer shell circumferential flange portion including at least one of a first bifurcated outer shell circumferential flange portion that defines a forward outer shell circumferential flange preform, a second bifurcated outer shell circumferential flange portion that defines an aft outer shell circumferential flange preform, and a third bifurcated outer shell circumferential flange portion that defines an intermediate outer shell circumferential flange preform arranged between the forward outer shell circumferential flange preform and the aft outer shell circumferential flange preform.

The method according to any preceding clause, the at least one bifurcated inner hub circumferential flange portion including at least one of a first bifurcated inner hub circumferential flange portion that defines a forward inner hub circumferential flange preform, a second bifurcated inner hub circumferential flange portion that defines an aft inner hub circumferential flange preform, and a third bifurcated inner hub circumferential flange portion that defines an intermediate inner hub circumferential flange preform arranged between the forward inner hub circumferential flange preform and the aft inner hub circumferential flange preform.

The method according to any preceding clause, the first outer shell preform end including a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion are connected together to form the inner hub hoop preform.

The method according to any preceding clause, the first outer shell connecting portion including a first outer shell scarf joint portion and the second outer shell connecting portion includes a second outer shell scarf joint connecting portion, the first outer shell scarf joint connecting portion and the second outer shell scarf joint connecting portion being connected together to form an outer shell scarf joint and to thereby form the outer shell hoop preform.

The method according to the preceding clause, the first inner hub connecting portion including a first inner hub scarf joint portion and the second inner hub connecting portion includes a second inner hub scarf joint connecting portion, the first inner hub scarf joint connecting portion and the second inner hub scarf joint connecting portion being connected together to form an inner hub scarf joint and to thereby form the inner hub hoop preform.

The method according to any preceding clause, the first outer shell connecting portion including a plurality of first bifurcated layers, and the second outer shell connecting portion includes a plurality of second bifurcated layers, the plurality of first bifurcated layers and the plurality of second bifurcated layers being joined together in an overlapping manner to form the outer shell hoop preform.

The method according to any preceding clause, the first inner hub connecting portion including a plurality of first bifurcated layers, and the second inner hub connecting portion includes a plurality of second bifurcated layers, the plurality of first bifurcated layers and the plurality of second bifurcated layers being joined together in an overlapping manner to form the inner hub hoop preform.

The method according to any preceding clause, each of the plurality of outer shell pi-joint members including a first outer shell pi-joint preform portion and a second outer shell pi-joint preform portion, and each of the plurality of inner hub pi-joint members includes a first inner hub pi-joint preform portion and a second inner hub pi-joint preform portion.

The method according to any preceding clause, for each of the plurality of inner hub pi-joint members, the first inner hub pi-joint preform portion including a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other.

The method according to any preceding clause, each of the plurality of first connecting fiber tows of the first inner hub pi-joint preform portion being woven in a respective layer within the outer shell hoop preform, and each of the plurality of second connecting fiber tows of the second inner hub pi-joint preform portion are woven in a respective layer within the outer shell hoop preform.

The method according to any preceding clause, for each of the plurality of outer shell pi-joint members, the first outer shell pi-joint preform portion including a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

The method according to any preceding clause, each of the plurality of first connecting fiber tows of the first outer shell pi-joint preform portion being woven in a respective layer within the outer shell hoop preform, and each of the plurality of second connecting fiber tows of the second outer shell pi-joint preform portion are woven in a respective layer within the outer shell hoop preform.

The method according to any preceding clause, each strut preform including a strut preform first end and a strut preform second end, and, for each strut preform, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

The method according to any preceding clause, the strut preform first end being connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

A composite guide vane structure for a gas turbine engine, the composite guide vane structure including an outer shell extending circumferentially about a centerline axis, an inner hub extending circumferentially about the centerline axis, and a plurality of circumferentially spaced apart struts connecting the outer shell and the inner hub, the composite guide vane structure being manufactured by weaving a three-dimensional fabric outer shell preform, the outer shell preform including, in a first outer shell direction of the woven outer shell preform, a first outer shell preform end and a second outer shell preform end, weaving a three-dimensional fabric inner hub preform, the inner hub preform including, in a first inner hub direction of the woven inner hub preform, a first inner hub preform end and a second inner hub preform end, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component.

The composite guide vane structure according to any preceding clause, further comprising bending at least one of a forward extension portion of the outer shell hoop preform to form a forward outer shell circumferential flange preform or an aft extension portion of the outer shell hoop preform to form an aft outer shell circumferential flange preform, and bending at least one of a forward extension portion of the inner hub hoop preform to form a forward inner hub circumferential flange preform or an aft extension portion of the inner hub hoop preform to form an aft inner hub circumferential flange preform.

The composite guide vane structure according to any preceding clause, the composite component being one of an outlet guide vane structure, an inlet guide vane structure, or a stator vane structure.

The composite guide vane structure according to any preceding clause, further comprising adding at least one additional preform layer to at least one of the outer shell hoop preform, the inner hub hoop preform, or at least one of the plurality of strut preforms, to increase a thickness of the respective preform.

The composite guide vane structure according to any preceding clause, the at least one additional preform layer being added to at least one of the plurality of strut preforms to form an airfoil shape structure.

The composite guide vane structure according to any preceding clause, the outer shell preform being woven to include at least one bifurcated outer shell circumferential flange portion, the at least one bifurcated outer shell circumferential flange portion extending radially outward from the outer shell hoop preform to define at least one outer shell circumferential flange preform, and the inner hub preform is woven to include at least one bifurcated inner hub circumferential flange portion, the at least one bifurcated inner hub circumferential flange portion extending radially inward from the inner hub hoop preform to define at least one inner hub circumferential flange preform.

The composite guide vane structure according to any preceding clause, the at least one bifurcated outer shell circumferential flange portion including at least one of a first bifurcated outer shell circumferential flange portion that defines a forward outer shell circumferential flange preform, a second bifurcated outer shell circumferential flange portion that defines an aft outer shell circumferential flange preform, and a third bifurcated outer shell circumferential flange portion that defines an intermediate outer shell circumferential flange preform arranged between the forward outer shell circumferential flange preform and the aft outer shell circumferential flange preform.

The composite guide vane structure according to any preceding clause, the at least one bifurcated inner hub circumferential flange portion including at least one of a first bifurcated inner hub circumferential flange portion that defines a forward inner hub circumferential flange preform, a second bifurcated inner hub circumferential flange portion that defines an aft inner hub circumferential flange preform, and a third bifurcated inner hub circumferential flange portion that defines an intermediate inner hub circumferential flange preform arranged between the forward inner hub circumferential flange preform and the aft inner hub circumferential flange preform.

The composite guide vane structure according to any preceding clause, the first outer shell preform end including a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion that are connected together to form the inner hub hoop preform.

The composite guide vane structure according to any preceding clause, the first outer shell connecting portion including a first outer shell scarf joint portion and the second outer shell connecting portion includes a second outer shell scarf joint connecting portion, the first outer shell scarf joint connecting portion and the second outer shell scarf joint connecting portion being connected together to form an outer shell scarf joint and to thereby form the outer shell hoop preform.

The composite guide vane structure according to the preceding clause, the first inner hub connecting portion including a first inner hub scarf joint portion and the second inner hub connecting portion includes a second inner hub scarf joint connecting portion, the first inner hub scarf joint connecting portion and the second inner hub scarf joint connecting portion being connected together to form an inner hub scarf joint and to thereby form the inner hub hoop preform.

The composite guide vane structure according to any preceding clause, the first outer shell connecting portion including a plurality of first bifurcated layers, and the second outer shell connecting portion includes a plurality of second bifurcated layers, the plurality of first bifurcated layers and the plurality of second bifurcated layers being joined together in an overlapping manner to form the outer shell hoop preform.

The composite guide vane structure according to any preceding clause, the first inner hub connecting portion including a plurality of first bifurcated layers, and the second inner hub connecting portion includes a plurality of second bifurcated layers, the plurality of first bifurcated layers and the plurality of second bifurcated layers being joined together in an overlapping manner to form the inner hub hoop preform.

The composite guide vane structure according to any preceding clause, each of the plurality of outer shell pi-joint members including a first outer shell pi-joint preform portion and a second outer shell pi-joint preform portion, and each of the plurality of inner hub pi-joint members includes a first inner hub pi-joint preform portion and a second inner hub pi-joint preform portion.

The composite guide vane structure according to any preceding clause, for each of the plurality of inner hub pi-joint members, the first inner hub pi-joint preform portion including a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other.

The composite guide vane structure according to any preceding clause, each of the plurality of first connecting fiber tows of the first inner hub pi-joint preform portion being woven in a respective layer within the outer shell hoop preform, and each of the plurality of second connecting fiber tows of the second inner hub pi-joint preform portion are woven in a respective layer within the outer shell hoop preform.

The composite guide vane structure according to any preceding clause, for each of the plurality of outer shell pi-joint members, the first outer shell pi-joint preform portion including a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

The composite guide vane structure according to any preceding clause, each of the plurality of first connecting fiber tows of the first outer shell pi-joint preform portion being woven in a respective layer within the outer shell hoop preform, and each of the plurality of second connecting fiber tows of the second outer shell pi-joint preform portion are woven in a respective layer within the outer shell hoop preform.

The composite guide vane structure according to any preceding clause, each strut preform including a strut preform first end and a strut preform second end, and, for each strut preform, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

The composite guide vane structure according to any preceding clause, the strut preform first end being connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

A composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the composite guide vane structure being manufactured by weaving a three-dimensional fabric outer shell preform, the outer shell preform including, in a first outer shell direction of the woven outer shell preform, a first outer shell preform end and a second outer shell preform end, and including at least one bifurcated outer shell circumferential flange portion, weaving a three-dimensional fabric inner hub preform, the inner hub preform including, in a first inner hub direction of the woven inner hub preform, a first inner hub preform end and a second inner hub preform end, and including at least one inner hub bifurcated inner hub flange portion, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component.

The composite component according to the preceding clause, wherein the outer shell preform is woven to include the least one bifurcated outer shell circumferential flange portion, the at least one bifurcated outer shell circumferential flange portion extending radially outward from the outer shell hoop preform to define at least one outer shell circumferential flange preform, and the inner hub preform is woven to include at least one bifurcated inner hub circumferential flange portion, the at least one bifurcated inner hub circumferential flange portion extending radially inward from the inner hub hoop preform to define at least one inner hub circumferential flange preform.

The composite component according to any preceding clause, wherein the at least one bifurcated outer shell circumferential flange portion includes at least one of a first bifurcated outer shell circumferential flange portion that defines a forward outer shell circumferential flange preform, a second bifurcated outer shell circumferential flange portion that defines an aft outer shell circumferential flange preform, and a third bifurcated outer shell circumferential flange portion that defines an intermediate outer shell circumferential flange preform arranged between the forward outer shell circumferential flange preform and the aft outer shell circumferential flange preform.

The composite component according to any preceding clause, wherein the at least one bifurcated inner hub circumferential flange portion includes at least one of a first bifurcated inner hub circumferential flange portion that defines a forward inner hub circumferential flange preform, a second bifurcated inner hub circumferential flange portion that defines an aft inner hub circumferential flange preform, and a third bifurcated inner hub circumferential flange portion that defines an intermediate inner hub circumferential flange preform arranged between the forward inner hub circumferential flange preform and the aft inner hub circumferential flange preform.

The composite component according to any preceding clause, further including bending at least one of a forward extension portion of the outer shell hoop preform to form a forward outer shell circumferential flange preform or an aft extension portion of the outer shell hoop preform to form an aft outer shell circumferential flange preform, and bending at least one of a forward side portion of the inner hub hoop preform to form a forward inner hub circumferential flange preform or an aft side portion of the inner hub hoop preform to form an aft inner hub circumferential flange preform.

A composite guide vane structure for a gas turbine engine, the composite guide vane structure including an outer shell extending circumferentially about a centerline axis, an inner hub extending circumferentially about the centerline axis, and a plurality of circumferentially spaced apart struts connecting the outer shell and the inner hub, the composite guide vane structure being manufactured by weaving a three-dimensional fabric outer shell preform, the outer shell preform including, in a first outer shell direction of the woven outer shell preform, a first outer shell preform end and a second outer shell preform end, the first outer shell preform end, weaving a three-dimensional fabric inner hub preform, the inner hub preform including, in a first inner hub direction of the woven inner hub preform, a first inner hub preform end and a second inner hub preform end, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component, wherein the first outer shell preform end includes a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion are connected together to form the inner hub hoop preform, wherein the first outer shell connecting portion includes a first outer shell scarf joint portion and the second outer shell connecting portion includes a second outer shell scarf joint connecting portion, the first outer shell scarf joint connecting portion and the second outer shell scarf joint connecting portion being connected together to form an outer shell scarf joint and to thereby form the outer shell hoop preform, and wherein the first inner hub connecting portion includes a first inner hub scarf joint connecting portion and the second inner hub connecting portion includes a second inner hub scarf joint connecting portion, the first inner hub scarf joint connecting portion and the second inner hub scarf joint connecting portion being connected together to form an inner hub scarf joint and to thereby form the inner hub hoop preform.

The composite guide vane structure according to the preceding clause, wherein each of the plurality of outer shell pi-joint members includes a first outer shell pi-joint preform portion and a second outer shell pi-joint preform portion, and each of the plurality of inner hub pi-joint members includes a first inner hub pi-joint preform portion and a second inner hub pi-joint preform portion.

The composite guide vane structure according to any preceding clause, wherein, for each of the plurality of inner hub pi-joint members, the first inner hub pi-joint preform portion includes a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other.

The composite guide vane structure according to any preceding clause, wherein each of the plurality of first connecting fiber tows of the first inner hub pi-joint preform portion are woven in a respective layer within the outer shell hoop preform, and each of the plurality of second connecting fiber tows of the second inner hub pi-joint preform portion are woven in a respective layer within the outer shell hoop preform.

The composite guide vane structure according to any preceding clause, wherein, for each of the plurality of outer shell pi-joint members, the first outer shell pi-joint preform portion includes a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

The composite guide vane structure according to any preceding clause, wherein each of the plurality of first connecting fiber tows of the first outer shell pi-joint preform portion are woven in a respective layer within the outer shell hoop preform, and each of the plurality of second connecting fiber tows of the second outer shell pi-joint preform portion are woven in a respective layer within the outer shell hoop preform.

The composite guide vane structure according to any preceding clause, wherein each strut preform includes a strut preform first end and a strut preform second end, and, for each strut preform, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

The composite guide vane structure according to any preceding clause, wherein the strut preform first end is connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

A composite guide vane structure for a gas turbine engine, the composite guide vane structure including an outer shell extending circumferentially about a centerline axis, an inner hub extending circumferentially about the centerline axis, and a plurality of circumferentially spaced apart struts connecting the outer shell and the inner hub, the composite guide vane structure being manufactured by weaving a three-dimensional fabric outer shell preform, the outer shell preform including, in a first outer shell direction of the woven outer shell preform, a first outer shell preform end and a second outer shell preform end, the first outer shell preform end, weaving a three-dimensional fabric inner hub preform, the inner hub preform including, in a first inner hub direction of the woven inner hub preform, a first inner hub preform end and a second inner hub preform end, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component, wherein the first outer shell preform end includes a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion are connected together to form the inner hub hoop preform, wherein the first outer shell connecting portion includes a plurality of first bifurcated layers, and the second outer shell connecting portion includes a plurality of second bifurcated layers, the plurality of first bifurcated layers and the plurality of second bifurcated layers being joined together in an overlapping manner to form the outer shell hoop preform, and wherein the first inner hub connecting portion includes a plurality of first bifurcated layers, and the second inner hub connecting portion includes a plurality of second bifurcated layers, the plurality of first bifurcated layers and the plurality of second bifurcated layers being joined together in an overlapping manner to form the inner hub hoop preform.

The composite guide vane structure according to the preceding clause, wherein each of the plurality of outer shell pi-joint members includes a first outer shell pi-joint preform portion and a second outer shell pi-joint preform portion, and each of the plurality of inner hub pi-joint members includes a first inner hub pi-joint preform portion and a second inner hub pi-joint preform portion.

The composite guide vane structure according to any preceding clause, wherein, for each of the plurality of inner hub pi-joint members, the first inner hub pi-joint preform portion includes a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other.

The composite guide vane structure according to any preceding clause, wherein each of the plurality of first connecting fiber tows of the first inner hub pi-joint preform portion are woven in a respective layer within the outer shell hoop preform, and each of the plurality of second connecting fiber tows of the second inner hub pi-joint preform portion are woven in a respective layer within the outer shell hoop preform.

The composite guide vane structure according to any preceding clause, wherein, for each of the plurality of outer shell pi-joint members, the first outer shell pi-joint preform portion includes a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

The composite guide vane structure according to any preceding clause, wherein each of the plurality of first connecting fiber tows of the first outer shell pi-joint preform portion are woven in a respective layer within the outer shell hoop preform, and each of the plurality of second connecting fiber tows of the second outer shell pi-joint preform portion are woven in a respective layer within the outer shell hoop preform.

The composite guide vane structure according to any preceding clause, wherein each strut preform includes a strut preform first end and a strut preform second end, and, for each strut preform, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

The composite guide vane structure according to any preceding clause, wherein the strut preform first end is connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

A gas turbine engine having a fan, a turbo-engine, a nacelle, and a composite guide vane structure arranged between the turbo-engine and the nacelle, the composite guide vane structure including an outer shell extending circumferentially about a centerline axis, an inner hub extending circumferentially about the centerline axis, and a plurality of circumferentially spaced apart struts connecting the outer shell and the inner hub, the composite guide vane structure being manufactured by weaving a three-dimensional fabric outer shell preform, the outer shell preform including, in a first outer shell direction of the woven outer shell preform, a first outer shell preform end and a second outer shell preform end, weaving a three-dimensional fabric inner hub preform, the inner hub preform including, in a first inner hub direction of the woven inner hub preform, a first inner hub preform end and a second inner hub preform end, installing the woven outer shell preform onto a mold tooling structure, and connecting the first outer shell preform end to the second outer shell preform end to form an outer shell hoop preform, installing the woven inner hub preform onto the mold tooling structure, and connecting the first inner hub preform end to the second inner hub preform end to form an inner hub hoop preform, integrally weaving a plurality of outer shell pi-joint members to the outer shell hoop preform, each of the outer shell pi-joint members extending radially inward from the outer shell hoop preform, integrally weaving a plurality of inner hub pi-joint members to the inner hub hoop preform, each of the inner hub pi-joint members extending radially outward from the inner hub hoop preform, connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members, injecting a matrix material into the mold tooling structure, and applying a curing process to the mold tooling structure to obtain a molded composite component.

The gas turbine engine according to any preceding clause, further comprising bending at least one of a forward extension portion of the outer shell hoop preform to form a forward outer shell circumferential flange preform or an aft extension portion of the outer shell hoop preform to form an aft outer shell circumferential flange preform, and bending at least one of a forward extension portion of the inner hub hoop preform to form a forward inner hub circumferential flange preform or an aft extension portion of the inner hub hoop preform to form an aft inner hub circumferential flange preform.

The gas turbine engine according to any preceding clause, the composite component being one of an outlet guide vane structure, an inlet guide vane structure, or a stator vane structure.

The gas turbine engine according to any preceding clause, further comprising adding at least one additional preform layer to at least one of the outer shell hoop preform, the inner hub hoop preform, or at least one of the plurality of strut preforms, to increase a thickness of the respective preform.

The gas turbine engine according to any preceding clause, the at least one additional preform layer being added to at least one of the plurality of strut preforms to form an airfoil shape structure.

The gas turbine engine according to any preceding clause, the outer shell preform being woven to include at least one bifurcated outer shell circumferential flange portion, the at least one bifurcated outer shell circumferential flange portion extending radially outward from the outer shell hoop preform to define at least one outer shell circumferential flange preform, and the inner hub preform is woven to include at least one bifurcated inner hub circumferential flange portion, the at least one bifurcated inner hub circumferential flange portion extending radially inward from the inner hub hoop preform to define at least one inner hub circumferential flange preform.

The gas turbine engine according to any preceding clause, the at least one bifurcated outer shell circumferential flange portion including at least one of a first bifurcated outer shell circumferential flange portion that defines a forward outer shell circumferential flange preform, a second bifurcated outer shell circumferential flange portion that defines an aft outer shell circumferential flange preform, and a third bifurcated outer shell circumferential flange portion that defines an intermediate outer shell circumferential flange preform arranged between the forward outer shell circumferential flange preform and the aft outer shell circumferential flange preform.

The gas turbine engine according to any preceding clause, the at least one bifurcated inner hub circumferential flange portion including at least one of a first bifurcated inner hub circumferential flange portion that defines a forward inner hub circumferential flange preform, a second bifurcated inner hub circumferential flange portion that defines an aft inner hub circumferential flange preform, and a third bifurcated inner hub circumferential flange portion that defines an intermediate inner hub circumferential flange preform arranged between the forward inner hub circumferential flange preform and the aft inner hub circumferential flange preform.

The gas turbine engine according to any preceding clause, the first outer shell preform end including a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion are connected together to form the inner hub hoop preform.

The gas turbine engine according to any preceding clause, the first outer shell connecting portion including a first outer shell scarf joint portion and the second outer shell connecting portion includes a second outer shell scarf joint connecting portion, the first outer shell scarf joint connecting portion and the second outer shell scarf joint connecting portion being connected together to form an outer shell scarf joint and to thereby form the outer shell hoop preform.

The gas turbine engine according to the preceding clause, the first inner hub connecting portion including a first inner hub scarf joint portion and the second inner hub connecting portion includes a second inner hub scarf joint connecting portion, the first inner hub scarf joint connecting portion and the second inner hub scarf joint connecting portion being connected together to form an inner hub scarf joint and to thereby form the inner hub hoop preform.

The gas turbine engine according to any preceding clause, the first outer shell connecting portion including a plurality of first bifurcated layers, and the second outer shell connecting portion includes a plurality of second bifurcated layers, the plurality of first bifurcated layers and the plurality of second bifurcated layers being joined together in an overlapping manner to form the outer shell hoop preform.

The gas turbine engine according to any preceding clause, the first inner hub connecting portion including a plurality of first bifurcated layers, and the second inner hub connecting portion includes a plurality of second bifurcated layers, the plurality of first bifurcated layers and the plurality of second bifurcated layers being joined together in an overlapping manner to form the inner hub hoop preform.

The gas turbine engine according to any preceding clause, each of the plurality of outer shell pi-joint members including a first outer shell pi-joint preform portion and a second outer shell pi-joint preform portion, and each of the plurality of inner hub pi-joint members includes a first inner hub pi-joint preform portion and a second inner hub pi-joint preform portion.

The gas turbine engine according to any preceding clause, for each of the plurality of inner hub pi-joint members, the first inner hub pi-joint preform portion including a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other.

The gas turbine engine according to any preceding clause, each of the plurality of first connecting fiber tows of the first inner hub pi-joint preform portion being woven in a respective layer within the outer shell hoop preform, and each of the plurality of second connecting fiber tows of the second inner hub pi-joint preform portion are woven in a respective layer within the outer shell hoop preform.

The gas turbine engine according to any preceding clause, for each of the plurality of outer shell pi-joint members, the first outer shell pi-joint preform portion including a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

The gas turbine engine according to any preceding clause, each of the plurality of first connecting fiber tows of the first outer shell pi-joint preform portion being woven in a respective layer within the outer shell hoop preform, and each of the plurality of second connecting fiber tows of the second outer shell pi-joint preform portion are woven in a respective layer within the outer shell hoop preform.

The gas turbine engine according to any preceding clause, each strut preform including a strut preform first end and a strut preform second end, and, for each strut preform, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

The gas turbine engine according to any preceding clause, the strut preform first end being connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

Although the foregoing description is directed to the preferred embodiments, other variations and modifications will be apparent to those skilled in the art, and may be made without departing from the present disclosure. Moreover, features described in connection with one embodiment may be used in conjunction with other embodiments, even if not explicitly stated above.

The invention claimed is:

1. A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method comprising:

weaving a three-dimensional fabric outer shell preform, the outer shell preform including, in a first outer shell direction of the woven outer shell preform, a first outer shell preform end and a second outer shell preform end;

weaving a three-dimensional fabric inner hub preform, the inner hub preform including, in a first inner hub direction of the woven inner hub preform, a first inner hub preform end and a second inner hub preform end;

installing the woven outer shell preform onto a mold tooling structure, and connecting the first outer shell preform end to the second outer shell preform end to form an outer shell hoop preform;

installing the woven inner hub preform onto the mold tooling structure, and connecting the first inner hub preform end to the second inner hub preform end to form an inner hub hoop preform;

integrally weaving a plurality of outer shell pi-joint members to the outer shell hoop preform, each of the outer shell pi-joint members extending radially inward from the outer shell hoop preform and including a first outer shell pi-joint preform portion and a second outer shell pi-joint preform portion;

integrally weaving a plurality of inner hub pi-joint members to the inner hub hoop preform, each of the inner hub pi-joint members extending radially outward from the inner hub hoop preform and including a first inner hub pi-joint preform portion and a second inner hub pi-joint preform portion;

connecting a plurality of strut preforms between the outer shell hoop preform and the inner hub hoop preform, respective ones of the plurality of strut preforms being connected to a respective one of the plurality of outer shell pi-joint members and to a respective one of the plurality of inner hub pi-joint members;

injecting a matrix material into the mold tooling structure; and applying a curing process to the mold tooling structure to obtain a molded composite component, wherein, for each of the plurality of inner hub pi-joint members, the first inner hub pi-joint preform portion includes a plurality of first connecting fiber tows that are each woven to extend through a thickness of the inner hub hoop preform, and are woven to extend in a first direction, with respect to the inner hub pi-joint member, within the inner hub hoop preform, and the second inner hub pi-joint preform portion includes a plurality of second connecting fiber tows that are each woven to extend through the thickness of the inner hub hoop preform, and are woven to extend in a second direction opposite the first direction, with respect to the inner hub pi-joint member, within the inner hub hoop preform, a portion of the first connecting fiber tows of the first inner hub pi-joint preform portion and a portion of the second connecting fiber tows of the second inner hub pi-joint preform portion overlapping with each other, and wherein each of the plurality of first connecting fiber tows of the first inner hub pi-joint preform portion are woven in a respective layer within the inner hub hoop preform, and each of the plurality of second connecting fiber tows of the second inner hub pi-joint preform portion are woven in a respective layer within the inner hub hoop preform.

2. The method according to claim 1, further comprising bending at least one of a forward extension portion of the outer shell hoop preform to form a forward outer shell circumferential flange preform or an aft extension portion of the outer shell hoop preform to form an aft outer shell circumferential flange preform, and bending at least one of a forward side portion of the inner hub hoop preform to form a forward inner hub circumferential flange preform or an aft side portion of the inner hub hoop preform to form an aft inner hub circumferential flange preform.

3. The method according to claim 1, wherein the composite component is one of a guide vane structure, an inlet guide vane structure, or a stator vane structure.

4. The method according to claim 1, further comprising adding at least one additional preform layer to at least one of the outer shell hoop preform, the inner hub hoop preform, or at least one of the plurality of strut preforms, to increase a thickness of the respective preform.

5. The method according to claim 4, wherein the at least one additional preform layer is added to at least one of the plurality of strut preforms to form an airfoil shape structure.

6. The method according to claim 1, wherein the outer shell preform is woven to include at least one bifurcated outer shell circumferential flange portion, the at least one bifurcated outer shell circumferential flange portion extending radially outward from the outer shell hoop preform to define at least one outer shell circumferential flange preform, and the inner hub preform is woven to include at least one bifurcated inner hub circumferential flange portion, the at least one bifurcated inner hub circumferential flange portion extending radially inward from the inner hub hoop preform to define at least one inner hub circumferential flange preform.

7. The method according to claim 6, wherein the at least one bifurcated outer shell circumferential flange portion includes at least one of a first bifurcated outer shell circumferential flange portion that defines a forward outer shell circumferential flange preform, a second bifurcated outer shell circumferential flange portion that defines an aft outer shell circumferential flange preform, and a third bifurcated outer shell circumferential flange portion that defines an intermediate outer shell circumferential flange preform arranged between the forward outer shell circumferential flange preform and the aft outer shell circumferential flange preform.

8. The method according to claim 6, wherein the at least one bifurcated inner hub circumferential flange portion includes at least one of a first bifurcated inner hub circumferential flange portion that defines a forward inner hub circumferential flange preform, a second bifurcated inner hub circumferential flange portion that defines an aft inner hub circumferential flange preform, and a third bifurcated inner hub circumferential flange portion that defines an intermediate inner hub circumferential flange preform arranged between the forward inner hub circumferential flange preform and the aft inner hub circumferential flange preform.

9. The method according to claim 1, wherein the first outer shell preform end includes a first outer shell connecting portion and the second outer shell preform end includes a second outer shell connecting portion, wherein the first outer shell connecting portion and the second outer shell connecting portion are connected together to form the outer shell hoop preform, and the first inner hub preform end includes a first inner hub connecting portion and the second inner hub preform end includes a second inner hub connecting portion, wherein the first inner hub connecting portion and the second inner hub connecting portion are connected together to form the inner hub hoop preform.

10. The method according to claim 9, wherein the first outer shell connecting portion includes a first outer shell scarf joint portion and the second outer shell connecting portion includes a second outer shell scarf joint connecting portion, the first outer shell scarf joint connecting portion and the second outer shell scarf joint connecting portion being connected together to form an outer shell scarf joint and to thereby form the outer shell hoop preform.

11. The method according to claim 9, wherein the first inner hub connecting portion includes a first inner hub scarf joint connecting portion and the second inner hub connecting portion includes a second inner hub scarf joint connecting portion, the first inner hub scarf joint connecting portion and the second inner hub scarf joint connecting portion being connected together to form an inner hub scarf joint and to thereby form the inner hub hoop preform.

12. The method according to claim 9, wherein the first outer shell connecting portion includes a plurality of first bifurcated layers, and the second outer shell connecting portion includes a plurality of second bifurcated layers, the plurality of first bifurcated layers and the plurality of second bifurcated layers being joined together in an overlapping manner to form the outer shell hoop preform.

13. The method according to claim 10, wherein the first inner hub connecting portion includes a plurality of first bifurcated layers, and the second inner hub connecting portion includes a plurality of second bifurcated layers, the plurality of first bifurcated layers and the plurality of second bifurcated layers being joined together in an overlapping manner to form the inner hub hoop preform.

14. The method according to claim 1, wherein, for each of the plurality of outer shell pi-joint members, the first outer shell pi-joint preform portion includes a plurality of first connecting fiber tows that are each woven to extend through a thickness of the outer shell hoop preform, and are woven to extend in a first direction, with respect to the outer shell pi-joint member, within the outer shell hoop preform, and the second outer shell pi-joint preform portion includes a plurality of second connecting fiber tows that are each woven to extend through the thickness of the outer shell hoop preform, and are woven to extend in a second direction opposite the first direction, with respect to the outer shell pi-joint member, within the outer shell hoop preform, a portion of the first connecting fiber tows of the first outer shell pi-joint preform portion and a portion of the second connecting fiber tows of the second outer shell pi-joint preform portion overlapping with each other.

15. The method according to claim 14, wherein each of the plurality of first connecting fiber tows of the first outer shell pi-joint preform portion are woven in a respective layer within the outer shell hoop preform, and each of the plurality of second connecting fiber tows of the second outer shell pi-joint preform portion are woven in a respective layer within the outer shell hoop preform.

16. The method according to claim 14, wherein each strut preform of the plurality of strut preforms includes a strut preform first end and a strut preform second end, and, for each strut preform of the plurality of strut preforms, the strut preform first end is connected to the first outer shell pi-joint preform portion and to the second outer shell pi-joint preform portion of a respective outer shell pi-joint member, and the strut preform second end is connected to the first inner hub pi-joint preform portion and to the second inner hub pi-joint preform portion for a respective inner hub pi-joint member.

17. The method according to claim 16, wherein the strut preform first end is connected to the first outer shell pi-joint preform portion and to the second outer shell pi-joint preform portion via stitching, and the strut preform second end is connected to the first inner hub pi-joint preform portion and to the second inner hub pi-joint preform portion via stitching.

* * * * *